(12) United States Patent
Kliner et al.

(10) Patent No.: US 10,673,197 B2
(45) Date of Patent: Jun. 2, 2020

(54) FIBER-BASED OPTICAL MODULATOR

(71) Applicant: NLIGHT, INC., Vancouver, WA (US)

(72) Inventors: Dahv A. V. Kliner, Vancouver, WA (US); Roger Farrow, Vancouver, WA (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 15/924,096

(22) Filed: Mar. 16, 2018

(65) Prior Publication Data

US 2018/0205195 A1    Jul. 19, 2018

Related U.S. Application Data

(63) Continuation-in-part of application No. 15/607,411, filed on May 26, 2017, now Pat. No. 10,295,845.
(Continued)

(51) Int. Cl.
*H01S 3/067* (2006.01)
*H01S 3/094* (2006.01)
(Continued)

(52) U.S. Cl.
CPC ............. *H01S 3/067* (2013.01); *G02B 6/02* (2013.01); *G02B 6/028* (2013.01); *G02B 6/0219* (2013.01);
(Continued)

(58) Field of Classification Search
CPC ...................................................... H01S 3/067
See application file for complete search history.

(56) References Cited

U.S. PATENT DOCUMENTS

| | | | |
|---|---|---|---|
| 4,138,190 A | | 2/1979 | Bryngdahl |
| 4,252,403 A | * | 2/1981 | Salisbury ............... G02B 6/262 385/124 |

(Continued)

FOREIGN PATENT DOCUMENTS

| | | |
|---|---|---|
| BY | 12235 | 8/2009 |
| CA | 2637535 | 8/2017 |

(Continued)

OTHER PUBLICATIONS

Bergmann et al., Effects of diode laser superposition on pulsed laser welding of Aluminum, Lasers in Manufacturing Conference 2013, Physics Procedia 41 ( 2013 ) 180-189 (Year: 2013).*
(Continued)

*Primary Examiner* — Peter Radkowski
(74) *Attorney, Agent, or Firm* — Green, Howard & Mughal LLP.

(57) ABSTRACT

Methods, apparatus, and systems for modulation of a laser beam. An optical modulator may comprise an optical input to receive an optical beam, and one or more lengths of fiber between the optical input and an optical output. At least one of the lengths of fiber comprises a confinement region that is optically coupled to the output. The optical modulator may further comprise a perturbation device to modulate, through action upon the one or more lengths of fiber, a transmittance of the beam through the confinement region from a first transmittance level at a first time instance to a second transmittance level at a second time instance. The optical modulator may further comprise a controller input coupled to the perturbation device, wherein the perturbation device is to act upon the one or more lengths of fiber in response to a control signal received through the controller input.

13 Claims, 20 Drawing Sheets

Related U.S. Application Data which is a continuation-in-part of application No. PCT/US2017/034848, filed on May 26, 2017, which is a continuation-in-part of application No. 15/607,410, filed on May 26, 2017, which is a continuation-in-part of application No. 15/607,399, filed on May 26, 2017.

(60) Provisional application No. 62/401,650, filed on Sep. 29, 2016.

(51) Int. Cl.

| | |
|---|---|
| *H01S 3/115* | (2006.01) |
| *H01S 3/11* | (2006.01) |
| *H01S 3/0941* | (2006.01) |
| *H01S 3/121* | (2006.01) |
| *G02B 6/02* | (2006.01) |
| *G02B 6/26* | (2006.01) |
| *G02B 6/255* | (2006.01) |
| *G02B 6/028* | (2006.01) |
| *G02B 6/28* | (2006.01) |
| *H01S 3/106* | (2006.01) |
| *H01S 3/102* | (2006.01) |

(52) U.S. Cl.
CPC ....... *G02B 6/02042* (2013.01); *G02B 6/0286* (2013.01); *G02B 6/255* (2013.01); *G02B 6/262* (2013.01); *G02B 6/2821* (2013.01); *G02B 6/2856* (2013.01); *H01S 3/0941* (2013.01); *H01S 3/094003* (2013.01); *H01S 3/115* (2013.01); *H01S 3/1109* (2013.01); *H01S 3/121* (2013.01); *H01S 3/0675* (2013.01); *H01S 3/102* (2013.01); *H01S 3/106* (2013.01)

(56) References Cited

U.S. PATENT DOCUMENTS

| | | | | |
|---|---|---|---|---|
| 4,266,851 A | * | 5/1981 | Salisbury | G02B 6/2551 250/227.24 |
| 4,475,027 A | * | 10/1984 | Pressley | B23K 26/0732 219/121.6 |
| 4,998,797 A | | 3/1991 | Van Den Bergh et al. | |
| 5,082,349 A | | 1/1992 | Cordova-Plaza et al. | |
| 5,153,773 A | * | 10/1992 | Muraki | G02B 3/0056 359/211.1 |
| 5,463,497 A | | 10/1995 | Muraki et al. | |
| 5,475,415 A | * | 12/1995 | Noethen | B41J 2/45 347/238 |
| 5,642,198 A | | 6/1997 | Long | |
| 5,719,386 A | | 2/1998 | Hsieh et al. | |
| 5,745,284 A | | 4/1998 | Goldberg et al. | |
| 5,818,630 A | | 10/1998 | Fermann et al. | |
| 5,841,465 A | | 11/1998 | Fukunaga et al. | |
| 5,864,430 A | * | 1/1999 | Dickey | B23K 26/073 219/121.69 |
| 5,903,696 A | | 5/1999 | Krivoshlykov | |
| 5,909,306 A | | 6/1999 | Goldberg et al. | |
| 5,986,807 A | * | 11/1999 | Fork | G02B 5/1876 359/566 |
| 5,999,548 A | | 12/1999 | Mori et al. | |
| 6,072,184 A | | 6/2000 | Okino et al. | |
| 6,132,104 A | | 10/2000 | Bliss et al. | |
| 6,275,630 B1 | | 8/2001 | Yang et al. | |
| 6,310,995 B1 | | 10/2001 | Saini et al. | |
| 6,330,382 B1 | | 12/2001 | Harshbarger et al. | |
| 6,417,963 B1 | | 7/2002 | Ohishi et al. | |
| 6,433,301 B1 | * | 8/2002 | Dunsky | B23K 26/073 219/121.67 |
| 6,434,177 B1 | | 8/2002 | Jurgensen | |
| 6,483,973 B1 | * | 11/2002 | Mazzarese | H01S 3/06708 372/6 |
| 6,496,301 B1 | * | 12/2002 | Koplow | G02B 6/14 359/337 |
| 6,542,665 B2 | | 4/2003 | Reed et al. | |
| 6,556,340 B1 | | 4/2003 | Wysocki et al. | |
| 6,639,177 B2 | * | 10/2003 | Ehrmann | B23K 26/032 219/121.68 |
| 6,671,293 B2 | | 12/2003 | Kopp et al. | |
| 6,711,918 B1 | | 3/2004 | Kliner et al. | |
| 6,724,528 B2 | | 4/2004 | Koplow et al. | |
| 6,772,611 B2 | | 8/2004 | Kliner et al. | |
| 6,777,645 B2 | | 8/2004 | Ehrmann et al. | |
| 6,779,364 B2 | * | 8/2004 | Tankala | C03B 37/01211 65/390 |
| 6,801,550 B1 | | 10/2004 | Snell et al. | |
| 6,825,974 B2 | | 11/2004 | Kliner et al. | |
| 6,839,163 B1 | | 1/2005 | Jakobson et al. | |
| 6,882,786 B1 | | 4/2005 | Kliner et al. | |
| 6,895,154 B2 | | 5/2005 | Johnson et al. | |
| 6,917,742 B2 | | 7/2005 | Po | |
| 6,941,053 B2 | | 9/2005 | Lauzon et al. | |
| 6,963,062 B2 | | 11/2005 | Cyr et al. | |
| 6,989,508 B2 | * | 1/2006 | Ehrnnann | B23K 26/032 219/121.73 |
| 7,068,900 B2 | | 6/2006 | Croteau et al. | |
| 7,079,566 B2 | | 7/2006 | Kido et al. | |
| 7,116,887 B2 | * | 10/2006 | Farroni | C03B 37/01217 385/142 |
| 7,148,447 B2 | | 12/2006 | Ehrmann et al. | |
| 7,151,787 B2 | | 12/2006 | Kulp et al. | |
| 7,157,661 B2 | * | 1/2007 | Amako | B23K 26/0608 219/121.73 |
| 7,170,913 B2 | | 1/2007 | Araujo et al. | |
| 7,174,078 B2 | | 2/2007 | Libori et al. | |
| 7,184,630 B2 | | 2/2007 | Kwon et al. | |
| 7,196,339 B2 | | 3/2007 | Namba et al. | |
| 7,235,150 B2 | | 6/2007 | Bischel et al. | |
| 7,257,293 B1 | * | 8/2007 | Fini | G02B 6/02 385/123 |
| 7,317,857 B2 | | 1/2008 | Manyam et al. | |
| 7,318,450 B2 | | 1/2008 | Nobili | |
| 7,359,604 B2 | | 4/2008 | Po | |
| 7,382,389 B2 | | 6/2008 | Cordingley et al. | |
| 7,394,476 B2 | | 7/2008 | Cordingley et al. | |
| 7,421,175 B2 | | 9/2008 | Varnham | |
| 7,463,805 B2 | * | 12/2008 | Li | H01S 3/06708 385/123 |
| 7,526,166 B2 | * | 4/2009 | Bookbinder | G02B 6/02366 385/123 |
| 7,527,977 B1 | | 5/2009 | Fruetel et al. | |
| 7,537,395 B2 | * | 5/2009 | Savage-Leuchs | G02B 6/4296 372/6 |
| 7,592,568 B2 | | 9/2009 | Varnham et al. | |
| 7,593,435 B2 | | 9/2009 | Gapontsev et al. | |
| 7,622,710 B2 | | 11/2009 | Gluckstad | |
| 7,628,865 B2 | | 12/2009 | Singh | |
| 7,764,854 B2 | | 7/2010 | Fini | |
| 7,783,149 B2 | | 8/2010 | Fini | |
| 7,835,608 B2 | | 11/2010 | Minelly et al. | |
| 7,876,495 B1 | * | 1/2011 | Minelly | C03B 37/0122 359/341.1 |
| 7,880,961 B1 | | 2/2011 | Feve et al. | |
| 7,920,767 B2 | | 4/2011 | Fini | |
| 7,924,500 B1 | * | 4/2011 | Minelly | G02B 6/023 359/341.1 |
| 7,925,125 B2 | | 4/2011 | Cyr et al. | |
| 7,955,905 B2 | | 6/2011 | Cordingley et al. | |
| 7,955,906 B2 | | 6/2011 | Cordingley et al. | |
| 8,027,555 B1 | | 9/2011 | Kliner et al. | |
| 8,184,363 B2 | * | 5/2012 | Rothenberg | G02B 6/02042 359/349 |
| 8,217,304 B2 | | 7/2012 | Cordingley et al. | |
| 8,243,764 B2 | | 8/2012 | Tucker et al. | |
| 8,270,441 B2 | | 9/2012 | Rogers et al. | |
| 8,270,445 B2 | | 9/2012 | Morasse et al. | |
| 8,278,591 B2 | | 10/2012 | Chouf et al. | |
| 8,288,683 B2 | | 10/2012 | Jennings et al. | |

(56) References Cited

U.S. PATENT DOCUMENTS

| | | |
|---|---|---|
| 8,362,391 B2 | 1/2013 | Partlo et al. |
| 8,395,084 B2 | 3/2013 | Tanaka |
| 8,415,613 B2 | 4/2013 | Heyn et al. |
| 8,509,577 B2 | 8/2013 | Liu |
| 8,526,110 B1 | 9/2013 | Honea et al. |
| 8,542,145 B2 | 9/2013 | Galati |
| 8,593,725 B2 | 11/2013 | Kliner et al. |
| 8,711,471 B2* | 4/2014 | Liu .................. G02B 6/14 359/337 |
| 8,728,591 B2* | 5/2014 | Inada .................. G02B 1/04 428/1.31 |
| 8,755,660 B1 | 6/2014 | Minelly |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,947,768 B2 | 2/2015 | Kliner et al. |
| 8,953,914 B2 | 2/2015 | Genier |
| 9,207,395 B2 | 2/2015 | Fini et al. |
| 9,014,220 B2 | 4/2015 | Minelly et al. |
| 9,136,663 B2 | 9/2015 | Taya |
| 9,140,873 B2 | 9/2015 | Minelly |
| 9,158,066 B2 | 10/2015 | Fini et al. |
| 9,170,367 B2* | 10/2015 | Messerly ............ G02B 6/02 |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2* | 4/2016 | Fini .................. G02B 6/0288 |
| 9,325,151 B1* | 4/2016 | Fini .................. H01S 3/102 |
| 9,339,890 B2* | 5/2016 | Woods .................. B23K 26/06 |
| 9,366,887 B2* | 6/2016 | Tayebati .................. G02F 1/295 |
| 9,397,466 B2 | 7/2016 | McComb et al. |
| 9,431,786 B2 | 8/2016 | Savage-Leuchs |
| 9,442,252 B2 | 9/2016 | Genier |
| 9,507,084 B2 | 11/2016 | Fini et al. |
| 9,547,121 B2 | 1/2017 | Hou et al. |
| 9,569,382 B2 | 2/2017 | Miura et al. |
| 9,634,462 B2 | 4/2017 | Kliner et al. |
| 9,837,783 B2 | 12/2017 | Kliner et al. |
| 10,295,845 B2 | 5/2019 | Kliner et al. |
| 2002/0146202 A1* | 10/2002 | Reed .................. A61B 5/0084 385/34 |
| 2002/0158052 A1* | 10/2002 | Ehrmann ............ B23K 26/032 219/121.69 |
| 2003/0059184 A1* | 3/2003 | Tankala ............ C03B 37/01211 385/123 |
| 2003/0095578 A1* | 5/2003 | Kopp, II ............ G02B 6/02085 372/6 |
| 2003/0118305 A1 | 6/2003 | Reed et al. |
| 2003/0152342 A1 | 8/2003 | Wang et al. |
| 2003/0174387 A1 | 9/2003 | Eggleton et al. |
| 2003/0219208 A1 | 11/2003 | Kwon et al. |
| 2004/0031779 A1 | 2/2004 | Cahill et al. |
| 2004/0086245 A1* | 5/2004 | Farroni ............ C03B 37/01217 385/123 |
| 2004/0208464 A1* | 10/2004 | Po .................. G02B 6/032 385/123 |
| 2005/0017156 A1* | 1/2005 | Ehrnnann ............ B23K 26/032 250/216 |
| 2005/0041697 A1 | 2/2005 | Seifert et al. |
| 2005/0185892 A1 | 8/2005 | Kwon et al. |
| 2005/0265678 A1* | 12/2005 | Manyam ............ G02B 6/02033 385/127 |
| 2006/0024001 A1 | 2/2006 | Kobayashi |
| 2006/0054606 A1* | 3/2006 | Amako ............ B23K 26/0608 219/121.73 |
| 2006/0067632 A1 | 3/2006 | Broeng et al. |
| 2006/0219673 A1 | 10/2006 | Varnham et al. |
| 2006/0291788 A1 | 12/2006 | Po |
| 2007/0026676 A1 | 2/2007 | Li et al. |
| 2007/0104436 A1* | 5/2007 | Li .................. H01S 3/06708 385/125 |
| 2007/0104438 A1* | 5/2007 | Varnham ............ H01S 3/06708 385/126 |
| 2007/0147751 A1* | 6/2007 | Fini .................. G02B 6/02009 385/123 |
| 2007/0178674 A1* | 8/2007 | Imai .................. B23K 26/0604 438/487 |
| 2007/0195850 A1* | 8/2007 | Schluter ............ H01S 5/4025 372/50.124 |
| 2008/0037604 A1* | 2/2008 | Savage-Leuchs .... G02B 6/4296 372/44.01 |
| 2008/0154249 A1 | 6/2008 | Cao |
| 2008/0181567 A1* | 7/2008 | Bookbinder ........ G02B 6/02366 385/127 |
| 2008/0231939 A1 | 9/2008 | Gluckstad |
| 2009/0034059 A1* | 2/2009 | Fini .................. G02B 6/02023 359/341.3 |
| 2009/0059353 A1* | 3/2009 | Fini .................. G02B 6/02009 359/341.3 |
| 2009/0080472 A1 | 3/2009 | Yao et al. |
| 2009/0080835 A1 | 3/2009 | Frith |
| 2009/0127477 A1* | 5/2009 | Tanaka ............ B23K 26/0738 250/492.22 |
| 2009/0152247 A1 | 6/2009 | Jennings et al. |
| 2009/0297140 A1 | 12/2009 | Heismann et al. |
| 2009/0324233 A1 | 12/2009 | Samartsev et al. |
| 2010/0067013 A1 | 3/2010 | Howieson et al. |
| 2010/0067555 A1 | 3/2010 | Austin et al. |
| 2010/0067860 A1 | 3/2010 | Ikeda et al. |
| 2010/0116794 A1 | 5/2010 | Taido et al. |
| 2010/0129029 A1 | 5/2010 | Westbrook |
| 2010/0150186 A1 | 6/2010 | Mizuuchi et al. |
| 2010/0163537 A1* | 7/2010 | Furuta .................. B23K 26/38 219/121.72 |
| 2010/0251437 A1 | 9/2010 | Heyn et al. |
| 2010/0252543 A1 | 10/2010 | Manens et al. |
| 2010/0257641 A1 | 10/2010 | Perkins et al. |
| 2010/0303419 A1 | 12/2010 | Benjamin et al. |
| 2011/0032602 A1* | 2/2011 | Rothenberg ........ G02B 6/02042 359/341.1 |
| 2011/0058250 A1* | 3/2011 | Liu .................. G02B 6/14 359/341.3 |
| 2011/0091155 A1 | 4/2011 | Yilmaz et al. |
| 2011/0163077 A1* | 7/2011 | Partlo ................ B23K 26/0732 219/121.66 |
| 2011/0243161 A1 | 10/2011 | Tucker et al. |
| 2011/0248005 A1 | 10/2011 | Briand et al. |
| 2011/0297229 A1* | 12/2011 | Gu .................. G02B 6/4298 136/259 |
| 2011/0305256 A1 | 12/2011 | Chann et al. |
| 2012/0002919 A1 | 1/2012 | Liu |
| 2012/0009511 A1 | 1/2012 | Dmitriev |
| 2012/0051692 A1 | 3/2012 | Seo et al. |
| 2012/0082410 A1* | 4/2012 | Peng .................. G02B 6/02304 385/11 |
| 2012/0093461 A1 | 4/2012 | Ramachandran |
| 2012/0127563 A1 | 5/2012 | Farmer et al. |
| 2012/0168411 A1* | 7/2012 | Farmer ............ G02B 19/0052 219/121.67 |
| 2012/0262781 A1 | 10/2012 | Price et al. |
| 2012/0329974 A1* | 12/2012 | Inada .................. G02B 1/04 527/303 |
| 2013/0038923 A1 | 2/2013 | Jespersen et al. |
| 2013/0134637 A1 | 5/2013 | Wiesner et al. |
| 2013/0146569 A1* | 6/2013 | Woods .................. B23K 26/06 219/121.64 |
| 2013/0148925 A1* | 6/2013 | Muendel ............ G02B 6/32 385/27 |
| 2013/0182725 A1 | 7/2013 | Karlsen et al. |
| 2013/0202264 A1* | 8/2013 | Messerly ............ G02B 6/02 385/123 |
| 2013/0223792 A1* | 8/2013 | Huber ................ B23K 26/073 385/18 |
| 2013/0251324 A1* | 9/2013 | Fini .................. G02B 6/02009 385/124 |
| 2013/0343703 A1* | 12/2013 | Genier .................. G02B 6/32 385/33 |
| 2014/0086526 A1 | 3/2014 | Starodubov et al. |
| 2014/0177038 A1 | 6/2014 | Rrataj et al. |
| 2014/0178023 A1 | 6/2014 | Oh et al. |

(56) References Cited

U.S. PATENT DOCUMENTS

| | | | |
|---|---|---|---|
| 2014/0205236 A1* | 7/2014 | Noguchi | G02B 6/2835 385/33 |
| 2014/0259589 A1 | 9/2014 | Xu et al. | |
| 2014/0263209 A1 | 9/2014 | Burris et al. | |
| 2014/0268310 A1 | 9/2014 | Ye et al. | |
| 2014/0271328 A1 | 9/2014 | Burris et al. | |
| 2014/0271837 A1 | 9/2014 | Muldoon et al. | |
| 2014/0334788 A1* | 11/2014 | Fini | G02B 6/0283 427/163.2 |
| 2015/0049987 A1 | 2/2015 | Grasso et al. | |
| 2015/0104139 A1 | 4/2015 | Brunet et al. | |
| 2015/0125114 A1 | 5/2015 | Genier | |
| 2015/0125115 A1 | 5/2015 | Genier | |
| 2015/0138630 A1 | 5/2015 | Honea et al. | |
| 2015/0270089 A1 | 9/2015 | Ghanea-Hercock | |
| 2015/0283613 A1 | 10/2015 | Backlund et al. | |
| 2015/0293300 A1 | 10/2015 | Fini et al. | |
| 2015/0293306 A1 | 10/2015 | Huber et al. | |
| 2015/0316716 A1* | 11/2015 | Fini | G02B 6/02009 385/124 |
| 2015/0325977 A1 | 11/2015 | Gu et al. | |
| 2015/0349481 A1 | 12/2015 | Kliner | |
| 2015/0378184 A1* | 12/2015 | Tayebati | G02F 1/295 250/492.1 |
| 2016/0013607 A1* | 1/2016 | McComb | H01S 3/06704 372/6 |
| 2016/0052162 A1 | 2/2016 | Colin et al. | |
| 2016/0059354 A1 | 3/2016 | Sercel et al. | |
| 2016/0097903 A1 | 4/2016 | Li et al. | |
| 2016/0114431 A1 | 4/2016 | Cherverton et al. | |
| 2016/0116679 A1 | 4/2016 | Muendel et al. | |
| 2016/0207111 A1 | 7/2016 | Robrecht et al. | |
| 2016/0218476 A1 | 7/2016 | Kliner et al. | |
| 2016/0285227 A1 | 9/2016 | Farrow et al. | |
| 2016/0294150 A1 | 10/2016 | Johnson | |
| 2016/0320685 A1 | 11/2016 | Tayebati | |
| 2016/0369332 A1 | 12/2016 | Rothberg et al. | |
| 2017/0090119 A1 | 3/2017 | Logan et al. | |
| 2017/0110845 A1 | 4/2017 | Hou et al. | |
| 2017/0120537 A1 | 5/2017 | Demuth et al. | |
| 2017/0162999 A1 | 6/2017 | Saracco et al. | |
| 2017/0271837 A1 | 9/2017 | Hemenway et al. | |
| 2017/0336580 A1 | 11/2017 | Tayebati et al. | |
| 2018/0088357 A1 | 3/2018 | Kliner et al. | |
| 2018/0088358 A1 | 3/2018 | Kliner et al. | |
| 2019/0250398 A1 | 8/2019 | Small et al. | |
| 2019/0258091 A1 | 8/2019 | Kliner et al. | |

FOREIGN PATENT DOCUMENTS

| | | |
|---|---|---|
| CN | 1584644 | 2/2005 |
| CN | 1617003 | 5/2005 |
| CN | 1327254 | 7/2007 |
| CN | 102007653 | 4/2011 |
| CN | 102481664 | 5/2012 |
| CN | 101907742 B * | 7/2012 |
| CN | 102549377 | 7/2012 |
| CN | 102782540 | 11/2012 |
| CN | 102844942 | 12/2012 |
| CN | 103056513 | 4/2013 |
| CN | 103173760 | 6/2013 |
| CN | 103490273 | 1/2014 |
| CN | 103521920 | 1/2014 |
| CN | 103606803 | 2/2014 |
| CN | 103999302 | 8/2014 |
| CN | 104136952 | 11/2014 |
| CN | 104999670 | 10/2015 |
| CN | 105383060 | 3/2016 |
| CN | 102582274 | 7/2019 |
| DE | 4200587 | 4/1993 |
| DE | 4437284 | 4/1996 |
| DE | 10321102 | 12/2004 |
| DE | 60312826 | 1/2008 |
| DE | 102009026526 | 12/2010 |
| DE | 102013205029 | 9/2014 |
| DE | 102013215362 | 2/2015 |
| DE | 102015103127 | 9/2016 |
| EP | 0366856 | 5/1990 |
| EP | 0731743 | 4/1998 |
| EP | 1238745 | 9/2002 |
| EP | 1266259 | 12/2002 |
| EP | 1681542 | 7/2006 |
| EP | 1800700 | 6/2007 |
| EP | 1974848 | 10/2008 |
| EP | 2886226 | 6/2015 |
| JP | H06-297168 | 10/1994 |
| JP | H11780 | 1/1999 |
| JP | 11287922 | 10/1999 |
| JP | 11344636 | 12/1999 |
| JP | 2003129862 | 5/2003 |
| JP | 2004291031 | 10/2004 |
| JP | 20030302716 | 3/2005 |
| JP | 200645584 | 2/2006 |
| JP | 2006098085 | 4/2006 |
| JP | 2009142866 | 7/2009 |
| JP | 2009248157 | 10/2009 |
| JP | 2012059920 | 3/2012 |
| JP | 2012528011 | 11/2012 |
| JP | 2016201558 | 12/2016 |
| RU | 68715 | 11/2007 |
| RU | 2365476 | 8/2009 |
| RU | 2528287 | 9/2014 |
| RU | 2015112812 | 10/2016 |
| WO | 2003044914 | 5/2003 |
| WO | 2004027477 | 4/2004 |
| WO | 2008053915 | 5/2008 |
| WO | 2010029243 | 3/2010 |
| WO | 2011124671 | 10/2011 |
| WO | 2011146407 | 11/2011 |
| WO | 2013090236 | 6/2013 |
| WO | 2014074947 | 5/2014 |
| WO | 2014154901 | 10/2014 |
| WO | 2014179345 | 11/2014 |
| WO | 2014180870 | 11/2014 |
| WO | 2015156281 | 10/2015 |
| WO | 2015189883 | 12/2015 |
| WO | 2017008022 | 1/2017 |

OTHER PUBLICATIONS

CAILabs, Canuda, Application Note, 2015 (Year: 2015).*

CAILabs, Canuda, Application note, Flexible high-power laser beam shaping (Year: 2015).*

J. M. Daniel, J. S. Chan, J. W. Kim, M. Ibsen, J. Sahu, and W. A. Clarkson, "Novel Technique for Mode Selection in a Large-Mode-Area Fiber Laser," in Conference on Lasers and Electro-Optics 2010, OSA Technical Digest (CD) (Optical Society of America, 2010), paper CWC5 (Year: 2010).*

J. M. O. Daniel, J. S. P. Chan, J. W. Kim, J. K. Sahu, M. Ibsen, and W. A. Clarkson, "Novel technique for mode selection in a multimode fiber laser," Opt. Express 19, 12434-12439 (2011) (Year: 2011).*

Faidel et al., Improvement of selective laser melting by beam shaping and minimized thermally induced effects in optical systems, 9th International Conference on Photonic Technologies LANE 2016 (Year: 2016).*

John M. Fini, "Bend-compensated design of large-mode-area fibers," Opt. Lett. 31, 1963-1965 (2006) (Year: 2006).*

John M. Fini and Jeffrey W. Nicholson, "Bend compensated large-mode-area fibers: achieving robust single-modedness with transformation optics," Opt. Express 21, 19173-19179 (2013) (Year: 2013).*

John M. Fini, "Large mode area fibers with asymmetric bend compensation," Opt. Express 19, 21866-21873 (2011) (Year: 2011).*

Garcia et al., Fast adaptive laser shaping based on multiple laser incoherent combining, Proc. SPIE 10097, High-Power Laser Materials Processing: Applications, Diagnostics, and Systems VI, 1009705 (Feb. 22, 2017); doi: 10.1117/12.2250303 (Year: 2017).*

Huang et al., "All-fiber mode-group-selective photonic lantern using graded-index multimode fibers," Opt. Express 23, 224-234 (2015) (Year: 2015).*

(56) References Cited

OTHER PUBLICATIONS

Jain et al., "Multi-Element Fiber Technology for Space-Division Multiplexing Applications," Opt. Express 22, 3787-3796 (2014) (Year : 2014).*
Jin et al., "Mode Coupling Effects in Ring-Core Fibers for Space-Division Multiplexing Systems," in Journal of Lightwave Technology , vol. 34, No. 14, pp. 3365-3372, Jul. 15, 2016. doi: 10.1109/JLT.2016.2564991 (Year: 2016).*
King et al., Observation of keyhole-mode laser melting in laser powder-bed fusion additive manufacturing, Journal of Materials Processing Technology 214 (2014) 2915-2925 (Year: 2014).*
D. A. V. Kliner, "Novel, High-Brightness, Fibre Laser Platform for kW Materials Processing Applications," in 2015 European Conference on Lasers and Electro-Optics—European Quantum Electronics Conference, (Optical Society of America, 2015), paper CJ_11_2. (Year: 2015).*
Kliner D.A.V., Bambha R.P., Do B.T., Farrow R.L., Feve J.-P., Fox B.P., Hadley G.R., Wien G., Overview of Sandia's fiber laser program (2008) Proceedings of SPIE—The International Society for Optical Engineering, 6952 , art. No. 695202 (Year: 2008).*
Koplow et al., "Single-mode operation of a coiled multimode fiber amplifier," Opt. Lett. 25, 442-444 (2000) (Year: 2000).*
Laskin, Applying of refractive spatial beam shapers with scanning optics ICALEO, 941-947 (2011) (Year: 2011).*
Longhi et al., Self-focusing and nonlinear periodic beams in parabolic index optical fibres, Published May 4, 2004 o IOP Publishing Ltd Journal of Optics B: Quantum and Semiclassical Optics, vol. 6, No. 5 (Year: 2004).*
Mumtaz et al., Selective Laser Melting of thin wall parts using pulse shaping, Journal of Materials Processing Technology 210 (2010) 279-287 (Year: 2010).*
Putsch et al., Active optical system for laser structuring of 3D surfaces by remelting, Proc. SPIE 8843, Laser Beam Shaping XIV, 88430D (Sep. 28, 2013); doi: 10.1117/12.2023306 https://www.osapublishing.org/conference.cfm?meetingid=90&yr=2015 (Year: 2013).*
Sandia National Laboratories—Brochure (POC—D.A.V. Kliner); "Mode-Filtered Fiber Amplifier," 2007 (Year: 2007).*
SeGall et al., "Simultaneous laser mode conversion and beam combining using multiplexed volume phase elements," in Advanced Solid-State Lasers Congress, G. Huber and P. Moulton, eds., OSA Technical Digest (online) (Optical Society of America, 2013), paper AW2A.9. (Year: 2013).*
Thiel et al., Reliable Beam Positioning for Metal-based Additive Manufacturing by Means of Focal Shift Reduction, Lasers in Manufacturing Conference 2015. (Year: 2015).*
Wischeropp et al., Simulation of the effect of different laser beam intensity profiles on heat distribution in selective laser melting, Lasers in Manufacturing Conference 2015. (Year: 2015).*
Xiao et al., "Fiber coupler for mode selection and high-efficiency pump coupling," Opt. Lett. 38, 1170-1172 (2013) (Year: 2013).*
Ye et al., Mold-free fs laser shock micro forming and its plastic deformation mechanism, Optics and Lasers in Engineering 67 (2015) 74-82. (Year: 2015).*
Yu et al., Laser material processing based on non-conventional beam focusing strategies, 9th International Conference on Photonic Technologies LANE 2016 (Year: 2016).*
Zhirnov et al., Laser beam profiling: experimental study of its influence on single-track formation by selective laser melting, Mechanics & Industry 16, 709 (2015) (Year: 2015).*
Birks et al., The photonic lantern, Advances in Optics and Photonics 7, 107-167 (2015) (Year: 2015).*
Van Newkirk et al., Bending sensor combining multicore fiber with a mode-selective photonic lantern, Opt. Lett. 40, 5188-5191 (2015) (Year: 2015).*
Rocha, Ana. (2009). Modeling of Bend Losses in Single-Mode Optical Fibers. Conference: 7th Conference on Telecommunications—Conftele 2009 7th Conference on Telecommunications—Conftele 2009 (Year: 2009).*

Ivanov et al., Fiber-Optic Bend Sensor Based on Double Cladding Fiber, Journal of Sensors, vol. 2015, Article ID 726793. (Year: 2015).*
Oleg V Ivanov and Ivan V Zlodeev, Fiber structure based on a depressed inner cladding fiber for bend, refractive index and temperature sensing, 2014 Meas. Sci. Technol. 25 015201 (Year: 2014).*
Jollivet, Clemence, Specialty Fiber Lasers and Novel Fiber Devices, Doctoral Dissertation, University of Central Florida, 2014 (Year: 2014).*
Jollivet et al., Advances in Multi-Core Fiber Lasers, Invited Presentation, DOI: 10.1364/LAOP.2014.LM1D.3.,2014 (Year: 2014).*
Kosolapov et al., Hollow-core revolver fibre with a double-capillary reflective cladding, Quantum Electron. 46 267 (Year: 2016).*
Messerly, et al., Field-flattened, ring-like propagation modes, Optics Express, V. 21, N. 10, p. 12683 (Year: 2013).*
Messerly et al., Patterned flattened modes, Optics Letters, V. 38, N. 17, p. 3329 (Year: 2013).*
Salceda-Delgado et al., Compact fiber-optic curvature sensor based on super-mode interference in a seven-core fiber, Optics Letters, V. 40, N. 7, p. 1468, (Year: 2015).*
Zhang et al., Switchable multiwavelength fiber laser by using a compact in-fiber Mach-Zehnder interferometer, J. Opt. 14 (2012 (045403) (Year: 2012).*
I.V. Zlodeev and O.V. Ivanov, Transmission spectra of a double-clad fibre structure under bending, Quantum Electronics 43 (6) 535-541 (2013) (Year: 2013).*
Tam et al., An imaging fiber-based optical tweezer array for microparticle array assembly, Appl. Phys. Lett. 84, 4289 (2004); https:// doi.org/10.1063/1.1753062 (Year: 2004).*
Okunkova, et al., "Experimental approbation of selective laser melting of powders by the use of non-Gaussian power density distributions", Physics Procedia 56; pp. 48-57; 2014.
Pinkerton, "Lasers in additive manufacturing", Optics & Laser Technology, 78; 20 pages; 2016.
Prashanth, et al., "Is the energy density a reliable parameter for materials synthesis by selective laser melting?", Materials Research Letters; vol. 5; No. 6; 16 pages; 2017.
Price, et al., "High-brightness fiber-coupled pump laser development", Proceedings of SPIE; vol. 7583; 8 pages; 2017.
Rinnen, et al., "Construction of a shuttered time-of-flight mass spectrometer for selective ion detection", Review of Scientific Instruments, vol. 60 pp. 717-719; Apr. 1989.
Rinnen, et al., "Effect of Indistinguishable Nuclei on Product Rotational Distributions: D+DI→$D_2$+I", Chemical Physics Letters; vol. 169; No. 5; pp. 365-371; Jun. 15, 1990.
Rinnen, et al., "Quantitative determination of $H_2$, HD, and $D_2$ internal state distributions by (2+1) resonance-enhanced multiphoton ionization", Journal of Chemical Physics; vol. 95; pp. 214-225; Jul. 1, 1991.
Rinnen, et al., "Quantitative Determination of HD Internal State Distributions via (2+1) REMPI", Israel Journal of Chemistry; vol. 29; pp. 369-382; 1989.
Rinnen, et al., "The H+$D_2$ reaction: Quantum state distributions at collision energies of 1.3 and 0.55 eV", Journal of Chemical Physics; vol. 91; pp. 7514-7529; Dec. 15, 1989.
Rinnen, et al., "The H+$D_2$ Reaction: "Prompt" HD Distributions at High Collision Energies", Chemical Physics Letters; vol. 153; pp. 371-375; Dec. 23, 1988.
Roehling, et al., "Modulating laser intensity profile ellipticity for microstructural control during metal additive manufacturing", Acta Materialia, vol. 128; pp. 197-206; 2017.
Romero, et al., "Lossless laser beam shaping", Journal of Optical Society of America; vol. 13; No. 4; pp. 751-760; Apr. 1996).
Rosales-Guzman, et al., "Multiplexing 200 modes on a single digital hologram"; physics.optics; 2017.
Sames, et al., "The metallurgy and processing science of metal additive manufacturing", International Materials Reviews; vol. 61; No. 5; Texas A & M; 2016.
Sanchez-Rubio, "Wavelength Beam Combining for Power and Brightness Scaling of Laser Systems", Lincoln Laboratory Journal, vol. 20; pp. 52-66; 2014.

(56) References Cited

OTHER PUBLICATIONS

Saracco, et al., "Compact, 17 W average power, 100 kW peak power, nanosecond fiber laser system", Proceedings of SPIE; vol. 8601; 13 pages; 2013.
Schrader, et al; "Fiber-Based Laser with Tunable Repetition Rate, Fixed Pulse Duration, and Multiple Wavelength Output", Proceedings of the SPIE; vol. 6453; 9 pages; 2007.
Schrader, et al., "High-power fiber amplifier with widely tunable repetition rate, fixed pulse duration, and multiple output wavelengths", Optics Express; vol. 14; No. 24; pp. 11528-11538; Nov. 27, 2006.
Schrader, et al., "Power scaling of fiber-based amplifiers seeded with microchip lasers", Proceedings of the SPIE; vol. 6871; 11 pages; 2008.
Sheehan, et al., "High-brightness fiber laser advances remote laser processing", Industrial Laser Solutions; vol. 31; pp. 1-9; Nov. 2, 2016.
Shusteff, et al., "One-step volumetric additive manufacturing of complex polymer structures", Science Advances; vol. 3; 7 pages; Dec. 8, 2017.
Smith, et al., "Tailoring the thermal conductivity of the powder bed in electron beam melting (EBM) additive manufacturing", Scientific Reports, vol. 7; No. 10514; 8 pages; 2017.
Spears, et al., "GE Aviation: In-process sensing in selective laser melting (SLM) additive manufacturing", Integrating Materials and Manufacturing Innovation; vol. 5; No. 2; 25 pages; 2016.
Sun, et al., "Optical Surface Transformation: Changing the optical surface by homogeneous optic-null medium at will", Scientific Reports, vol. 5; 20 pages; Oct. 30, 2015.
Thiel, et al., "Reliable beam positioning for metal-based additive manufacturing by means of focal shift reduction", Lasers in Manufacturing Conference; SLM Solutions GmbH, Laser-Laboratorium Göttingen, Germany; 8 pages; 2015.
Tofail, et al; "Additive manufacturing: scientific and technological challenges, market uptake and opportunities", Materials Today; 2017.
Tominaga, et al., "Femtosecond experiments and absolute rate calculations on intervalence electron transfer of mixed-valence compounds", Journal of Chemical Physics; vol. 98, No. 2, pp. 1228-1243; American Institute of Physics, Jan. 15, 1993.
Tominaga, et al., "Ultrafast Studies of Intervalence Charge Transfer", Ultrafast Phenomena VIII, Springer Series in Chemical Physics; vol. 55; pp. 582-584; 1993.
Trumpf, "Laser cutting machines", retrieved online at www.us.trumpf.com/en/products/machine-tools/products/2d-laser-cutting/innovative-technology/brightline.html; 9 pages; May 26, 2017.
Ulmanen, "The Effect of High Power Adjustable Ring Mode Fiber Laser for Material Cutting", Master's Thesis; Tampere University of Technology; Finland; 2016.
Varshney, et al., "Design of a flat field fiber with very small dispersion slope", Optical Fiber Technology; vol. 9; No. 3; pp. 189-198; Oct. 2003.
Wang, et al., "Selective laser melting of W—Ni—Cu composite powder: Densification, microstructure evolution and nanocrystalline formation", Int'l Journal of Refractory Metals and Hard Materials; vol. 70; pp. 9-18; Jan. 2018.
Wischeropp, et al., "Simulation of the effect of different laser beam intensity profiles on heat distribution in selective laser melting", Lasers in Manufacturing Conference; 10 pages; 2015.
Xiao, et al., "Fiber coupler for mode selection and high-efficiency pump coupling", Optics Letters; vol. 38, No. 7; pp. 1170-1172; Apr. 1, 2013.
Yaney, et al., "Distributed-Feedback Dye Laser for Picosecond UV and Visible Spectroscopy", Review of Scientific Instruments; vol. 71; No. 3; pp. 1296-1305; Mar. 2000.
Yu, et al., "1.2-kW single-mode fiber laser based on 100-W high-brightness pump diodes", Proceedings of SPIE; vol. 8237; 7 pages; 2012.
Yu, et al., "Laser material processing based on non-conventional beam focusing strategies", $9^{th}$ International Conference on Photonic Technologies; Kansas State University; France); 2016.
Zavala-Arredondo, et al., "Diode area melting single-layer parametric analysis of 316L stainless steel powder", International Journal of Advanced Manufacturing Technology; vol. 94; pp. 2563-2576; 2017.
Zavala-Arredondo, et al., "Laser diode area melting for high speed additive manufacturing of metallic components", Materials & Design, vol. 117; pp. 305-315; 2017.
Zhirnov, et al., "Laser beam profiling: experimental study of its influence on single-track formation by selective laser melting", Mechanics & Industry; vol. 16; No. 709; 6 pages; 2015.
Zou, et al., "Adaptive laser shock micro-forming for MEMS device applications", Optics Express; vol. 25; No. 4; pp. 3875-3883; 2017.
Ghouse, et al., "The influence of laser parameters and scanning strategies on the mechanical properties of a stochastic porous material"; Materials & Design; vol. 131; 36 pages; Oct. 5, 2017.
Putsch, et al.; "Active optical system for laser structuring of 3D surfaces by remelting"; Proceedings of SPIE; Sep. 2013.
Zhu, et al., "Effect of processing parameters on microstructure of laser solid forming Inconel 718 superalloy"; Optics and Laser Technology; vol. 98; pp. 409-415; 2018.
Faidel, et al., "Improvement of selective laser melting by beam shaping and minimized thermally induced effects in optical systems"; $9^{th}$ International Conference on Photonic Technologies; Industrial Paper; Lane; 4 pages; 2016.
Saint-Pierre, et al., "Fast uniform micro structuring of DLC surfaces using multiple ultrashort laser spots through spatial beam shaping"; $9^{th}$ International Conference on Photonic Technologies; Physics Procedia; vol. 83; pp. 1178-1183; 2016.
Yu, H.; "Laser Diode Beam Spatial Combining"; Doctoral Dissertation; Doctoral Program in Electrical Engineering; Politecnico di Torino; 2017.
Kliner, et al., "Efficient visible and UV generation by frequency conversion of a mode-filtered fiber amplifier", Proceedings of SPIE, vol. 4974; pp. 230-235; 2003.
Kliner, et al., "Fiber laser allows processing of highly reflective materials", Industrial Laser Solutions; vol. 31; pp. 1-9; Mar. 16, 2016.
Kliner, et al., "High-Power Fiber Lasers", Photonics & Imaging Technology, pp. 2-5; Mar. 2017.
Kliner, et al., "Laboratory investigation of the catalytic reduction technique for detection of atmospheric NOy", Journal of Geophysical Research; vol. 102; No. D9; pp. 10759-10776; May 20, 1997.
Kliner, et al., "Laser Reflections: How fiber laser users are successfully processing highly reflective metals", Shop Floor Lasers; retrieved online at www.shopfloorlasers.com/laser-cutting/fiber/354-laser-reflections; 9 pages; Jan./Feb. 2017.
Kliner, et al., "Measurements of ground-state OH rotational energy-transfer rates", Journal of Chemical Physics; vol. 110; pp. 412-422; Jan. 1, 1999.
Kliner, et al., "Mode-Filtered Fiber Amplifier", Sandia National Laboratories, 2007 44 pages.
Kliner, et al., "Narrow-band, tunable, semiconductor-laser-based source for deep-uv absorption spectroscopy"; Optics Letters; vol. 22; No. 18; pp. 1418-1420; Sep. 15, 1997.
Kliner, et al., "Novel, high-brightness, fibre laser platform for kw materials processing applications", 2015 European Conference on Lasers and Electro-Optics—European Quantum Electronics Conference; Optical Society of America, 2015;1 page.
Kliner, et al., "Overview of Sandia's fiber laser program", Proceedings of SPIE—The International Society for Optical Engineering; vol. 6952; No. 695202; 13 pages; 2008.
Kliner, et al., "Photodissociation and vibrational relaxation of $I_2$ in ethanol", Journal of Chemical Physics; vol. 98; pp. 5375-5389; Apr. 1, 1993.
Kliner, et al., "Photodissociation dynamics of $I_2$ in solution", Ultrafast Reaction Dynamics and Solvent Effects; American Institute of Physics, New York; pp. 16-35; 1994.
Kliner, et al., "Polarization-maintaining amplifier employing double-clad, bow-tie fiber"; Optics Letters; vol. 26; No. 4; pp. 184-186; Feb. 15, 2001.

(56) References Cited

OTHER PUBLICATIONS

Kliner, et al., "Power Scaling of Diffraction-Limited Fiber Sources", Proceedings of SPIE; vol. 5647; pp. 550-556; 2005.
Kliner, et al., "Power Scaling of Rare-Earth-Doped Fiber Sources", Proceedings of SPIE; vol. 5653; pp. 257-261; 2005.
Kliner, et al., "Product internal-state distribution for the reaction H+HI→ H2+I", Journal of Chemical Physics; vol. 95; pp. 1663-1670; Aug. 1, 1991.
Kliner, et al., "The D+$H_2$ Reaction: Comparison of Experiment with Quantum-Mechanical and Quasiclassical Calculations", Chemical Physics Letters; vol. 166; No. 2; pp. 107-111; Feb. 16, 1990.
Kliner, et al., "The H+para-$H_2$ reaction: Influence of dynamical resonances on $H_2$(v'=1, j'=1 and 3) integral cross sections", Journal of Chemical Physics; vol. 94; pp. 1069-1080; Jan. 15, 1991.
Koplow, et al., "A New Method for Side Pumping of Double-Clad Fiber Sources", Journal of Quantum Electronics; vol. 39; No. 4; pp. 529-540; Apr. 2003.
Koplow, et al., "Compact 1-W Yb-Doped Double-Cladding Fiber Amplifier Using V-Groove Side-Pumping", IEEE Photonics Technology Letters; vol. 10; No. 6; pp. 793-795; Jun. 1998.
Koplow, et al., "Development of a narrowband, tunable, frequency-quadrupled diode laser for uv absorption spectroscopy", Applied Optics; vol. 37; No. 18; pp. 3954-3960; Jun. 20, 1998.
Koplow, et al., "Diode-Bar Side-Pumping of Double-Clad Fibers", Proceedings of SPIE; vol. 5709; pp. 284-300; Apr. 22, 2005.
Koplow, et al., "Polarization-maintaining, double-clad fiber amplifier employing externally applied stress-induced birefringence", Optics Letters; vol. 25; No. 6; pp. 387-389; Mar. 15, 2000.
Koplow, et al., "Single-mode operation of a coiled multimode fiber amplifier", Optics Letters; vol. 25; No. 7; pp. 442-444; Apr. 1, 2000.
Koplow, et al., "Use of Bend Loss to Obtain Single-Transverse-Mode Operation of a Multimode Fiber Amplifier", Conference on Lasers and Electro-Optics, OSA Technical Digest; Optical Society of America, Washington, DC; pp. 286-287; 2000.
Koponen, et al., "Photodarkening Measurements in Large-Mode-Area Fibers", Proceedings of SPIE; vol. 6453; 12 pages; 2007.
Kotlyar, et al., "Asymmetric Bessel-Gauss beams", Journal of Optical Society of America; vol. 31; No. 9; pp. 1977-1983; Sep. 2014.
Kulp, et al., "The application of quasi-phase-matched parametric light sources to practical infrared chemical sensing systems", Applied Physics B; vol. 75; pp. 317-327; 2002.
Lee, et al., "FEM Simulations to study the effects of laser power and scan speed on molten pool size in additive manufacturing", Int'l Journal of Mechanical and Mechatronics Engineering; vol. 11; No. 7; pp. 1150-1154; 2017.
Longhi, et al., "Self-focusing and nonlinear periodic beams in parabolic index optical fibres", Journal of Optics B: Quantum and Semiclassical Optics, vol. 6, No. 5; May 4, 2004.
Malinauskas, et al., "Ultrafast laser processing of materials: from science to industry", Light: Science & Applications 5; 14 pages; 2016.
Matthews, et al.; "Diode-based additive manufacturing of metals using an optically-addressable light valve", Optics Express; vol. 25; No. 10; pp. 11788-11800; 2017.
McComb, et al., "Pulsed Yb:fiber system capable of >250 kW peak power with tunable pulses in the 50 ps To 1.5 ns range", Proceedings of SPIE; vol. 8601; 11 pages; 2013.
Meier, et al., "Thermophysical Phenomena in Metal Additive Manufacturing by Selective Laser Melting: Fundamentals, Modeling, Simulation and Experimentation", Annual Review of Heat Transfer; 2017.
Moore, et al., "Diode-bar side pumping of double-clad fibers", Proceedings of SPIE; vol. 6453; 9 pages; 2007.
Morales-Delgado, et al., "Three-dimensional microfabrication through a multimode optical fiber", Optics Express; 20:25(6); 2017.
Neuhauser, et al., "State-to-State Rates for the D+$H_2$(v=1, j=1) → HD(v', j')+H Reaction: Predictions and Measurements", Science; vol. 257; pp. 519-522; Jul. 24, 1992.

Ngcobo, et al., "A digital laser for on-demand laser modes", Nature Communications, vol. 4; No. 2289; 6 pages; 2013.
Ngcobo, et al., "The Digital Laser", Univ KwaZulu—Natal, CSIR; South Africa; 9 pages; 2013.
Okunkova, et al., "Development of laser beam modulation assets for the process productivity improvement of selective laser melting", Procedia IUTAM 23; pp. 177-186; 2017.
International Search Report and Written Opinion for International Patent Application No. PCT/US18/23009 dated Aug. 9, 2018.
International Search Report and Written Opinion for International Patent Application No. PCT/US18/23012 dated Aug. 9, 2018.
International Search Report and Written Opinion for International Patent Application No. PCT/US18/24958 dated Aug. 23, 2018.
Almangour, et al., "Scanning strategies for texture and anisotropy tailoring during selective laser melting of TiC/316L stainless steel nanocomposites", Journal of Alloys and Compounds; vol. 728; pp. 424-435; 2017.
Amada America,"ENSIS Series", available online via: www.amada.com/america/ensis-3015-aj; 2 pages.
Bernasconi, et al., "The Effect of Solvation on Intrinsic Rates of Proton Transfer", Physical Organic Chemistry; p. 583; Elsevier, Amsterdam; 1987.
Bertoli, et al., "On the limitations of volumetric energy density as a design parameter for selective laser melting", Materials & Design; vol. 113; 331-340; 2017.
Caprio, L. "Investigation of emission modes in the SLM of AISI 316L : modelling and process diagnosis", Thesis; http://hdl.handle.net/10589/133810; abstract only. 3 pages.
Chen, et al., "Improving additive manufacturing processability of hard-to-process overhanging structure by selective laser melting", Journal of Materials Processing Technology; vol. 250; pp. 99-108; 2017.
Cloots, M. et al., "Investigations on the microstructure and crack formation of IN738LC samples processed by selective laser melting using Gaussian and doughnut profiles", Materials & Design; vo. 89; pp. 770-784; 2016.
Demir, et al.,"From pulsed to continuous wave emission in SLM with contemporary fiber laser sources: effect of temporal and spatial pulse overlap in part quality", International Journal of Advanced Manufacturing Technology; vol. 91:2701; May 2017.
Dezfoli, et al., "Determination and controlling of grain structure of metals after laser incidence: Theoretical approach", Scientific Reports; vol. 7; 41527; 2017.
Francis, Z.R. "The effects of laser and electron beam spot size in additive manufacturing processes", PhD dissertation; Carnegie Mellon University; 2017.
Gockel, et al., "Integrated melt pool and microstructure control for Ti-6Al-V4 thin wall additive manufacturing", Materials Science and Technology; vol. 31; No. 8; 2015.
Gupta, A., "A review on layer formation studies in selective laser melting of steel powders and thin wall parts using pulse shaping", International Journal of Manufacturing and Materials Processing; vol. 3; No. 1; pp. 9-15; 2017.
Han, et al., "Selective laser melting of advanced Al-Al2O3 nanocomposites: Simulation, microstructure and mechanical properties", Materials Science and Engineering:A; vol. 698; pp. 162-173; 2017.
Hauschild, et al., "GmbH: Application specific beam profiles: new surface and thin-film refinement processes using beam shaping technologies", SPIE 10085; Components and Packaging for Laser Systems III; 100850J; 2017.
Hebert, R., "Viewpoint: metallurgical aspects of powder bed metal additive manufacturing", Journal of Materials Science; vol. 51; No. 3; pp. 1165-1175; 2016.
Heck, "Highly integrated optical phased arrays: photonic integrated circuits for optical beam shaping and beam steering", Nanophotonics; vol. 6; No. 1; pp. 93-107; 2017.
Ishiguro, et al., "High Efficiency 4-kW Fiber Laser Cutting Machine", Rev. Laser Eng.; vol. 39; pp. 680-684; 2011.
Kaden, et al., "Selective laser melting of copper using ultrashort laser pulses", Friedrich-Schiller University; Fraunhofer Inst.for Applied Optics and Precision; Applied Physics A.; vol. 123; No. 9; p. 596; 2017.

(56) References Cited

OTHER PUBLICATIONS

Koplow, et al., "High Power PM Fiber Amplifier and Broadband Source", Optical Fiber Communication Conference; OSA Technical Digest (Optical Society of America, Washington, DC), pp. 12-13; 2000.
Liu, et al., "PolarOnyx: Femtosecond laser additive manufacturing of YSZ", Applied Physics A; vol. 123:293; 2017.
Masoomi, et al., "Quality part production via multi-laser additive manufacturing", Manufacturing Letters; vol. 13; pp. 15-20; 2017.
MC Machinery Systems, "EX-F Series", available online via www.mcmachinery.com/products-and-solutions/ex-f-series/; 2 pages.
Naidoo, et al., "Improving the laser brightness of a commercial laser system", Proc. SPIE 10036; Fourth Conference on Sensors; MEMS, and Electro-Optic Systems, 100360V; 2017.
Nufern, "Triple Clad Ytterbium-Doped Polarization Maintaining Fibers", nuFERN Driven to Light Specifications; 1 page; Jan. 2006.
Okunkova, et al., "Study of laser beam modulation influence on structure of materials produced by additive manufacturing", Adv. Mater. Letters; vol. 7; No. 2; pp. 111-115; 2016.
Putsch, et al., "Integrated optical design for highly dynamic laser beam shaping with membrane deformable mirrors", Proc. SPIE 10090; Laser Resonators, Microresonators, and Beam Control XIX, 1009010; 2017.
Raghavan, et al., "Localized melt-scan strategy for site specific control of grain size and primary dendrite arm spacing in electron beam additive manufacturing", Acta Materialia; vol. 140; pp. 375-387; 2017.
Rashid, et al., "Effect of scan strategy on density and metallurgical properties of 17-4PH parts printed by selective laser melting (SLM)", Journal of Materials Processing Technology; vol. 249; pp. 502-511; 2017.
Sheehan, et al., "Fiber laser processing of highly reflective materials", Laser, vol. 3; pp. 92-92; Jun. 2017.
Sundqvist, et al., "Analytical heat conduction modelling for shaped laser beams", Journal of Materials Processing Technology; vol. 247; pp. 48-54; 2017.
Trapp, et al., "In situ absorptivity measurments of metallic powders during laser powder-bed fusion additive manufacturing", Applied Materials Today; vol. 9; pp. 341-349; 2017.
Valdez, et al., "Induced porosity in super alloy 718 through the laser additive manufacturing process: Microstructure and mechanical properties", Journal Alloys and Compounds; vol. 725; pp. 757-764; 2017.
Wilson-Heid, et al., "Quantitative relationship between anisotropic strain to failure and grain morphology in additively manufactured Ti-6Al-4V", Materials Science and Engineering: A, 706 (Suppl.C); pp. 287-294; 2017.
Xiao, et al., "Effects of laser modes on Nb segregation and Laves phase formation during laser additive manufacturing of nickel-based superalloy", Materials Letters; vol. 188; pp. 260-262; 2017.
Xiao, et al., "Melt-pool motion, temperature variation and dendritic morphology of Inconel 718 during pulsed-and continuous-wave laser additive manufacturing: A comparative study", Materials & Design; vol. 119; pp. 351-360; 2017.
Xu, et al., "The influence of exposure time on energy consumption and mechanical properties of SLM-fabricated parts", SFS Symposium; 2017.
Yan, et al., "Formation mechanism and process optimization of nano Al2o3—Zro2 eutectic ceramic via laser engineered net shaping (LENS)", Ceramics International; vol. 43; No. 17; pp. 14742-14747; 2017.
Yu, et al., "Development of a 300W 105/0.15 fiber pigtailed diode module for additive manufacturing applications", Proceedings of SPIE 10086; High-Power Diode Laser Technology XV; 2017.
Yusuf, et al., "Influence of energy density on metallurgy and properties in metal additive manufacturing", Materials Science and Technology; vol. 33, No. 11; 2017.
Zhu, et al., "Effect of processing parameters on microstructure of laser solid forming Inconel 718 superalloy", Optics & Laser Technology; 98.(Suppl.C); pp. 409-415.

Fox, et al., "Gamma Radiation Effects in Yb-Doped Optical Fiber", Proc. of the SPIE; vol. 6453; 9 pages; 2007.
Fox, et al., "Gamma-Radiation-Induced Photodarkening in Unpumped Optical Fibers Doped with Rare-Earth Constituents", IEEE Trans. on Nuclear Science; vol. 57; No. 3; pp. 1618-1625; Jun. 2010.
Fox, et al., "Investigation of radiation-induced photodarkening in passive erbium-, ytterbium-, and Yb/Er co-doped optical fibers", Proc. of the SPIE, vol. 6713; 9 pages; 2007.
Fox, et al., "Radiation damage effects in doped fiber materials", Proc. of the SPIE; vol. 6873; 9 pages; 2008.
Fox, et al., "Spectrally Resolved Transmission Loss in Gamma Irradiated Yb-Doped Optical Fibers", IEEE Journal of Quantum Electronics; vol. 44; No. 6; pp. 581-586; Jun. 2008.
Fox, et al., "Temperature and Dose-Rate Effects in Gamma Irradiated Rare-Earth Doped Fibers", Proc. of SPIE; vol. 7095; 8 pages; 2008.
Ghasemi, et al., "Beam shaping design for coupling high power diode laser stack to fiber", Applied Optics; vol. 50; No. 18; pp. 2927-2930; Jun. 20, 2011.
Ghatak, et al., "Design of Waveguide Refractive Index Profile to Obtain Flat Model Field", Proc of SPIE; vol. 3666; pp. 40-44; Apr. 1999.
Gissibl, et al., "Sub-micrometre accurate free-form optics by three-dimensional printing on single-mode fibres", Nature Communications; vol. 7; No. 11763; 31 pages; 2016.
Goers, et al., "Development of a compact gas imaging sensor employing a cw fiber-amp-pumped PPLN OPO", Conference on Lasers and Electro-Optics, OSA Technical Digest; Optical Society of America, Washington, DC; p. 521; 2001.
Goldberg, et al., "Deep UV generation by frequency quadrupling of a high-power GaAlAs semiconductor laser", Optics Letters; vol. 20; No. 10; pp. 1145-1147; May 15, 1995.
Goldberg, et al., "Deep UV Generation by Frequency Tripling and Quadrupling of a High-Power Modelocked Semiconductor Laser", Proceedings of the Quantum Electronics and Laser Science Conference, QPD18-2; Baltimore; 2 pages; May 1995.
Goldberg, et al., "High efficiency 3 W side-pumped Yb fiber amplifier and laser", Conference on Lasers and Electro-Optics, OSA Technical Digest; Optical Society of America, Washington, DC; p. 11-12; 1999.
Goldberg, et al., "Highly efficient 4-W Yb-doped fiber amplifier pumped by a broad-stripe laser diode", Optics Letters; vol. 24; No. 10; pp. 673-675; May 15, 1999.
Goldberg, et al., "High-power superfluorescent source with a side-pumped Yb-doped double-cladding fiber"; Optics Letters; vol. 23; No. 13; pp. 1037-1039; Jul. 1, 1998.
Goldberg, et al., "Tunable UV generation at 286 nm by frequency tripling of a high-power modelocked semiconductor laser", Optics Letters; vol. 20; No. 15; pp. 1640-1642; Aug. 1, 1995.
Golub, "Laser Beam Splitting by Diffractive Optics", Optics and Photonics News, 6 pages; Feb. 2004.
Gunenthiram, et al., "Analysis of laser-melt pool-powder bed interaction during the selective laser melting of a stainless steel", Journal of Laser Applications; Vo. 29; No. 2; 8 pages; 2017.
Häfner, et al., "Tailored laser beam shaping for efficient and accurate microstructuring", Univ Erlangen-Nürnberg Germany; Applied Physics A; vol. 124; No. 111, 9 pages; 2018.
Han, et al., "Reshaping collimated laser beams with Gaussian profile to uniform profiles", Applied Optics; vol. 22; No. 22; pp. 3644-3647; Nov. 15, 1983.
Hansen, et al., "Beam shaping to control of weldpool size in width and depth"; 8th International Conference on Photonic Technologies; Physics Procedia; vol. 56; pp. 467-476; IPU Technology, Aalborg University; Denmark; 2014.
Headrick, et al., "Application of laser photofragmentation-resonance enhanced multiphoton ionization to ion mobility spectrometry", Applied Optics; vol. 49; No. 11; pp. 2204-2214; Apr. 10, 2010.
Hemenway, et al., "Advances in high-brightness fiber-coupled laser modules for pumping multi-kW CW fiber lasers"; Proceedings of SPIE; vol. 10086; 7 pages; 2017.
Hemenway, et al., "High-brightness, fiber-coupled pump modules in fiber laser applications"; Proc. of SPIE; vol. 8961; 12 pages; 2014.

(56) References Cited

OTHER PUBLICATIONS

Hengesbach, et al., "Brightness and average power as driver for advancements in diode lasers and their applications"; Proc. SPIE; vol. 9348, High-Power Diode Laser Technology and Applications XIII; Fraunhofer ILT, RWTH Aachen Univ; Germany; 2015.
Hoops, et al., "Detection of mercuric chloride by photofragment emission using a frequency-converted fiber amplifier", Applied Optics; vol. 46; No. 19; pp. 4008-4014; Jul. 1, 2007.
Hotoleanu, et al., "High order mode suppression in large mode area active fibers by controlling the radial distribution of the rare earth dopant", Proc. of the SPIE; vol. 6102; 8 pages; 2006.
Huang, et al., "3D Printing optical engine for controlling material microstructure"; $9^{th}$ International Conference on Photonic Technologies; Physics Procedia; vol. 83; pp. 847-853; 2016.
Huang, et al., "Double-cutting beam shaping technique for high-power diode laser area light source", Optical Engineering; vol. 52; 7 pages; Oct. 2013.
Ji, et al., "Meta-q-plate for complex beam shaping", Scientific Reports; vol. 6; 22 pages; 2016.
Johnson, et al., "Experimental and theoretical study of inhomogeneous electron transfer in betaine: comparisons of measured and predicted spectral dynamics"; Chemical Physics; vol. 176; pp. 555-574; Oct. 15, 1993.
Johnson, et al., "Ultrafast experiments on the role of vibrational modes in electron transfer"; Pure and Applied Chem.; vol. 64; No. 9; pp. 1219-1224; 1992.
Klerks, et al., "Flexible beam shaping system for the next generation of process development in laser micromachining"; Industrial Paper; 9th International Conference on Photonic Technologies LANE 2016.
Kliner, et al., "4-kW fiber laser for metal cutting and welding", Proc. of SPIE; vol. 7914; 8 pages; 2011.
Kliner, et al., "Comparison of Experimental and Theoretical Absolute Rates for Intervalence Electron Transfer", Journal of American Chemical Society; vol. 114; pp. 8323-8325; 1992.
Kliner, et al., "Comparison of Experimental and Theoretical Integral Cross Sections for D + H2(v=1, j=1) → HD(v'=1, j') + H"; Journal of Chemical Physics; vol. 95; pp. 1648-1662; Aug. 1, 1991.
Kliner, et al., "D + H2(v=1, J=1): Rovibronic state to rovibronic state reaction dynamics", Journal of Chemical Physics, vol. 92; pp. 2107-2109; Feb. 1, 1990.
Kliner, et al., "Effect of indistinguishable nuclei on product rotational distributions: the H+HI → H2+I reaction", Journal of Chemical Physics; vol. 90; pp. 4625-4327; Apr. 15, 1989.
Kliner, et al., "Efficient second, third, fourth, and fifth harmonic generation of a Yb-doped fiber amplifier", Optics Communications; vol. 210; pp. 393-398; Sep. 15, 2002.
Kliner, et al., "Efficient UV and visible generation using a pulsed Yb-doped fiber amplifier", Conference on Lasers and Electro-Optics, OSA Technical Digest; Optical Society of America, Washington, DC; p. CPDC10-1-CPDC10-3; 2002.
IDEX How to Select a Beamsplitter; Optics & Photonics Marketplace, available at https://www.cvilaseroptics.com/file/general/beamSplitters.pdf, Jan. 8, 2014; 5 pages.
International Search Report and Written Opinion for related International Application No. PCT/US2016/041526 (NLIGHT083PCT), 6 pages, dated Oct. 20, 2016.
International Search Report and Written Opinion for related International Application No. PCT/US2016/053807 (NLIGHT100PCT), 6 pages, dated Jan. 19, 2017.
International Search Report and Written Opinion from International Application No. PCT/US2017/034848, dated Nov. 28, 2017, 15 pages.
Office action from U.S. Appl. No. 15/607,399, dated Sep. 20, 2017, 25 pages.
Office action from U.S. Appl. No. 15/607,410, dated Oct. 3, 2017, 32 pages.
Office action from U.S. Appl. No. 15/607,411, dated Feb. 1, 2018, 11 pages.

Office action from U.S. Appl. No. 15/607,411, dated Sep. 26, 2017, 15 pages.
Restriction Requirement for U.S. Appl. No. 15/924,090, dated Jun. 28, 2018.
Restriction Requirement for U.S. Appl. No. 15/939,136, dated Jul. 27, 2018.
Coherent; "Arm", retrieved online at www.corelase.fi/products/arm; 6 pages; May 26, 2017.
Highyag; "Efficient and Simple Precision, Laser Processing Head PDT-B", 6 pages; Jan. 2010.
Adelman, et al., "Measurement of Relative State-to-State Rate Constants for the Reaction D + H2(v, j) → HD(v', j') + H", Journal of Chemical Physics, vol. 97; pp. 7323-7341, Nov. 15, 1992.
Alfano, et al., "Photodissociation and Recombination Dynamics of I2 in Solution", Ultrafast Phenomena VIII, Springer-Verlag, New York, 1993, pp. 653-655.
Ayoola, W., "Study of fundamental laser material interaction parameters in solid and powder melting", PhD Thesis, School of Aerospace, Transportation and Manufacturing, Cranfield University, UK, Academic Year 2016, (192 pages).
Bernasconi, et al., "Kinetics of Ionization of Nitromethane and Phenylnitromethane by Amines and Carboxylate Ions in Me2SO-Water Mixtures. Evidence of Ammonium Ion-Nitranate Ion Hydrogen Bonded Complex Formation in Me2SO-Rich Solvent Mixtures", Journal of Org. Chem.; vol. 53; pp. 3342-3351; 1988.
Blake, et al., "The H + D2 Reaction: HD(v=1, J) and HD (v=2,J) Distributions at a Collision Energy of 1.3eV", Chemical Physics Letters; vol. 153; No. 5; pp. 365-370; Dec. 23, 1988.
Burger, et al., "Implementation of a spatial light modulator for intracavity beam shaping", Journal of Optics, vol. 17; CSIR, Univ. Stellenbosch, Univ KwaZulu-Natal; South Africa; 2015.
Daniel, et al., "Novel Technique for Mode Selection in a Large Mode-Area Fiber Laser", Conference on Lasers and Electro-Optics 2010, OSA Technical Digest (CD) (Optical Society of America, 2010).
Daniel, et al., "Novel technique for mode selection in a multimode fiber laser", Optics Express; vol. 19; No. 13; Jun. 20, 2011. pp. 12434-12439.
Debroy, et al., "Additive manufacturing of metallic components—process, structure and properties", Progress in Materials Science, 92 112-224 (2018).
Dehoff, et al., "Site specific control of crystallographic grain orientation through electron beam additive manufacturing", Materials Science and Technology vol. 31; No. 8; 8 pages; (2015).
Di Teodoro, et al., "Diffraction-Limited, 300-kw Peak-Power Pulses from a Coiled Multimode Fiber Amplifier", Optics Letters, vol. 27, No. 7; pp. 518-520; Apr. 1, 2002.
Di Teodoro, et al., "Diffraction-Limited, 300-kw Peak-Power Pulses from a Yb-doped Fiber Amplifier", Conference on Lasers and Electro-Optics, OSA Technical Digest; Optical Society of America, Washington D.C.; pp. 592-593.
Di Teodoro, et al., "High-peak-power pulsed fiber sources", Proceedings of SPIE; vol. 5448; pp. 561-571; 2004.
Farrow, et al., "Bend-Loss Filtered, Large-Mode-Area Fiber Amplifiers: Experiments and Modeling", Proceedings of the Solid State and Diode Laser Technology Review (Directed Energy Professional Society), P-9, 5 pages (2006).
Farrow, et al., "Compact Fiber Lasers for Efficient High-Power Generation", Proc. Of SPIE, vol. 6287: 6 pages; (2006).
Farrow, et al., "Design of Refractive-Index and Rare-Earth-Dopant Distributions for Large-Mode-Area Fibers Used in Coiled High-Power Amplifiers", Proceedings of SPIE; vol. 6453; 11 pages; 2007.
Farrow, et al., "High-Peak-Power (>1.2 MW) Pulsed Fiber Amplifier", Proc. of the SPIE, vol. 6102; 11 pages; 2006.
Farrow, et al., "Numerical Modeling of Self-Focusing Beams in Fiber Amplifiers", Proc. of the SPIE, vol. 6453; 9 pages; 2007.
Farrow, et al., "Peak-Power Limits on Fiber Amplifiers Imposed by Self-Focusing", Optics Letters,vol. 31; No. 23; pp. 3423-3425; Dec. 1, 2006.
Feve, et al., "Limiting Effects of Four-Wave Mixing in High-Power Pulsed Fiber Amplifiers", Proc. of the SPIE; Vo. 6453; 11 pages; 2007.

(56) References Cited

OTHER PUBLICATIONS

Feve, et al., "Four-wave mixing in nanosecond pulsed fiber amplifiers", Optics Express; vol. 15; No. 8; pp. 4647-4662; Apr. 16, 2007.
Fey, Marco; "3D Printing and International Security—Risks and Challenges of an Emerging Technology", PRIF Report No. 144; Peace Research Institute; Frankfurt, Germany, 2017.
Fini, et al., "Bend compensated large-mode-area fibers: achieving robust single-modedness with transformation optics", Optics Express; vol. 21; No. 16; pp. 19173-19179; 2013.
Fini, et al., "Bend-compensated design of large-mode-area fibers", Optics Letters; vol. 31; No. 13; pp. 1963-1965; 2006.
Fini, et al., "Large mode area fibers with asymmetric bend compensation", Optics Express vol. 19, No. 22; pp. 21866-21873; 2011.
Florentin, et al., "Shaping the light amplified in a multimode fiber", Light: Science & Applications, 6, Official Journal of the CIOMP; France; 9 pages; 2017.
Fox, et al., "Effect of low-earth orbit space on radiation-induced absorption in rare-earth-doped optical fibers", Journal of Non-Crystalline Solids, vol. 378; pp. 79-88; 2013.
Applicant-Initiated Interview Summary from U.S. Appl. No. 15/607,399, dated Dec. 26, 2018, 7 pages.
Decision of Rejection for Korean Patent Application No. 10-2015-7025813, 6 pages, dated Nov. 29, 2018.
Extended European Search Report for European Patent Application No. 16849882.2, dated Apr. 23, 2019, 8 pages.
Extended European Search Report for European Patent Application No. 18173438.5, dated Oct. 15, 2018, 3 pages.
First Office Action for Chinese Patent Application No. 201510295923.9, dated Nov. 21, 2018, 6 pages.
First Office Action for Chinese Patent Application No. 201510303469.7, dated Jun. 27, 2019, 18 pages.
First Office Action for Chinese Patent Application No. 201510468218.4, dated Dec. 4, 2018, 14 pages.
First Office Action for Chinese Patent Application No. 20160068424.9, dated Jan. 29, 2019, 10 pages.
First Office Action for Chinese Patent Application No. 201680043132.X, dated May 21, 2019, 21 pages.
International Preliminary Report on Patentability for International Patent Application No. PCT/US17/34848, dated Apr. 2, 2019, 9 pages.
International Search Report and Written Opinion for International Application No. PCT/US18/15895, dated Jul. 10, 2018, 10 pages.
International Search Report and Written Opinion for International Application No. PCT/US18/22629, dated Jul. 26, 2018, 11 pages.
International Search Report and Written Opinion for International Application No. PCT/US18/24510, dated Jul. 12, 2018, 6 pages.
International Search Report and Written Opinion for International Application No. PCT/US18/24641, dated Jul. 12, 2018, 6 pages.
International Search Report and Written Opinion for International Application No. PCT/US18/24959, dated Jun. 28, 2018, 7 pages.
International Search Report and Written Opinion for International Application No. PCT/US18/24974, dated Jul. 12, 2018, 6 pages.
International Search Report and Written Opinion for International Patent Application No. PCT/US18/016305, dated Jun. 11, 2018, 10 pages.
International Search Report and Written Opinion for International Patent Application No. PCT/US18/15710, dated Jun. 25, 2018, 17 pages.
International Search Report and Written Opinion for International Patent Application No. PCT/US18/15768, dated Jun. 11, 2018, 15 pages.
International Search Report and Written Opinion for International Patent Application No. PCT/US18/16288, dated Jun. 11, 2018, 10 pages.
International Search Report and Written Opinion for International Patent Application No. PCT/US18/23009, dated Aug. 9, 2018, 8 pages.
International Search Report and Written Opinion for International Patent Application No. PCT/US18/23012, dated Aug. 9, 2018, 7 pages.
International Search Report and Written Opinion for International Patent Application No. PCT/US18/24145, dated Jun. 21, 2018, 5 pages.
International Search Report and Written Opinion for International Patent Application No. PCT/US18/24548, dated Jun. 28, 2018, 6 pages.
International Search Report and Written Opinion for International Patent Application No. PCT/US18/24889, dated Jul. 26, 2018, 5 pages.
International Search Report and Written Opinion for International Patent Application No. PCT/US18/24907, dated Sep. 27, 2018, 6 pages.
International Search Report and Written Opinion for International Patent Application No. PCT/US18/24954, dated Aug. 23, 2018, 7 pages.
International Search Report and Written Opinion for International Patent Application No. PCT/US18/24958, dated Aug. 23, 2018, 6 pages.
International Search Report and Written Opinion for International Patent Application No. PCT/US18/24971, dated Aug. 30, 2018, 8 pagess.
International Search Report and Written Opinion for International Patent Application No. PCT/US18/24976, dated Aug. 9, 2018, 8 pages.
Notice of Allowance and Examiner-Initiated Interview Summary for U.S. Appl. No. 15/607,411, dated Jan. 7, 2019, 14 pages.
Notice of Allowance for U.S. Appl. No. 14/768,595, dated Jul. 1, 2019, 8 pages.
Notice of Allowance for U.S. Appl. No. 15/607,399, dated Jun. 4, 2019, 15 pages.
Notice of Allowance for U.S. Appl. No. 15/938,959, dated Aug. 15, 2019, 13 pages.
Notice of Allowance for U.S. Appl. No. 15/939,064, dated Aug. 13, 2019, 13 pages.
Notice of Reasons for Rejection for Japanese Patent Application No. JP2018-527718, dated Dec. 13, 2018, 15 pages
Notice of Reasons for Rejection for Japanese Patent Application No. JP2018-527718, dated Jun. 14, 2019, 16 pages.
Office Action for European Patent Application No. EP 17741945.4, dated Aug. 8, 2019, 6 pages.
Office Action for European Patent Application No. EP 17741945.4, dated Jan. 9, 2019, 7 pages.
Office Action for related Chinese Patent Application No. 201610182805.1, dated Jan. 3, 2019, 20 pages.
Office Action for U.S. Appl. No. 14/768,595, dated Mar. 8, 2019, 8 pages.
Office Action for U.S. Appl. No. 15/607,399, dated Jan. 11, 2019, 63 pages.
Office Action for U.S. Appl. No. 15/924,090, dated Aug. 15, 2019.
Office Action for U.S. Appl. No. 15/938,959, dated Apr. 18, 2019, 57 pages.
Office Action for U.S. Appl. No. 15/939,064, dated Apr. 18, 2019, 52 pages.
Office Action for U.S. Appl. No. 15/939,136, dated Aug. 22, 2019.
Office Action for U.S. Appl. No. 16/402,147, dated Jun. 14, 2019, 10 pages.
Official Letter and Search Report for Taiwan Patent Application No. 106133704, dated Mar. 13, 2019, 29 pages.
Search Report for European Patent Application No. 18173438.5, dated Oct. 5, 2018, 3 pages.
Second Office Action for Chinese Patent Application No. 20150468218.4, dated May 20, 2019, 10 pages.
Second Office Action for Chinese Patent Application No. 201680068424.9, dated Jul. 1, 2019, 6 pages.
Supplementary European Search Report for EP Patent Application No. EP17741945.4, dated Nov. 16, 2018, 18 pages.
"Bending Machine", CBC Alta Technologia Italiana, General Catalog, pp. 96-97 (2011).
"Business Unit Laser Ablation and Cutting: Laser Beam Fusion Cutting with Dynamic Beam Shaping", Fraunhofer IWS Annual Report 2015, pp. 86-87 (2015).
"UNI 42 A", Curvatubi electrica digitale, 5 pages (2016).

(56) References Cited

OTHER PUBLICATIONS

"UNI 60 COMBI 2", Frame-Grab of YouTube Video, 1 page (Sep. 26, 2011).
Andreasch, et al., "Two concentric fiber diameters in one laser light cable", Optical Components, No. 1, pp. 38-41 (Jan. 2011).
Argyros, et al., "Bend loss in highly multimode fibres", Optics Express, 16:18590-18598 (Nov. 10, 2008).
Bai, et al., "Effect of Bimodal Powder Mixture on Powder Packing Density and Sintered Density in Binder Jetting of Metals", 26th Annual International Solid Freeform Fabrication Symposium, 14 pages (Aug. 10-12, 2015).
Balazic, et al., "Additive Manufacturing and 3D Printing Lens Technology", Additive Manufacturing of Metal Components Conference at IK4-Lortek, 52 pages (Nov. 27, 2013).
Brown, et al., "Fundamentals of Laser-Material Interaction and Application to Multiscale Surface Modification", Chapter 4, Laser Precision Microfabrication, pp. 91-120 (2010).
Chen, et al., "An Algorithm for correction of Distortion of Laser marking Systems", IEEE International Conference on Control and Automation, Guangzhou, China, 5 pages (May 30-Jun. 1, 2007).
Decombe, et al., "Single and dual fiber nano-tip optical tweezers: trapping and analysis", Optics Express, 21:30521-30531 (Dec. 4, 2013).
Dorrington, et al., "A simple microcontroller based digital lock-in amplifier for the detection of low level optical signals", Proceedings of the First IEEE International Workshop on Electronic Design, Test and Applications (Delta 02) (2002).
Duflou, et al., "Development of a real time monitoring and adaptive control system for laser flame cutting", ICALEO 2009—28th International Congress on Applications of Lasers and Electro-Optics, Congress Proceedings, 102, (2009).
Fini, "Bend distortion in large-mode-area amplifier fiber design", Proceedings of SPIE 6781: 67810E-67810E-11 (Nov. 21, 2007).
Goppold, et al., "Dynamic Beam Shaping Improves Laser Cutting of Thick Steel Plates", Industrial Photonics, 4:18-19 (Jul. 2017).
Heider, et al., "Process Stabilization at welding Copper by Laser Power Modulation", Physics Procedia 12 (2011), pp. 81-87.
Herwig, et al., "Possibilities of power modulation and dynamic beam shaping", Fraunhofer IWS presentation, 6 pages, retrieved on Mar. 16, 2018.
Jacobs, "Suggested Guidelines for the Handling of Optical Fiber", White Paper, Corning Incorporated, pp. 108 (Dec. 2001).
Keicher, et al., "Advanced 3D Printing of Metals and Electronics using Computational Fluid Dynamics", Solid Freeform Fabrication Symposium, 32 pages (Aug. 2015).
Khairallah, et al., "Laser power-bed fusion additive manufacturing: Effects of main physical processes of dynamical melt flow and pore formation from mesoscopic powder simulation", Lawrence Livermore National Laboratory, 26 pages (Aug. 20, 2015).
Kruth, et al., "On-line monitoring and process control in selective laser melting and laser cutting", Proceedings of the 5th Lane Conference, Laser Assisted Net Shape Engineering, vol. 1, 14 pages (Sep. 1, 2007).
Nazemosadata, et al., "Saturable absorption in multicore fiber couplers", J. Opt. Soc. Am B; vol. 30, No. 11, Nov. 2013, 4 pages.
Neilson, et al., "Free-space optical relay for the interconnection of multimode fibers", Applied Optics, 38: 2291-2296 (Apr. 10, 1999).
Neilson, et al., "Plastic modules for free-space optical interconnects", Applied Optics, 37: 2944-2952 (May 10, 1998).
Optomec, "Enhanced Lens Thermal Imaging Capabilities Introduced by Optomec", OPTOMEC, 4 pages (Jan. 8, 2013).
Purtonen, et al., "Monitoring and Adaptive Control of Laser Processes", Physics Procedia, Elsevier, Amsterdam, NL 56 (9): 1218-1231 (Sep. 9, 2014).
Sateesh, et al., "Effect of Process Parameters on Surface Roughness of Laser Processed Inconel Superalloy", International Journal of Scientific & Engineering Research, 5: 232-236 (Aug. 2014).
Villatoro, et al., "Ultrasensitive vector bending sensor based on multicore optical fiber", Optics Letters, 41: 832-835 (Feb. 15, 2016).
Wang, et al., "Mechanismss and characteristics of spatter generation in SLM processing and its effect on the properties", Materials and Design, 117 (5): 121-130 (Mar. 5, 2017).
Xie, et al., "Correction of the image distortion for laser galvanometric scanning system", Optics & Laser Technology, 37: 305-311 (Jun. 2005).
International Preliminary Report on Patentability for PCT application No. PCT/US18/23009, dated Dec. 5, 2019.
International Preliminary Report on Patentability for PCT Application No. PCT/US18/23012, dated Dec. 5, 2019.
International Preliminary Report on Patentability for PCT Application No. PCT/US18/24958, dated Dec. 5, 2019.
Notice of Allowance for U.S. Appl. No. 15/924,090, dated Jan. 23, 2020.
Notice of Allowance for U.S. Appl. No. 15/939,136, dated Jan. 23,2020.

* cited by examiner

FIBER-BASED OPTICAL MODULATOR

RELATED APPLICATIONS

This application is a continuation in part (CIP) of, and claims the benefit of, U.S. patent application Ser. Nos. 15/607,399, 15/607,410 and 15/607,411, all of which have the title "ADJUSTABLE BEAM CHARACTERISTICS", and all of which were filed on May 26, 2017, and all of which further claim priority to U.S. Provisional Application No. 62/401,650, filed on Sep. 29, 2016, entitled "ALL-FIBER DEVICE FOR VARYING THE BEAM QUALITY OF A LASER". These priority applications are incorporated by reference herein in their entireties for all purposes. This application further claims priority to PCT Application PCT/US17/34848, having the title "ADJUSTABLE BEAM CHARACTERISTICS", and also filed on May 26, 2017, which claims priority to U.S. Provisional Application No. 62/401,650, filed on Sep. 29, 2016, entitled "ALL-FIBER DEVICE FOR VARYING THE BEAM QUALITY OF A LASER". The international application is also incorporated by reference herein in its entirety for all purposes This application is related to U.S. patent application Ser. No. 15/924,090, having the title "FIBER-BASED SATURABLE ABSORBER," and filed on Mar. 16, 2018.

TECHNICAL FIELD

The technology disclosed herein relates to optical modulators. More particularly, the disclosed technology relates to fiber-based optical beam modulation methods, apparatus, and systems.

BACKGROUND

Optical systems have many applications, including communication and materials processing. Such optical systems often employ lasers, for example, fiber lasers, disk lasers, diode lasers, diode-pumped solid state lasers, and lamp-pumped solid state lasers. In these systems, optical power is often delivered by an optical fiber.

An optical modulator is a device often included in an optical system where a parameter or characteristic of the light is to be varied over time. Some modulators are useful for varying an intensity (amplitude) of a light beam exiting the optical modulator. Some such modulators are absorptive modulators and refractive modulators. Some absorptive modulators include a material that has an absorption coefficient which can be manipulated, for example through Franz-Keldysh effect, or the Quantum-confined Stark effect (QCSE). Some refractive modulators include a material that displays an acousto-optic effect where an index of refraction is modulated via an acoustic wave, or a magneto-optic effect where polarization of a material is modulated via a quasistatic magnetic field. Such phase modulation can then be converted into an intensity modulation.

Conventional optical modulators exemplified above typically employ free-space or bulk optical components, which come with an associated cost, increase in optical system complexity, inherent optical losses, and/or reliability constraints. A fiber-based, or "all-fiber," optical modulator is advantageous as eliminating one or more of the constraints associated with free-space optical modulators.

SUMMARY

Disclosed herein is at least methods, systems and apparatus for modulating an optical beam. Methods may include, receiving an optical beam into one or more lengths of fiber. At least one of the lengths of fiber comprises a confinement region that is optically coupled to an optical output. Methods include receiving a control signal, and acting upon the one or more lengths of fiber, in response to the control signal, to modulate a transmittance of the beam through the confinement region from a first transmittance level at a first time instance to a second transmittance level at a second time instance. In some embodiments, acting upon the one or more lengths of fiber reduces an optical power transmitted by the confinement region to the optical output by at least 10% between the first time instance and the second time instance. In some embodiments, acting upon the one or more lengths of fiber further comprises altering a coupling of the optical beam between a first length of the fiber and the confinement region of a second length of the fiber, and/or altering a rate of loss of the optical beam from the confinement region over at least one of the lengths of fiber. In some embodiments where at least one of the lengths of fiber comprising the confinement region further comprises a leakage region having higher optical loss than the confinement region, the action upon the one or more lengths of fiber alters coupling of the optical beam between the confinement and leakage regions. The first level of transmittance is associated with a greater coupling of the optical beam into the confinement region, and a lesser coupling of the optical beam into the leakage region, and the second level of transmittance is associated with a lesser coupling of the optical beam into the confinement region, and a greater coupling of the optical beam into the leakage region. In some embodiments where at least one of the lengths of fiber comprising the confinement region further comprises a leakage region having higher optical loss than the confinement region, the action upon the one or more lengths of fiber alters coupling of the optical beam between the confinement and leakage regions. The first level of transmittance is associated with a greater coupling of the optical beam into the confinement region, and a lesser coupling of the optical beam into the leakage region. The second level of transmittance is associated with a lesser coupling of the optical beam into the confinement region, and a greater coupling of the optical beam into the leakage region. In some such embodiments, the leakage region comprises a non-guiding cladding structure, the confinement region is within the cladding structure, and the cladding structure comprises a material of lower refractive index than that of the confinement region. In some other embodiments the confinement region is a first confinement region, and at least one of the lengths of fiber comprising the first confinement region further comprises a second confinement region that is optically decoupled from the output. Acting upon the one or more lengths of fiber alters coupling of the optical beam between the first and second confinement regions. The first level of transmittance is associated with a greater coupling of the optical beam into the first confinement region and a lesser coupling of the optical beam into the second confinement region. The second level of transmittance is associated with a lesser coupling of the optical beam into the first confinement region and a greater coupling of the optical beam into the second confinement region. In some such embodiments, the first confinement region is separated from the second confinement region by a cladding structure comprising a material having a lower refractive index than that of the first confinement region, and having a lower refractive index than that of the second confinement region. In some of these embodiments, the second confinement region comprises an annular structure co-axial with the first confinement region. In alternative embodiments, the one or more lengths of fiber further comprise a first length of fiber end-coupled with a second length of fiber, and the first length of fiber has a first refractive index profile (RIP) and the second length of fiber has a second RIP. In some such embodiments, the first length of fiber has a graded RIP in at least a radially central portion, and the second length of fiber has a first confinement region comprising a central core and a second confinement region that is annular and encompasses the first confinement region.

In some implementations, methods include energizing an optical gain medium within a resonant optical cavity. An optical beam within the cavity is modulated in response to a control signal. The modulating further comprises temporally varying optical losses within the cavity by acting upon the one or more lengths of fiber within the cavity. At least one of the lengths of fiber within the cavity comprises a confinement region that is optically coupled to the optical gain medium, and acting upon the one or more lengths of fiber modulates a transmittance of the optical beam through the confinement region. At least a portion of the optical beam is coupled out of the resonant cavity. In some such embodiments, acting upon the one or more lengths of fiber modulates a transmittance of the optical beam through the confinement region between a first transmittance level and a second transmittance level to induce pulsed operation of the laser. In some of these embodiments, transmittance of the optical beam between the first and second levels is modulated at a repetition rate sufficient to actively mode-lock the laser. In some other of these embodiments, a difference between the first and second transmittance levels is of a sufficient magnitude to Q-switch lasing within the cavity.

In other implementations, methods include energizing an optical gain medium within a resonant optical cavity and coupling at least a portion of the optical beam out of the cavity. Pulses that exit the cavity are picked in response to a control signal. The picking of pulses may further comprise acting upon one or more lengths of fiber, at least one of which comprises a confinement region. Acting upon the one or more lengths of fiber modulates a transmittance of the optical beam through the confinement region between first and second transmittance levels.

Apparatus disclosed herein include an optical beam modulator, comprising an optical input to receive an optical beam, and one or more lengths of fiber between the optical input and an optical output. At least one of the lengths of fiber comprises a confinement region that is optically coupled to the output. The modulator comprises a perturbation device to modulate, through action upon the one or more lengths of fiber, a transmittance of the beam through the confinement region from a first transmittance level at a first time instance to a second transmittance level at a second time instance. In some embodiments, the modulator comprises a controller input that is coupled to the perturbation device and the perturbation device is operable to act upon the one or more lengths of fiber in response to a control signal received through the controller input. In some modulator examples, optical power transmitted by the confinement region to the optical output at the first time is at least 10% greater than the optical power transmitted through the confinement region to the optical output at the second time.

In some examples, the action upon the one or more lengths of fiber alters a coupling of the optical beam between a first length of the fiber and the confinement region of a second length of the fiber, and/or alters a loss of the optical beam from the confinement region over at least one of the lengths of fiber. In some such examples, the action upon the one or more lengths of fiber alters a coupling of the optical beam into the confinement region. The first level of transmittance is associated with a greater coupling of the optical beam into the confinement region. The second level of transmittance is associated with a lesser coupling of the optical beam into the confinement region. In some other examples, at least one of the lengths of fiber comprising the confinement region further comprises a leakage region having higher optical loss than the confinement region. The action upon the one or more lengths of fiber alters coupling of the optical beam between the confinement and leakage regions. The first level of transmittance is associated with a greater coupling of the optical beam into the confinement region, and a lesser coupling of the optical beam into the leakage region. The second level of transmittance is associated with a lesser coupling of the optical beam into the confinement region, and a greater coupling of the optical beam into the leakage region. In some such examples, the leakage region comprises a non-guiding cladding structure. The confinement region is within the cladding structure. The cladding structure comprises a material of lower refractive index than that of the confinement region. In some other examples, the confinement region is a first confinement region, and at least one of the lengths of fiber comprising the first confinement region further comprises a second confinement region that is optically decoupled from the output. The action upon the one or more lengths of fiber alters coupling of the optical beam between the first and second confinement regions. The first level of transmittance is associated with a greater coupling of the optical beam into the first confinement region and a lesser coupling of the optical beam into the second confinement region. The second level of transmittance is associated with a lesser coupling of the optical beam into the first confinement region and a greater coupling of the optical beam into the second confinement region.

In some of these examples, the first confinement region is separated from the second confinement region by a cladding structure comprising a material having a lower refractive index than that of the first confinement region, and having a lower refractive index than that of the second confinement region. In some of these specific examples the second confinement region comprises an annular structure co-axial with the first confinement region. In other examples the one or more lengths of fiber further comprise a first length of fiber end-coupled with a second length of fiber, and the first length of fiber has a first refractive index profile (RIP) and the second length of fiber has a second RIP. In some of these examples, the first length of fiber has a graded RIP in at least a radially central portion. The second length of fiber has a first confinement region comprising a central core and a second confinement region that is annular and encompasses the first confinement region. For any of the modulators exemplified above, the perturbation device may have at least a first state corresponding to the first level of transmittance and a second state corresponding to the second level of transmittance. The perturbation device may then transition between the first and second states to effect the associated change in transmittance. In some examples, the perturbation device is to transition between the first and second states according to an analog waveform with the transmittance to vary according to a continuous function that includes the first and second levels of transmittance.

Systems disclosed herein may include, an optical beam delivery system, comprising an optical fiber. The optical system may include a modulator devoid of free-space optics. The optical system may include one or more free-space optics configured to receive and transmit an optical beam modulated by the modulator. The optical system may include a laser. The laser may comprise a resonant optical cavity comprising an optical gain medium, and an optical modulator. The laser may comprise any suitable means to energize the optical gain medium. The optical modulator included in the resonant cavity may have one or more lengths of fiber, wherein at least one of the lengths of fiber comprises a confinement region that is optically coupled to the optical gain medium. In some examples, the gain medium comprises fiber, and the energizing means comprises a pump laser. The optical modulator may further include a perturbation device to temporally vary optical losses, in response to a control signal, within the cavity through action upon the one or more lengths of fiber that modulates a transmittance of the optical beam through the confinement region. The optical system may further include an output coupler to couple at least a portion of an optical beam out of the cavity. In some examples, the perturbation device temporally modulates the transmittance of the optical beam between the first and second levels at a repetition rate to actively mode-lock the laser. In some such examples, a difference between the first and second transmittance levels is of a sufficient magnitude to Q-switch the laser. In other examples an optical system includes a laser with a output coupler that is coupled to an optical modulator. The optical modulator may for such examples pick pulses that exit the output coupler. Picked pulses may then be propagated through the system.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

Figure 1:
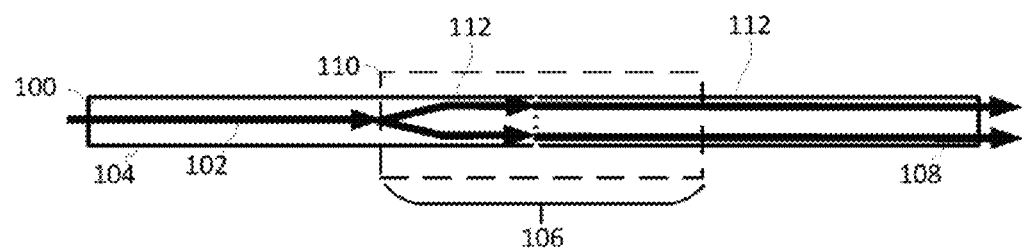
FIG. 1 illustrates an example fiber structure for providing a laser beam having variable beam characteristics.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Reference throughout this specification to "an embodiment" or "one embodiment" or "some embodiments" means that a particular feature, structure, function, or characteristic described in connection with the embodiment is included in at least one embodiment. Thus, the appearances of the phrase "in an embodiment" or "in one embodiment" or "some embodiments" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

A "device" may generally refer to an apparatus according to the context of the usage of that term. For example, a device may refer to a stack of layers or structures, a single structure or layer, a connection of various structures having active and/or passive elements, etc. Generally a device is a three dimensional structure with a lateral x-y plane and a height along the z direction within an x-y-z Cartesian coordinate system. The plane of the device may also be the plane of an apparatus, which comprises the device.

Unless otherwise specified the use of the ordinal adjectives "first," "second," and "third," etc., to describe a common object, merely indicates that different instances of like objects are being referred to, and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B, and C.

Definitions

Definitions of words and terms as used herein:
1. The term "beam characteristics" refers to one or more of the following terms used to describe an optical beam. In general, the beam characteristics of most interest depend on the specifics of the application or optical system.
2. The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes.
3. The term "spot size" is the radial distance (radius) from the center point of maximum irradiance to the $1/e^2$ point.
4. The term "beam divergence distribution" is the power vs. the full cone angle. This quantity is sometimes called the "angular distribution" or "NA distribution."
5. The term "beam parameter product" (BPP) of a laser beam is defined as the product of the beam radius (measured at the beam waist) and the beam divergence half-angle (measured in the far field). The units of BPP are typically mm-mrad.
6. A "confinement fiber" is defined to be a fiber that possesses one or more confinement regions, wherein a confinement region comprises a higher-index region (core region) surrounded by a lower-index region (cladding region). The RIP of a confinement fiber may include one or more higher-index regions (core regions) surrounded by lower-index regions (cladding regions), wherein light is guided in the higher-index regions. Each confinement region and each cladding region can have any RIP, including but not limited to step-index and graded-index. The confinement regions may or may not be concentric and may be a variety of shapes such as circular, annular, polygonal, arcuate, elliptical, or irregular, or the like or any combination thereof. The confinement regions in a particular confinement fiber may all have the same shape or may be different shapes. Moreover, confinement regions may be co-axial or may have offset axes with respect to one another. Confinement regions may be of uniform thickness about a central axis in the longitudinal direction, or the thicknesses may vary about the central axis in the longitudinal direction.
7. The term "intensity distribution" refers to optical intensity as a function of position along a line (1D profile) or on a plane (2D profile). The line or plane is usually taken perpendicular to the propagation direction of the light. It is a quantitative property.
8. "Luminance" is a photometric measure of the luminous intensity per unit area of light travelling in a given direction.

9. "M² factor" (also called "beam quality factor" or "beam propagation factor") is a dimensionless parameter for quantifying the beam quality of laser beams, with $M^2=1$ being a diffraction-limited beam, and larger $M^2$ values corresponding to lower beam quality. $M^2$ is equal to the BPP divided by $\lambda/\pi$, where $\lambda$ is the wavelength of the beam in microns (if BPP is expressed in units of mm-mrad).
10. The term "numerical aperture" or "NA" of an optical system is a dimensionless number that characterizes the range of angles over which the system can accept or emit light.
11. The term "optical intensity" is not an official (SI) unit, but is used to denote incident power per unit area on a surface or passing through a plane.
12. The term "power density" refers to optical power per unit area, although this is also referred to as "optical intensity" and "fluence."
13. The term "radial beam position" refers to the position of a beam in a fiber measured with respect to the center of the fiber core in a direction perpendicular to the fiber axis.
14. The term "radiance" is the radiation emitted per unit solid angle in a given direction by a unit area of an optical source (e.g., a laser). Radiance may be altered by changing the beam intensity distribution and/or beam divergence profile or distribution. The ability to vary the radiance profile of a laser beam implies the ability to vary the BPP.
15. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle.
16. A "step-index fiber" has a RIP that is flat (refractive index independent of position) within the fiber core.
17. A "graded-index fiber" has a RIP in which the refractive index decreases with increasing radial position (i.e., with increasing distance from the center of the fiber core).
18. A "parabolic-index fiber" is a specific case of a graded-index fiber in which the refractive index decreases quadratically with increasing distance from the center of the fiber core.
19. A "modulator" is a device that modulates an intensity or amplitude of an optical beam.
20. The term "optical power" is energy per unit time, as is delivered by a laser beam, for example.

Fiber for Varying Beam Characteristics

Disclosed herein are methods, systems, and apparatus configured to provide a fiber operable to provide a laser beam having variable beam characteristics (VBC) that may reduce cost, complexity, optical loss, or other drawbacks of the conventional methods described above. This VBC fiber is configured to vary a wide variety of optical beam characteristics. Such beam characteristics can be controlled using the VBC fiber thus allowing users to tune various beam characteristics to suit the particular requirements of an extensive variety of laser processing applications. For example, a VBC fiber may be used to tune: beam diameter, beam divergence distribution, BPP, intensity distribution, $M^2$ factor, NA, optical intensity, power density, radial beam position, radiance, spot size, or the like, or any combination thereof.

In general, the disclosed technology entails coupling a laser beam into a fiber in which the characteristics of the laser beam in the fiber can be adjusted by perturbing the laser beam and/or perturbing a first length of fiber by any of a variety of methods (e.g., bending the fiber or introducing one or more other perturbations) and fully or partially maintaining adjusted beam characteristics in a second length of fiber. The second length of fiber is specially configured to maintain and/or further modify the adjusted beam characteristics. In some cases, the second length of fiber preserves the adjusted beam characteristics through delivery of the laser beam to its ultimate use (e.g., materials processing). The first and second lengths of fiber may comprise the same or different fibers.

The disclosed technology is compatible with fiber lasers and fiber-coupled lasers. Fiber-coupled lasers typically deliver an output via a delivery fiber having a step-index refractive index profile (RIP), i.e., a flat or constant refractive index within the fiber core. In reality, the RIP of the delivery fiber may not be perfectly flat, depending on the design of the fiber. Important parameters are the fiber core diameter ($d_{core}$) and NA. The core diameter is typically in the range of 10-1000 micron (although other values are possible), and the NA is typically in the range of 0.06-0.22 (although other values are possible). A delivery fiber from the laser may be routed directly to the process head or work piece, or it may be routed to a fiber-to-fiber coupler (FFC) or fiber-to-fiber switch (FFS), which couples the light from the delivery fiber into a process fiber that transmits the beam to the process head or the work piece.

Most materials processing tools, especially those at high power (>1 kW), employ multimode (MM) fiber, but some employ single-mode (SM) fiber, which is at the lower end of the $d_{core}$ and NA ranges. The beam characteristics from a SM fiber are uniquely determined by the fiber parameters. The beam characteristics from a MM fiber, however, can vary (unit-to-unit and/or as a function of laser power and time), depending on the beam characteristics from the laser source(s) coupled into the fiber, the launching or splicing conditions into the fiber, the fiber RIP, and the static and dynamic geometry of the fiber (bending, coiling, motion, micro-bending, etc.). For both SM and MM delivery fibers, the beam characteristics may not be optimum for a given materials processing task, and it is unlikely to be optimum for a range of tasks, motivating the desire to be able to systematically vary the beam characteristics in order to customize or optimize them for a particular processing task.

In one example, the VBC fiber may have a first length and a second length and may be configured to be interposed as an in-fiber device between the delivery fiber and the process head to provide the desired adjustability of the beam characteristics. To enable adjustment of the beam, a perturbation device and/or assembly is disposed in close proximity to and/or coupled with the VBC fiber and is responsible for perturbing the beam in a first length such that the beam's characteristics are altered in the first length of fiber, and the altered characteristics are preserved or further altered as the beam propagates in the second length of fiber. The perturbed beam is launched into a second length of the VBC fiber configured to conserve adjusted beam characteristics. The first and second lengths of fiber may be the same or different fibers and/or the second length of fiber may comprise a confinement fiber. The beam characteristics that are conserved by the second length of VBC fiber may include any of: beam diameter, beam divergence distribution, BPP, intensity distribution, luminance, M2 factor, NA, optical intensity, power density, radial beam position, radiance, spot size, or the like, or any combination thereof.

FIG. 1 illustrates an example VBC fiber 100 for providing a laser beam having variable beam characteristics without requiring the use of free-space optics to change the beam characteristics. VBC fiber 100 comprises a first length of fiber 104 and a second length of fiber 108. First length of fiber 104 and second length of fiber 108 may be the same or different fibers and may have the same or different RIPs. The first length of fiber 104 and the second length of fiber 108 may be joined together by a splice. First length of fiber 104 and second length of fiber 108 may be coupled in other ways, may be spaced apart, or may be connected via an interposing component such as another length of fiber, free-space optics, glue, index-matching material, or the like or any combination thereof.

A perturbation device 110 is disposed proximal to and/or envelops perturbation region 106. Perturbation device 110 may be a device, assembly, in-fiber structure, and/or other feature. Perturbation device 110 at least perturbs optical beam 102 in first length of fiber 104 or second length of fiber 108 or a combination thereof in order to adjust one or more beam characteristics of optical beam 102. Adjustment of beam 102 responsive to perturbation by perturbation device 110 may occur in first length of fiber 104 or second length of fiber 108 or a combination thereof. Perturbation region 106 may extend over various widths and may or may not extend into a portion of second length of fiber 108. As beam 102 propagates in VBC fiber 100, perturbation device 110 may physically act on VBC fiber 100 to perturb the fiber and adjust the characteristics of beam 102. Alternatively, perturbation device 110 may act directly on beam 102 to alter its beam characteristics. Subsequent to being adjusted, perturbed beam 112 has different beam characteristics than beam 102, which will be fully or partially conserved in second length of fiber 108. In another example, perturbation device 110 need not be disposed near a splice. Moreover, a splice may not be needed at all, for example VBC fiber 100 may be a single fiber, first length of fiber and second length of fiber could be spaced apart, or secured with a small gap (air-spaced or filled with an optical material, such as optical cement or an index-matching material).

Perturbed beam 112 is launched into second length of fiber 108, where perturbed beam 112 characteristics are largely maintained or continue to evolve as perturbed beam 112 propagates yielding the adjusted beam characteristics at the output of second length of fiber 108. In one example, the new beam characteristics may include an adjusted intensity distribution. In an example, an altered beam intensity distribution will be conserved in various structurally bounded confinement regions of second length of fiber 108. Thus, the beam intensity distribution may be tuned to a desired beam intensity distribution optimized for a particular laser processing task. In general, the intensity distribution of perturbed beam 112 will evolve as it propagates in the second length of fiber 108 to fill the confinement region(s) into which perturbed beam 112 is launched responsive to conditions in first length of fiber 104 and perturbation caused by perturbation device 110. In addition, the angular distribution may evolve as the beam propagates in the second fiber, depending on launch conditions and fiber characteristics. In general, fibers largely preserve the input divergence distribution, but the distribution can be broadened if the input divergence distribution is narrow and/or if the fiber has irregularities or deliberate features that perturb the divergence distribution. The various confinement regions, perturbations, and fiber features of second length of fiber 108 are described in greater detail below. Beams 102 and 112 are conceptual abstractions intended to illustrate how a beam may propagate through a VBC fiber 100 for providing variable beam characteristics and are not intended to closely model the behavior of a particular optical beam.

VBC fiber 100 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). VBC fiber 100 may comprise a variety of materials. For example, VBC fiber 100 may comprise $SiO_2$, $SiO_2$ doped with $GeO_2$, germanosilicate, phosphorus pentoxide, phosphosilicate, $Al_2O_3$, aluminosilicate, or the like or any combinations thereof. Confinement regions may be bounded by cladding doped with fluorine, boron, or the like or any combinations thereof. Other dopants may be added to active fibers, including rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. Confinement regions may be bounded by cladding having a lower index than the confinement region with fluorine or boron doping. Alternatively, VBC fiber 100 may comprise photonic crystal fibers or micro-structured fibers.

VBC fiber 100 is suitable for use in any of a variety of fiber, fiber optic, or fiber laser devices, including continuous wave and pulsed fiber lasers, disk lasers, solid state lasers, or diode lasers (pulse rate unlimited except by physical constraints). Furthermore, implementations in a planar waveguide or other types of waveguides and not just fibers are within the scope of the claimed technology.

Figure 2:
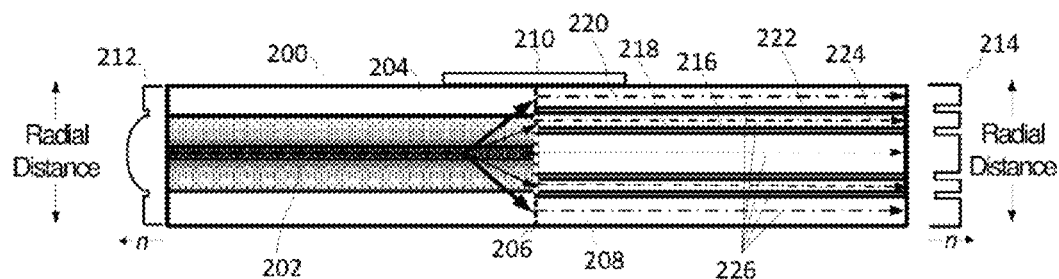
FIG. 2 depicts a cross-sectional view of an example fiber structure for delivering a beam with variable beam characteristics.

FIG. 2 depicts a cross-sectional view of an example VBC fiber 200 for adjusting beam characteristics of an optical beam. In an example, VBC fiber 200 may be a process fiber because it may deliver the beam to a process head for material processing. VBC fiber 200 comprises a first length of fiber 204 spliced at junction 206 to a second length of fiber 208. A perturbation assembly 210 is disposed proximal to junction 206. Perturbation assembly 210 may be any of a variety of devices configured to enable adjustment of the beam characteristics of an optical beam 202 propagating in VBC fiber 200. In an example, perturbation assembly 210 may be a mandrel and/or another device that may provide means of varying the bend radius and/or bend length of VBC fiber 200 near the splice. Other examples of perturbation devices are discussed below with respect to FIG. 24.

In an example, first length of fiber 204 has a parabolic-index RIP 212 as indicated by the left RIP graph. Most of the intensity distribution of beam 202 is concentrated in the center of fiber 204 when fiber 204 is straight or nearly straight. Second length of fiber 208 is a confinement fiber having RIP 214 as shown in the right RIP graph. Second length of fiber 208 includes confinement regions 216, 218 and 220. Confinement region 216 is a central core surrounded by two annular (or ring-shaped) confinement regions 218 and 220. Layers 222 and 224 are structural barriers of lower index material between confinement regions (216, 218 and 220), commonly referred to as "cladding" regions. In one example, layers 222 and 224 may comprise rings of fluorosilicate; in some embodiments, the fluorosilicate cladding layers are relatively thin. Other materials may be used as well and claimed subject matter is not limited in this regard.

In an example, as beam 202 propagates along VBC fiber 200, perturbation assembly 210 may physically act on fiber 208 and/or beam 202 to adjust its beam characteristics and generate adjusted beam 226. In the current example, the intensity distribution of beam 202 is modified by perturbation assembly 210. Subsequent to adjustment of beam 202 the intensity distribution of adjusted beam 226 may be concentrated in outer confinement regions 218 and 220 with relatively little intensity in the central confinement region 216. Because each of confinement regions 216, 218, and/or 220 is isolated by the thin layers of lower index material in barrier layers 222 and 224, second length of fiber 208 can substantially maintain the adjusted intensity distribution of adjusted beam 226. The beam will typically become distributed azimuthally within a given confinement region but will not transition (significantly) between the confinement regions as it propagates along the second length of fiber 208. Thus, the adjusted beam characteristics of adjusted beam 226 are largely conserved within the isolated confinement regions 216, 218, and/or 220. In some cases, it be may desirable to have the beam 226 power divided among the confinement regions 216, 218, and/or 220 rather than concentrated in a single region, and this condition may be achieved by generating an appropriately adjusted beam 226.

In one example, core confinement region 216 and annular confinement regions 218 and 220 may be composed of fused silica glass, and cladding 222 and 224 defining the confinement regions may be composed of fluorosilicate glass. Other materials may be used to form the various confinement regions (216, 218 and 220), including germanosilicate, phosphosilicate, aluminosilicate, or the like, or a combination thereof and claimed subject matter is not so limited. Other materials may be used to form the barrier rings (222 and 224), including fused silica, borosilicate, or the like or a combination thereof, and claimed subject matter is not so limited. In other embodiments, the optical fibers or waveguides include or are composed of various polymers or plastics or crystalline materials. Generally, the core confinement regions have refractive indices that are greater than the refractive indices of adjacent barrier/cladding regions.

In some examples, it may be desirable to increase a number of confinement regions in a second length of fiber to increase granularity of beam control over beam displacements for fine-tuning a beam profile. For example, confinement regions may be configured to provide stepwise beam displacement.

Figure 3:
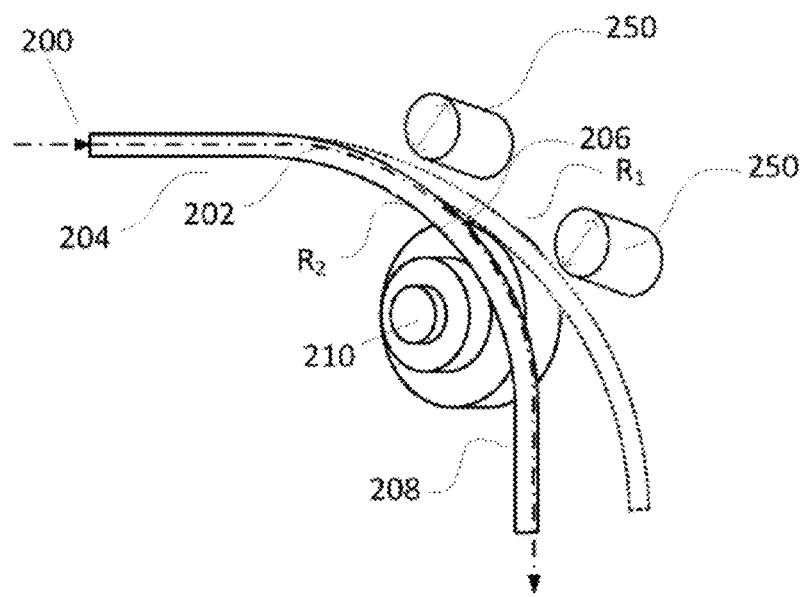
FIG. 3 illustrates an example method of perturbing a fiber structure for providing a beam having variable beam characteristics.

FIG. 3 illustrates an example method of perturbing fiber 200 for providing variable beam characteristics of an optical beam. Changing the bend radius of a fiber may change the radial beam position, divergence angle, and/or radiance profile of a beam within the fiber. The bend radius of VBC fiber 200 can be decreased from a first bend radius $R_1$ to a second bend radius $R_2$ about splice junction 206 by using a stepped mandrel or cone as the perturbation assembly 210. Additionally or alternatively, the engagement length on the mandrel(s) or cone can be varied. Rollers 250 may be employed to engage VBC fiber 200 across perturbation assembly 210. In an example, an amount of engagement of rollers 250 with fiber 200 has been shown to shift the distribution of the intensity profile to the outer confinement regions 218 and 220 of fiber 200 with a fixed mandrel radius. There are a variety of other methods for varying the bend radius of fiber 200, such as using a clamping assembly, flexible tubing, or the like, or a combination thereof, and claimed subject matter is not limited in this regard. In another example, for a particular bend radius the length over which VBC fiber 200 is bent can also vary beam characteristics in a controlled and reproducible way. In examples, changing the bend radius and/or length over which the fiber is bent at a particular bend radius also modifies the intensity distribution of the beam such that one or more modes may be shifted radially away from the center of a fiber core.

Maintaining the bend radius of the fibers across junction 206 ensures that the adjusted beam characteristics such as radial beam position and radiance profile of optical beam 202 will not return to beam 202's unperturbed state before being launched into second length of fiber 208. Moreover, the adjusted radial beam characteristics, including position, divergence angle, and/or intensity distribution, of adjusted beam 226 can be varied based on an extent of decrease in the bend radius and/or the extent of the bent length of VBC fiber 200. Thus, specific beam characteristics may be obtained using this method.

In the current example, first length of fiber 204 having first RIP 212 is spliced at junction 206 to a second length of fiber 208 having a second RIP 214. However, it is possible to use a single fiber having a single RIP formed to enable perturbation (e.g., by micro-bending) of the beam characteristics of beam 202 and also to enable conservation of the adjusted beam. Such a RIP may be similar to the RIPs shown in fibers illustrated in FIGS. 17, 18, and/or 19.

Figure 4:
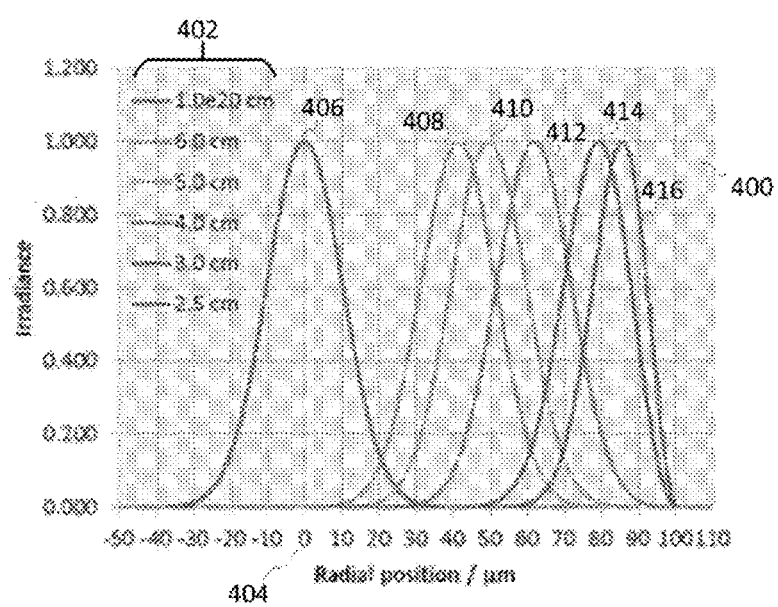
FIG. 4 is a graph illustrating the calculated spatial profile of the lowest-order mode (LP01) for a first length of a fiber for different fiber bend radii.
Figure 5:
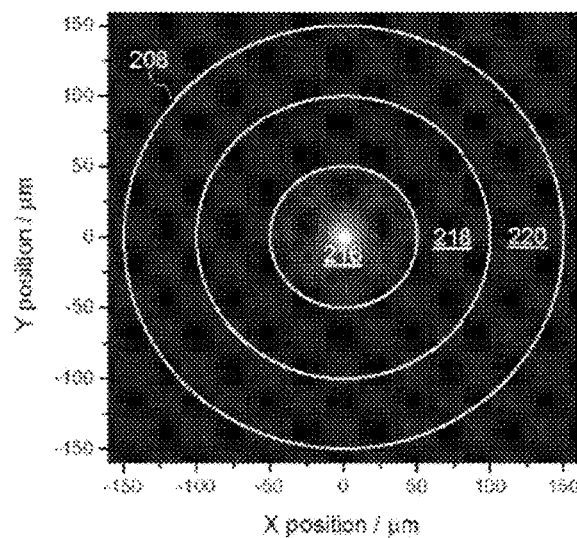
FIG. 5 illustrates an example of a two-dimensional intensity distribution at a junction when a fiber for varying beam characteristics is nearly straight.
Figure 6:
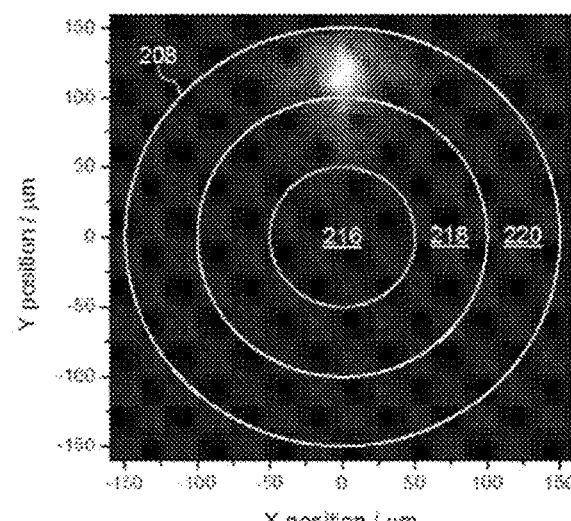
FIG. 6 illustrates an example of a two-dimensional intensity distribution at a junction when a fiber for varying beam characteristics is bent with a radius chosen to preferentially excite a particular confinement region of a second length of fiber.

FIGS. 7-10 provide experimental results for VBC fiber 200 (shown in FIGS. 2 and 3) and illustrate further a beam response to perturbation of VBC fiber 200 when a perturbation assembly 210 acts on VBC fiber 200 to bend the fiber. FIGS. 4-6 are simulations and FIGS. 7-10 are experimental results wherein a beam from a SM 1050 nm source was launched into an input fiber (not shown) with a 40 micron core diameter. The input fiber was spliced to first length of fiber 204.

FIG. 4 is an example graph 400 illustrating the calculated profile of the lowest-order mode ($LP_{01}$) for a first length of fiber 204 for different fiber bend radii 402, wherein a perturbation assembly 210 involves bending VBC fiber 200. As the fiber bend radius is decreased, an optical beam propagating in VBC fiber 200 is adjusted such that the mode shifts radially away from the center 404 of a VBC fiber 200 core (r=0 micron) toward the core/cladding interface (located at r=100 micron in this example). Higher-order modes ($LP_{1n}$) also shift with bending. Thus, a straight or nearly straight fiber (very large bend radius), curve 406 for $LP_{01}$ is centered at or near the center of VBC fiber 200. At a bend radius of about 6 cm, curve 408 for $LP_{01}$ is shifted to a radial position of about 40 μm from the center 406 of VBC fiber 200. At a bend radius of about 5 cm, curve 410 for $LP_{01}$ is shifted to a radial position about 50 μm from the center 406 of VBC fiber 200. At a bend radius of about 4 cm, curve 412 for $LP_{01}$ is shifted to a radial position about 60 μm from the center 406 of VBC fiber 200. At a bend radius of about 3 cm, curve 414 for $LP_{01}$ is shifted to a radial position about 80 μm from the center 406 of VBC fiber 200. At a bend radius of about 2.5 cm, a curve 416 for $LP_{01}$ is shifted to a radial position about 85 μm from the center 406 of VBC fiber 200. Note that the shape of the mode remains relatively constant (until it approaches the edge of the core), which is a specific property of a parabolic RIP. Although, this property may be desirable in some situations, it is not required for the VBC functionality, and other RIPs may be employed.

In an example, if VBC fiber 200 is straightened, $LP_{01}$ mode will shift back toward the center of the fiber. Thus, the purpose of second length of fiber 208 is to "trap" or confine the adjusted intensity distribution of the beam in a confinement region that is displaced from the center of the VBC fiber 200. The splice between fibers 204 and 208 is included in the bent region, thus the shifted mode profile will be preferentially launched into one of the ring-shaped confinement regions 218 and 220 or be distributed among the confinement regions. FIGS. 5 and 6 illustrate this effect.

FIG. 5 illustrates an example two-dimensional intensity distribution at junction 206 within second length of fiber 208 when VBC fiber 200 is nearly straight. A significant portion of $LP_{01}$ and $LP_{1n}$ are within confinement region 216 of fiber 208. FIG. 6 illustrates the two-dimensional intensity distribution at junction 206 within second length of fiber 208 when VBC fiber 200 is bent with a radius chosen to preferentially excite confinement region 220 (the outermost confinement region) of second length of fiber 208. A significant portion of $LP_{01}$ and $LP_{1n}$ are within confinement region 220 of fiber 208.

In an example, second length of fiber 208 confinement region 216 has a 100 micron diameter, confinement region 218 is between 120 micron and 200 micron in diameter, and confinement region 220 is between 220 micron and 300 micron diameter. Confinement regions 216, 218, and 220 are separated by 10 um thick rings of fluorosilicate, providing an NA of 0.22 for the confinement regions. Other inner and outer diameters for the confinement regions, thicknesses of the rings separating the confinement regions, NA values for the confinement regions, and numbers of confinement regions may be employed.

Referring again to FIG. 5, with the noted parameters, when VBC fiber 200 is straight about 90% of the power is contained within the central confinement region 216, and about 100% of the power is contained within confinement regions 216 and 218. Referring now to FIG. 6, when fiber 200 is bent to preferentially excite second ring confinement region 220, nearly 75% of the power is contained within confinement region 220, and more than 95% of the power is contained within confinement regions 218 and 220. These calculations include $LP_{01}$ and two higher-order modes, which is typical in some 2-4 kW fiber lasers.

It is clear from FIGS. 5 and 6 that in the case where a perturbation assembly 210 acts on VBC fiber 200 to bend the fiber, the bend radius determines the spatial overlap of the modal intensity distribution of the first length of fiber 204 with the different guiding confinement regions (216, 218, and 220) of the second length of fiber 208. Changing the bend radius can thus change the intensity distribution at the output of the second length of fiber 208, thereby changing the diameter or spot size of the beam, and thus also changing its radiance and BPP value. This adjustment of the spot size may be accomplished in an all-fiber structure, involving no free-space optics and consequently may reduce or eliminate the disadvantages of free-space optics discussed above. Such adjustments can also be made with other perturbation assemblies that alter bend radius, bend length, fiber tension, temperature, or other perturbations discussed below.

In a typical materials processing system (e.g., a cutting or welding tool), the output of the process fiber is imaged at or near the work piece by the process head. Varying the intensity distribution as shown in FIGS. 5 and 6 thus enables variation of the beam profile at the work piece in order to tune and/or optimize the process, as desired. Specific RIPs for the two fibers were assumed for the purpose of the above calculations, but other RIPs are possible, and claimed subject matter is not limited in this regard.

FIGS. 7-10 depict experimental results (measured intensity distributions) to illustrate further output beams for various bend radii of VBC fiber 200 shown in FIG. 2.

Figure 7:
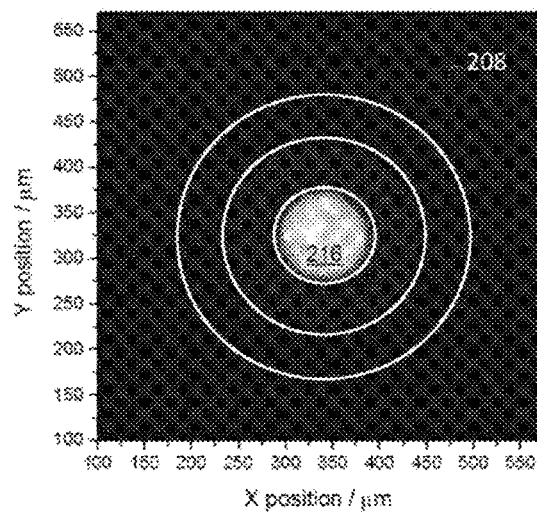
FIGS. 7-10 depict experimental results to illustrate further output beams for various bend radii of a fiber for varying beam characteristics shown in FIG. 2.
Figure 8:
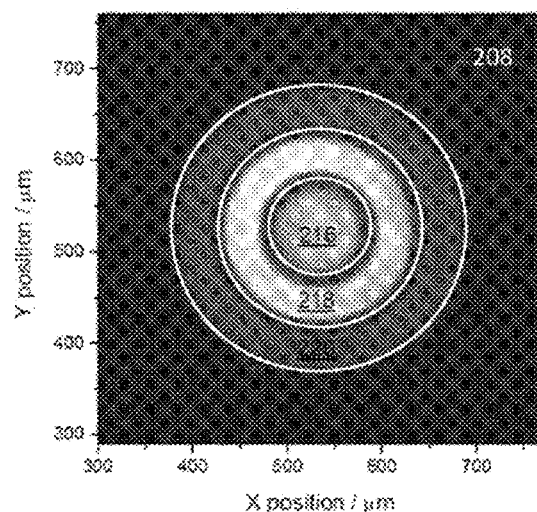
Figure 9:
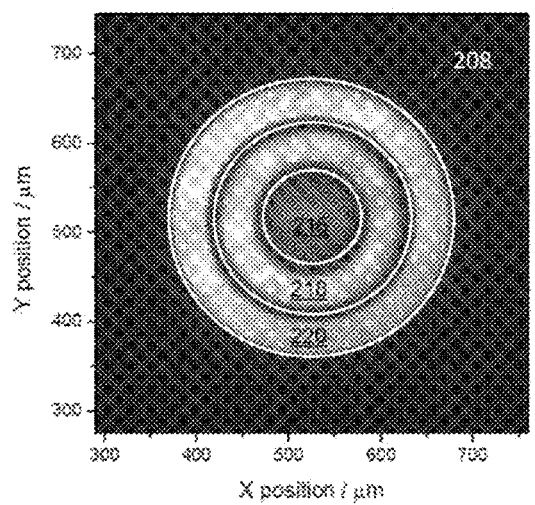
Figure 10:
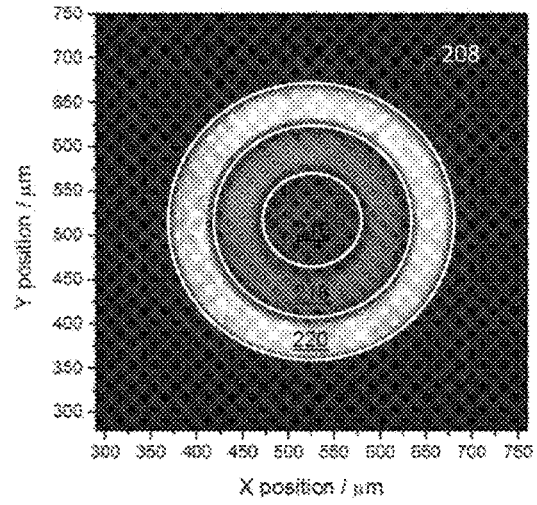

In FIG. 7 when VBC fiber 200 is straight, the beam is nearly completely confined to confinement region 216. As the bend radius is decreased, the intensity distribution shifts to higher diameters (FIGS. 8-10). FIG. 8 depicts the intensity distribution when the bend radius of VBC fiber 200 is chosen to shift the intensity distribution preferentially to confinement region 218. FIG. 9 depicts the experimental results when the bend radius is further reduced and chosen to shift the intensity distribution outward to confinement region 220 and confinement region 218. In FIG. 10, at the smallest bend radius, the beam is nearly a "donut mode", with most of the intensity in the outermost confinement region 220.

Despite excitation of the confinement regions from one side at the splice junction 206, the intensity distributions are nearly symmetric azimuthally because of scrambling within confinement regions as the beam propagates within the VBC fiber 200. Although the beam will typically scramble azimuthally as it propagates, various structures or perturbations (e.g., coils) could be included to facilitate this process.

For the fiber parameters used in the experiment shown in FIGS. 7-10, particular confinement regions were not exclusively excited because some intensity was present in multiple confinement regions. This feature may enable advantageous materials processing applications that are optimized by having a flatter or distributed beam intensity distribution. In applications requiring cleaner excitation of a given confinement region, different fiber RIPs could be employed to enable this feature.

The results shown in FIGS. 7-10 pertain to the particular fibers used in this experiment, and the details will vary depending on the specifics of the implementation. In particular, the spatial profile and divergence distribution of the output beam and their dependence on bend radius will depend on the specific RIPs employed, on the splice parameters, and on the characteristics of the laser source launched into the first fiber.

Different fiber parameters than those shown in FIG. 2 may be used and still be within the scope of the claimed subject matter. Specifically, different RIPs and core sizes and shapes may be used to facilitate compatibility with different input beam profiles and to enable different output beam characteristics. Example RIPs for the first length of fiber, in addition to the parabolic-index profile shown in FIG. 2, include other graded-index profiles, step-index, pedestal designs (i.e., nested cores with progressively lower refractive indices with increasing distance from the center of the fiber), and designs with nested cores with the same refractive index value but with various NA values for the central core and the surrounding rings. Example RIPs for the second length of fiber, in addition to the profile shown in FIG. 2, include confinement fibers with different numbers of confinement regions, non-uniform confinement-region thicknesses, different and/or non-uniform values for the thicknesses of the rings surrounding the confinement regions, different and/or non-uniform NA values for the confinement regions, different refractive-index values for the high-index and low-index portions of the RIP, non-circular confinement regions (such as elliptical, oval, polygonal, square, rectangular, or combinations thereof), as well as other designs as discussed in further detail with respect to FIGS. 26-28. Furthermore, VBC fiber 200 and other examples of a VBC fiber described herein are not restricted to use of two fibers. In some examples, implementation may include use of one fiber or more than two fibers. In some cases, the fiber(s) may not be axially uniform; for example, they could include fiber Bragg gratings or long-period gratings, or the diameter could vary along the length of the fiber. In addition, the fibers do not have to be azimuthally symmetric, e.g., the core(s) could have square or polygonal shapes. Various fiber coatings (buffers) may be employed, including high-index or index-matched coatings (which strip light at the glass-polymer interface) and low-index coatings (which guide light by total internal reflection at the glass-polymer interface). In some examples, multiple fiber coatings may be used on VBC fiber 200.

FIGS. 11-16 illustrate cross-sectional views of examples of first lengths of fiber for enabling adjustment of beam characteristics in a VBC fiber responsive to perturbation of an optical beam propagating in the first lengths of fiber. Some examples of beam characteristics that may be adjusted in the first length of fiber are: beam diameter, beam divergence distribution, BPP, intensity distribution, luminance, $M^2$ factor, NA, optical intensity profile, power density profile, radial beam position, radiance, spot size, or the like, or any combination thereof. The first lengths of fiber depicted in FIGS. 11-16 and described below are merely examples and do not provide an exhaustive recitation of the variety of first lengths of fiber that may be utilized to enable adjustment of beam characteristics in a VBC fiber assembly. Selection of materials, appropriate RIPs, and other variables for the first lengths of fiber illustrated in FIGS. 11-16 at least depend on a desired beam output. A wide variety of fiber variables are contemplated and are within the scope of the claimed subject matter. Thus, claimed subject matter is not limited by examples provided herein.

Figure 11:
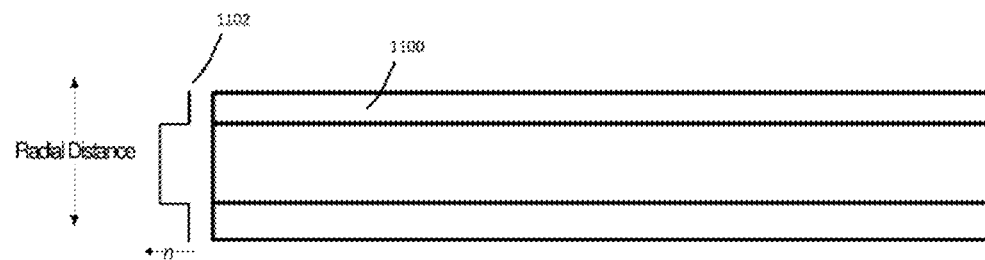
FIGS. 11-16 illustrate cross-sectional views of example first lengths of fiber for enabling adjustment of beam characteristics in a fiber assembly.
Figure 12:
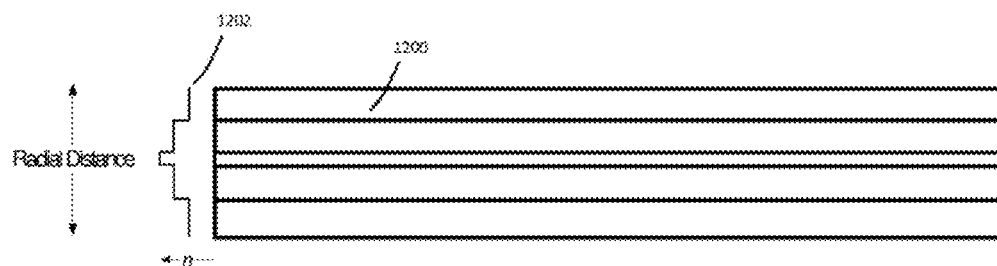
Figure 13:
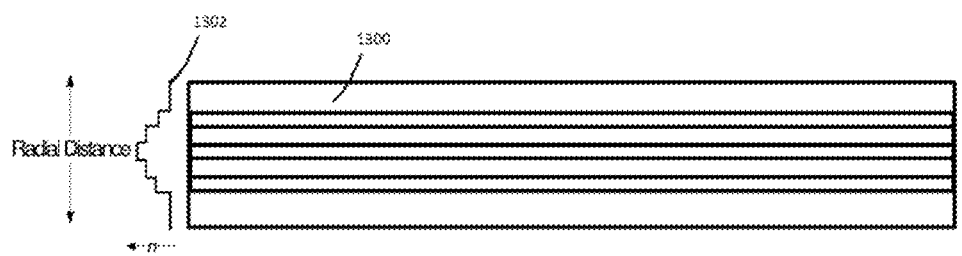

In FIG. 11 first length of fiber 1100 comprises a step-index profile 1102. FIG. 12 illustrates a first length of fiber 1200 comprising a "pedestal RIP" (i.e., a core comprising a step-index region surrounded by a larger step-index region) 1202. FIG. 13 illustrates first length of fiber 1300 comprising a multiple-pedestal RIP 1302.

Figure 14A:
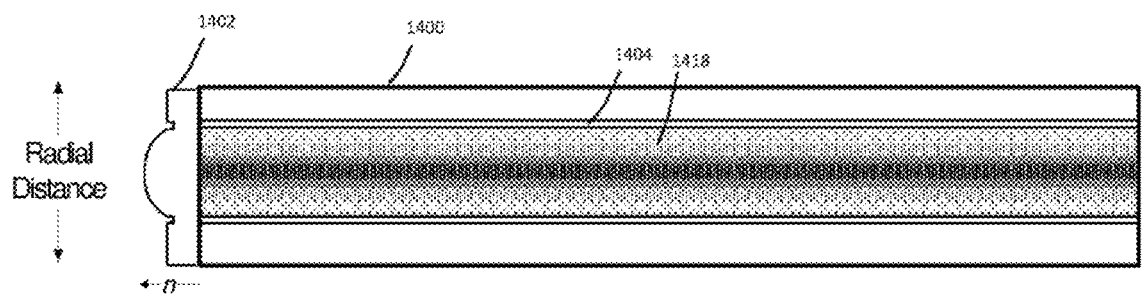

FIG. 14A illustrates first length of fiber 1400 comprising a graded-index profile 1418 surrounded by a down-doped region 1404. When the fiber 1400 is perturbed, modes may shift radially outward in fiber 1400 (e.g., during bending of fiber 1400). Graded-index profile 1402 may be designed to promote maintenance or even compression of modal shape. This design may promote adjustment of a beam propagating in fiber 1400 to generate a beam having a beam intensity distribution concentrated in an outer perimeter of the fiber (i.e., in a portion of the fiber core that is displaced from the fiber axis). As described above, when the adjusted beam is coupled into a second length of fiber having confinement regions, the intensity distribution of the adjusted beam may be trapped in the outermost confinement region, providing a donut shaped intensity distribution. A beam spot having a narrow outer confinement region may be useful to enable certain material processing actions.

Figure 14B:
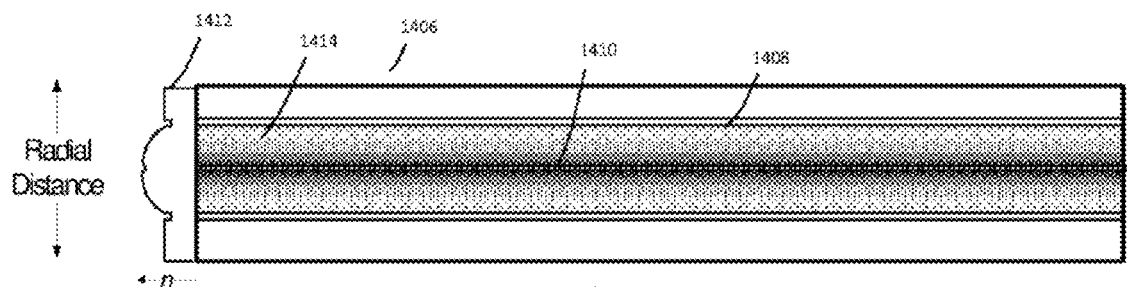

FIG. 14B illustrates first length of fiber 1406 comprising a graded-index profile 1414 surrounded by a down-doped region 1408 similar to fiber 1400. However, fiber 1406 includes a divergence structure 1410 (a lower-index region) as can be seen in profile 1412. The divergence structure 1410 is an area of material with a lower refractive index than that of the surrounding core. As the beam is launched into first length of fiber 1406, refraction from divergence structure 1410 causes the beam divergence to increase in first length of fiber 1406. The amount of increased divergence depends on the amount of spatial overlap of the beam with the divergence structure 1410 and the magnitude of the index difference between the divergence structure 1410 and the core material. Divergence structure 1410 can have a variety of shapes, depending on the input divergence distribution and desired output divergence distribution. In an example, divergence structure 1410 has a triangular or graded index shape.

Figure 15:
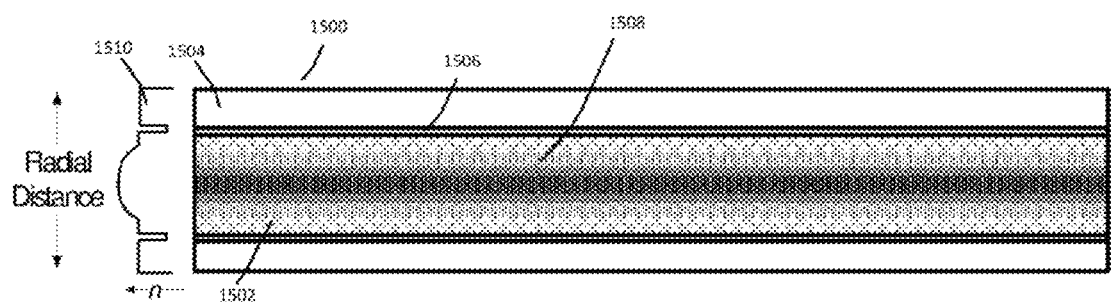

FIG. 15 illustrates a first length of fiber 1500 comprising a parabolic-index central region 1502 surrounded by a constant-index region 1504, and the constant-index region 1504 is surrounded by a lower-index annular layer 1506. The lower-index annulus 1506 helps guide a beam propagating in fiber 1500. When the propagating beam is perturbed, modes shift radially outward in fiber 1500 (e.g., during bending of fiber 1500). As one or more modes shift radially outward, parabolic-index region 1502 promotes retention of modal shape. When the modes reach the constant-index region of the RIP 1510, they will be compressed against the low-index ring 1506, which may cause preferential excitation of the outermost confinement region in the second fiber (in comparison to the first fiber RIP shown in FIG. 14). In one implementation, this fiber design works with a confinement fiber having a central step-index core and a single annular core. The parabolic-index portion 1502 of the RIP overlaps with the central step-index core of the confinement fiber. The constant-index portion 1504 overlaps with the annular core of the confinement fiber. The constant-index portion 1504 of the first fiber is intended to make it easier to move the beam into overlap with the annular core by bending. This fiber design also works with other designs of the confinement fiber.

Figure 16:
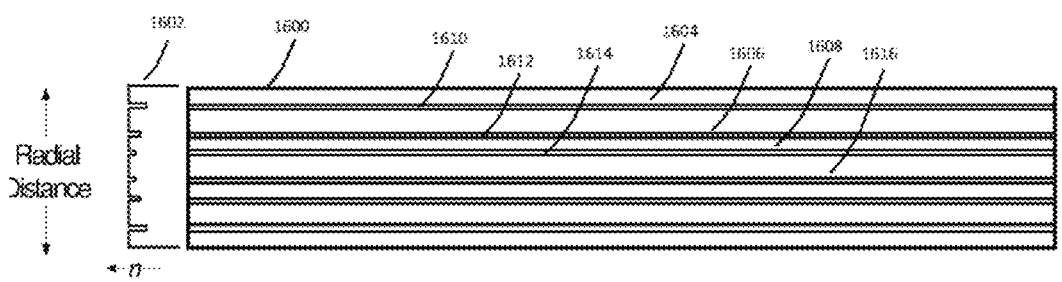

FIG. 16 illustrates a first length of fiber 1600 comprising guiding regions 1604, 1606, 1608, and 1616 bounded by lower-index layers 1610, 1612, and 1614 where the indexes of the lower-index layers 1610, 1612, and 1614 are stepped or, more generally, do not all have the same value. The stepped-index layers may serve to bound the beam intensity to certain guiding regions (1604, 1606, 1608, and 1616) when the perturbation assembly 210 (see FIG. 2) acts on the fiber 1600. In this way, adjusted beam light may be trapped in the guiding regions over a range of perturbation actions (such as over a range of bend radii, a range of bend lengths, a range of micro-bending pressures, and/or a range of acousto-optical signals), allowing for a certain degree of perturbation tolerance before a beam intensity distribution is shifted to a more distant radial position in fiber 1600. Thus, variation in beam characteristics may be controlled in a step-wise fashion. The radial widths of the guiding regions 1604, 1606, 1608, and 1616 may be adjusted to achieve a desired ring width, as may be required by an application. Also, a guiding region can have a thicker radial width to facilitate trapping of a larger fraction of the incoming beam profile if desired. Region 1606 is an example of such a design.

FIGS. 17-21 depict examples of fibers configured to enable maintenance and/or confinement of adjusted beam characteristics in the second length of fiber (e.g., fiber 208). These fiber designs are referred to as "ring-shaped confinement fibers" because they contain a central core surrounded by annular or ring-shaped cores. These designs are merely examples and not an exhaustive recitation of the variety of fiber RIPs that may be used to enable maintenance and/or confinement of adjusted beam characteristics within a fiber. Thus, claimed subject matter is not limited to the examples provided herein. Moreover, any of the first lengths of fiber described above with respect to FIGS. 11-16 may be combined with any of the second length of fiber described FIGS. 17-21.

Figure 17:
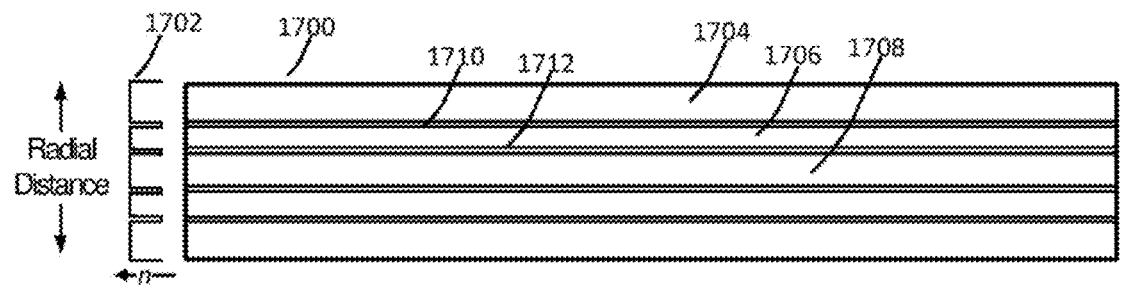
FIGS. 17-19 illustrate cross-sectional views of example second lengths of fiber ("confinement fibers") for confining adjusted beam characteristics in a fiber assembly.

FIG. 17 illustrates a cross-sectional view of an example second length of fiber for maintaining and/or confining adjusted beam characteristics in a VBC fiber assembly. As the perturbed beam is coupled from a first length of fiber to second length of fiber 1700, the second length of fiber 1700 may maintain at least a portion of the beam characteristics adjusted in response to perturbation in the first length of fiber within one or more of confinement regions 1704, 1706, and/or 1708. Fiber 1700 has a RIP 1702. Each of confinement regions 1704, 1706, and/or 1708 is bounded by a lower index layer 1710 and/or 1712. This design enables second length of fiber 1700 to maintain the adjusted beam characteristics. As a result, a beam output by fiber 1700 will substantially maintain the received adjusted beam as modified in the first length of fiber giving the output beam adjusted beam characteristics, which may be customized to a processing task or other application.

Figure 18:
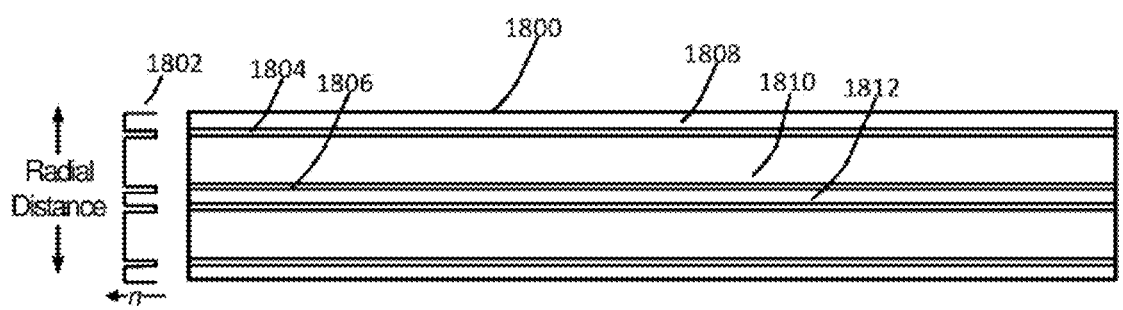

Similarly, FIG. 18 depicts a cross-sectional view of an example second length of fiber 1800 for maintaining and/or confining beam characteristics adjusted in response to perturbation in the first length of fiber in a VBC fiber assembly. Fiber 1800 has a RIP 1802. However, confinement regions 1808, 1810, and/or 1812 have different thicknesses than confinement regions 1704, 1706, and 1708. Each of confinement regions 1808, 1810, and/or 1812 is bounded by a lower index layer 1804 and/or 1806. Varying the thicknesses of the confinement regions (and/or barrier regions) enables tailoring or optimization of a confined adjusted radiance profile by selecting particular radial positions within which to confine an adjusted beam.

Figure 19:
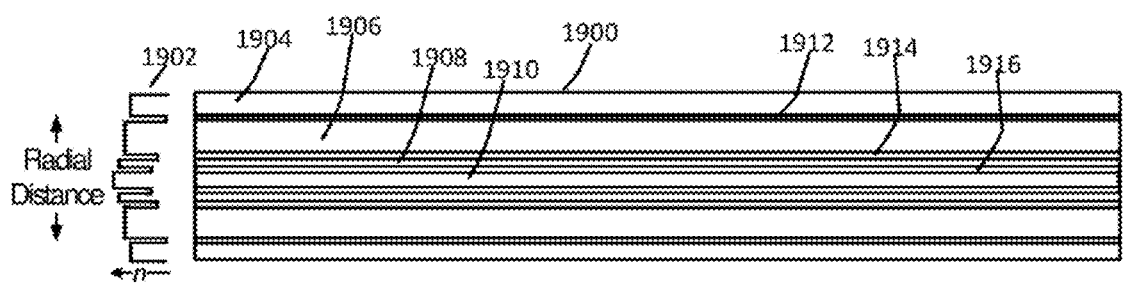

FIG. 19 depicts a cross-sectional view of an example second length of fiber 1900 having a RIP 1902 for maintaining and/or confining an adjusted beam in a VBC fiber assembly configured to provide variable beam characteristics. In this example, the number and thicknesses of confinement regions 1904, 1906, 1908, and 1910 are different from fiber 1700 and 1800 and the barrier layers 1912, 1914, and 1916 are of varied thicknesses as well. Furthermore, confinement regions 1904, 1906, 1908, and 1910 have different indexes of refraction and barrier layers 1912, 1914, and 1916 have different indexes of refraction as well. This design may further enable a more granular or optimized tailoring of the confinement and/or maintenance of an adjusted beam radiance to particular radial locations within fiber 1900. As the perturbed beam is launched from a first length of fiber to second length of fiber 1900 the modified beam characteristics of the beam (having an adjusted intensity distribution, radial position, and/or divergence angle, or the like, or a combination thereof) is confined within a specific radius by one or more of confinement regions 1904, 1906, 1908 and/or 1910 of second length of fiber 1900.

As noted previously, the divergence angle of a beam may be conserved or adjusted and then conserved in the second length of fiber. There are a variety of methods to change the divergence angle of a beam. The following are examples of fibers configured to enable adjustment of the divergence angle of a beam propagating from a first length of fiber to a second length of fiber in a fiber assembly for varying beam characteristics. However, these are merely examples and not an exhaustive recitation of the variety of methods that may be used to enable adjustment of divergence of a beam. Thus, claimed subject matter is not limited to the examples provided herein.

Figure 20:
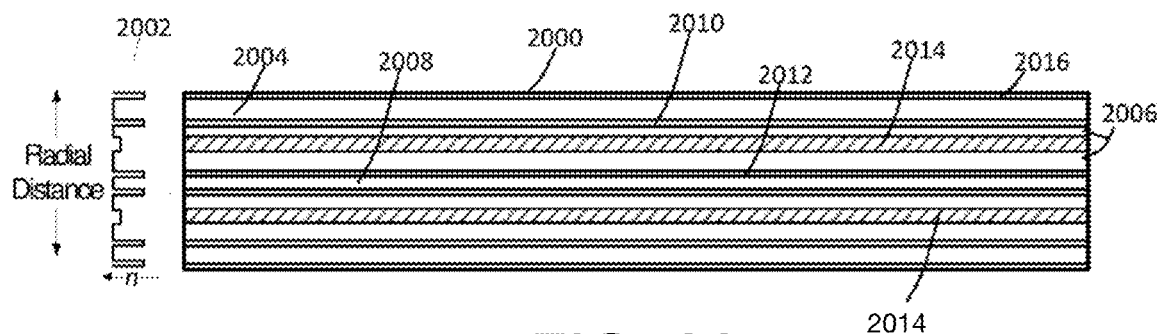
FIGS. 20 and 21 illustrate cross-sectional views of example second lengths of fiber for changing a divergence angle of and confining an adjusted beam in a fiber assembly configured to provide variable beam characteristics.

FIG. 20 depicts a cross-sectional view of an example second length of fiber 2000 having RIP 2002 for modifying, maintaining, and/or confining beam characteristics adjusted in response to perturbation in the first length of fiber. In this example, second length of fiber 2000 is similar to the previously described second lengths of fiber and forms a portion of the VBC fiber assembly for delivering variable beam characteristics as discussed above. There are three confinement regions 2004, 2006, and 2008 and three barrier layers 2010, 2012, and 2016. Second length of fiber 2000 also has a divergence structure 2014 situated within the confinement region 2006. The divergence structure 2014 is an area of material with a lower refractive index than that of the surrounding confinement region. As the beam is launched into second length of fiber 2000 refraction from divergence structure 2014 causes the beam divergence to increase in second length of fiber 2000. The amount of increased divergence depends on the amount of spatial overlap of the beam with the divergence structure 2014 and the magnitude of the index difference between the divergence structure 2014 and the core material. By adjusting the radial position of the beam near the launch point into the second length of fiber 2000, the divergence distribution may be varied. The adjusted divergence of the beam is conserved in fiber 2000, which is configured to deliver the adjusted beam to the process head, another optical system (e.g., fiber-to-fiber coupler or fiber-to-fiber switch), the work piece, or the like, or a combination thereof. In an example, divergence structure 2014 may have an index dip of about $10^{-5}$–$3\times10^{-2}$ with respect to the surrounding material. Other values of the index dip may be employed within the scope of this disclosure and claimed subject matter is not so limited.

Figure 21:
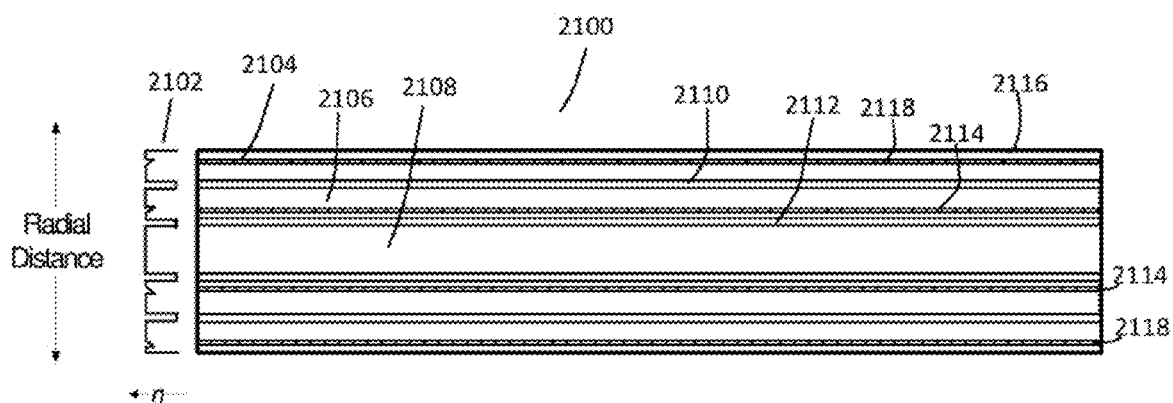

FIG. 21 depicts a cross-sectional view of an example second length of fiber 2100 having a RIP 2102 for modifying, maintaining, and/or confining beam characteristics adjusted in response to perturbation in the first length of fiber. Second length of fiber 2100 forms a portion of a VBC fiber assembly for delivering a beam having variable characteristics. In this example, there are three confinement regions 2104, 2106, and 2108 and three barrier layers 2110, 2112, and 2116. Second length of fiber 2100 also has a plurality of divergence structures 2114 and 2118. The divergence structures 2114 and 2118 are areas of graded lower index material. As the beam is launched from the first length fiber into second length of fiber 2100, refraction from divergence structures 2114 and 2118 causes the beam divergence to increase. The amount of increased divergence depends on the amount of spatial overlap of the beam with the divergence structure and the magnitude of the index difference between the divergence structure 2114 and/or 2118 and the surrounding core material of confinement regions 2106 and 2104 respectively. By adjusting the radial position of the beam near the launch point into the second length of fiber 2100, the divergence distribution may be varied. The design shown in FIG. 21 allows the intensity distribution and the divergence distribution to be varied somewhat independently by selecting both a particular confinement region and the divergence distribution within that conferment region (because each confinement region may include a divergence structure). The adjusted divergence of the beam is conserved in fiber 2100, which is configured to deliver the adjusted beam to the process head, another optical system, or the work piece. Forming the divergence structures 2114 and 2118 with a graded or non-constant index enables tuning of the divergence profile of the beam propagating in fiber 2100. An adjusted beam characteristic such as a radiance profile and/or divergence profile may be conserved as it is delivered to a process head by the second fiber. Alternatively, an adjusted beam characteristic such as a radiance profile and/or divergence profile may be conserved or further adjusted as it is routed by the second fiber through a fiber-to-fiber coupler (FFC) and/or fiber-to-fiber switch (FFS) and to a process fiber, which delivers the beam to the process head or the work piece.

Figure 26:
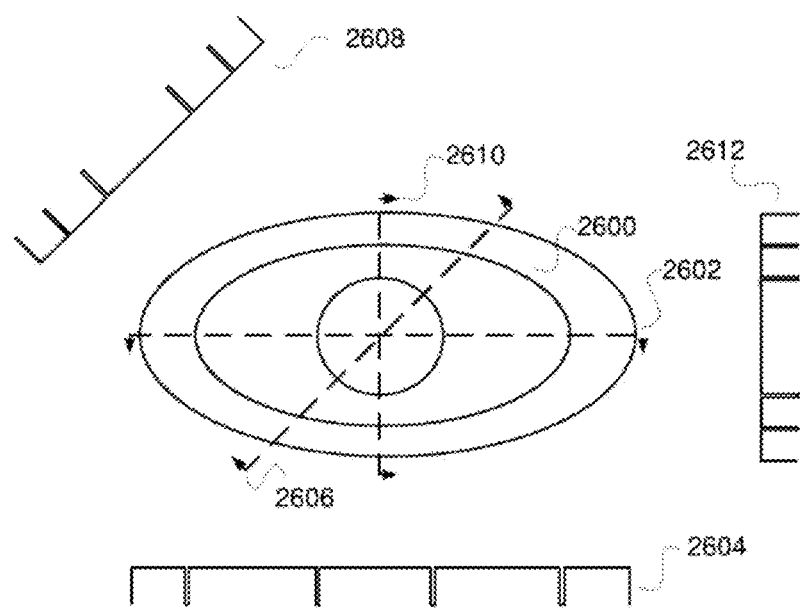
FIGS. 26-28 are cross-sectional views illustrating example second lengths of fiber ("confinement fibers") for confining adjusted beam characteristics in a fiber assembly.
Figure 27:
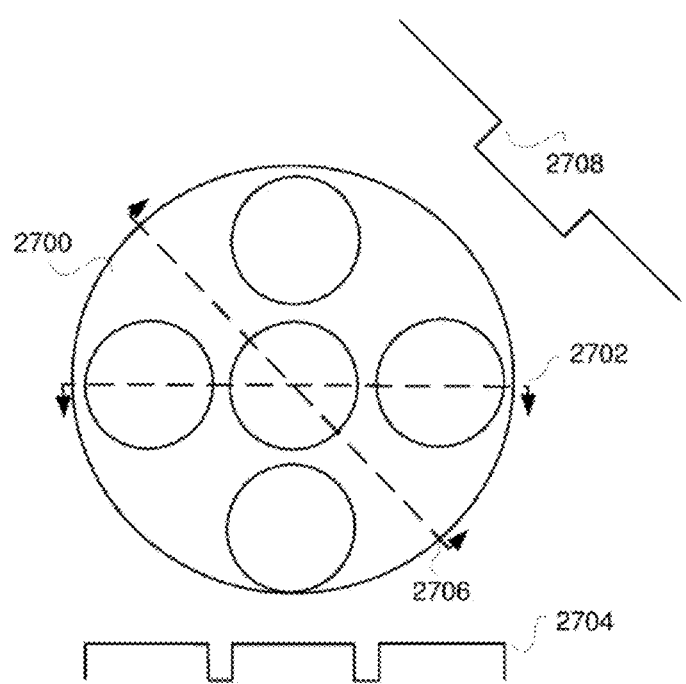
Figure 28:
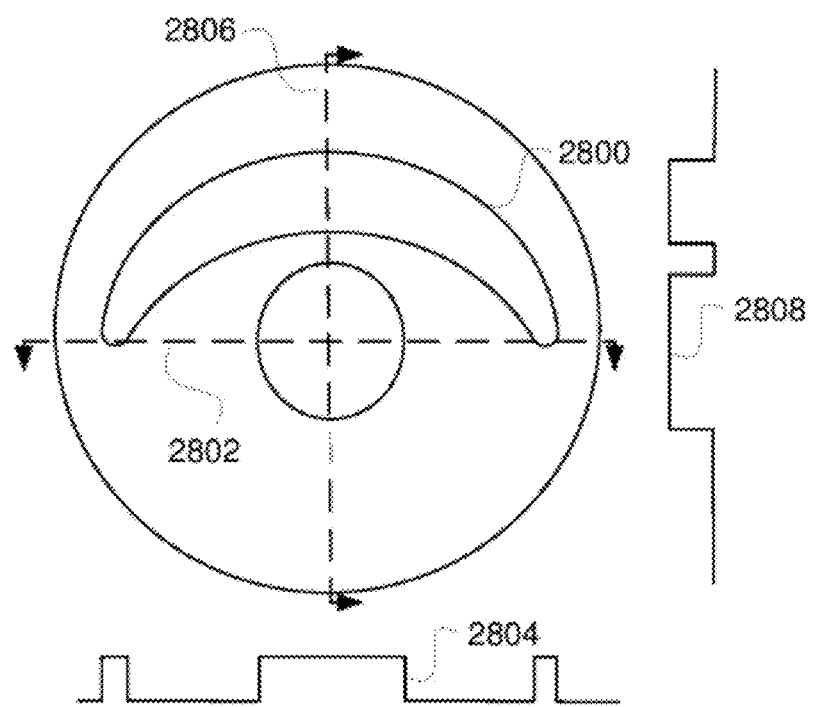

FIGS. 26-28 are cross-sectional views illustrating examples of fibers and fiber RIPs configured to enable maintenance and/or confinement of adjusted beam characteristics of a beam propagating in an azimuthally asymmetric second length of fiber wherein the beam characteristics are adjusted responsive to perturbation of a first length of fiber coupled to the second length of fiber and/or perturbation of the beam by a perturbation device 110. These azimuthally asymmetric designs are merely examples and are not an exhaustive recitation of the variety of fiber RIPs that may be used to enable maintenance and/or confinement of adjusted beam characteristics within an azimuthally asymmetric fiber. Thus, claimed subject matter is not limited to the examples provided herein. Moreover, any of a variety of first lengths of fiber (e.g., like those described above) may be combined with any azimuthally asymmetric second length of fiber (e.g., like those described in FIGS. 26-28).

FIG. 26 illustrates RIPs at various azimuthal angles of a cross-section through an elliptical fiber 2600. At a first azimuthal angle 2602, fiber 2600 has a first RIP 2604. At a second azimuthal angle 2606 that is rotated 45° from first azimuthal angle 2602, fiber 2600 has a second RIP 2608. At a third azimuthal angle 2610 that is rotated another 45° from second azimuthal angle 2606, fiber 2600 has a third RIP 2612. First, second and third RIPs 2604, 2608 and 2612 are all different.

FIG. 27 illustrates RIPs at various azimuthal angles of a cross-section through a multicore fiber 2700. At a first azimuthal angle 2702, fiber 2700 has a first RIP 2704. At a second azimuthal angle 2706, fiber 2700 has a second RIP 2708. First and second RIPs 2704 and 2708 are different. In an example, perturbation device 110 may act in multiple planes in order to launch the adjusted beam into different regions of an azimuthally asymmetric second fiber.

FIG. 28 illustrates RIPs at various azimuthal angles of a cross-section through a fiber 2800 having at least one crescent shaped core. In some cases, the corners of the crescent may be rounded, flattened, or otherwise shaped, which may minimize optical loss. At a first azimuthal angle 2802, fiber 2800 has a first RIP 2804. At a second azimuthal angle 2806, fiber 2800 has a second RIP 2808. First and second RIPs 2804 and 2808 are different.

Figure 22A:
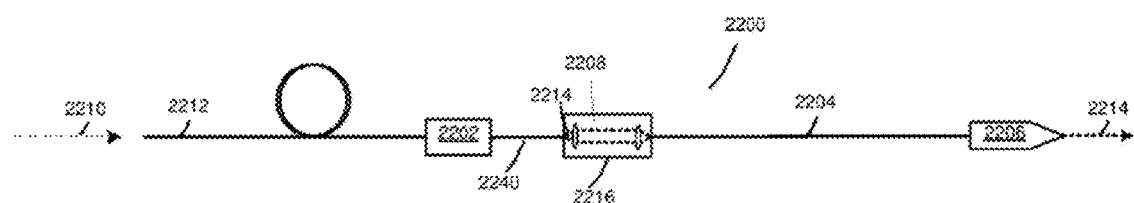
FIG. 22A illustrates an example laser system including a fiber assembly configured to provide variable beam characteristics disposed between a feeding fiber and process head.

FIG. 22A illustrates an example of a laser system 2200 including a VBC fiber assembly 2202 configured to provide variable beam characteristics. VBC fiber assembly 2202 comprises a first length of fiber 104, second length of fiber 108, and a perturbation device 110. VBC fiber assembly 2202 is disposed between feeding fiber 2212 (i.e., the output fiber from the laser source) and VBC delivery fiber 2240. VBC delivery fiber 2240 may comprise second length of fiber 108 or an extension of second length of fiber 108 that modifies, maintains, and/or confines adjusted beam characteristics. Beam 2210 is coupled into VBC fiber assembly 2202 via feeding fiber 2212. Fiber assembly 2202 is configured to vary the characteristics of beam 2210 in accordance with the various examples described above. The output of fiber assembly 2202 is adjusted beam 2214 which is coupled into VBC delivery fiber 2240. VBC delivery fiber 2240 delivers adjusted beam 2214 to free-space optics assembly 2208, which then couples beam 2214 into a process fiber 2204. Adjusted beam 2214 is then delivered to process head 2206 by process fiber 2204. The process head can include guided wave optics (such as fibers and fiber coupler), free space optics such as lenses, mirrors, optical filters, diffraction gratings), beam scan assemblies such as galvanometer scanners, polygonal mirror scanners, or other scanning systems that are used to shape the beam 2214 and deliver the shaped beam to a workpiece.

In laser system 2200, one or more of the free-space optics of assembly 2208 may be disposed in an FFC or other beam coupler 2216 to perform a variety of optical manipulations of an adjusted beam 2214 (represented in FIG. 22A with different dashing than beam 2210). For example, free-space optics assembly 2208 may preserve the adjusted beam characteristics of beam 2214. Process fiber 2204 may have the same RIP as VBC delivery fiber 2240. Thus, the adjusted beam characteristics of adjusted beam 2214 may be preserved all the way to process head 2206. Process fiber 2204 may comprise a RIP similar to any of the second lengths of fiber described above, including confinement regions.

Figure 22B:
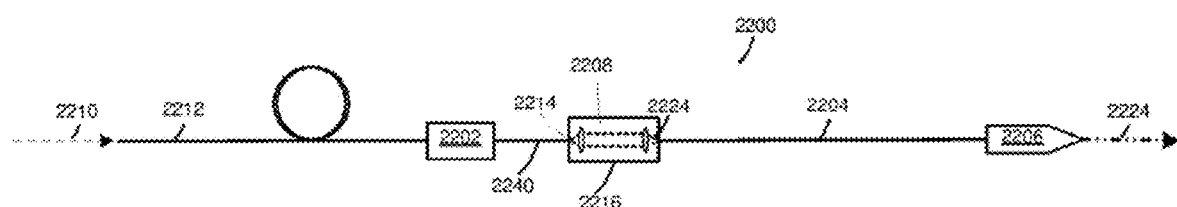
FIG. 22B illustrates an example a laser system including a fiber assembly configured to provide variable beam characteristics disposed between a feeding fiber and process head.

Alternatively, as illustrated in FIG. 22B, free-space optics assembly 2208 may change the adjusted beam characteristics of beam 2214 by, for example, increasing or decreasing the divergence and/or the spot size of beam 2214 (e.g., by magnifying or demagnifying beam 2214) and/or otherwise further modifying adjusted beam 2214. Furthermore, process fiber 2204 may have a different RIP than VBC delivery fiber 2240. Accordingly, the RIP of process fiber 2204 may be selected to preserve additional adjustment of adjusted beam 2214 made by the free-space optics of assembly 2208 to generate a twice adjusted beam 2224 (represented in FIG. 228 with different dashing than beam 2214).

Figure 23:
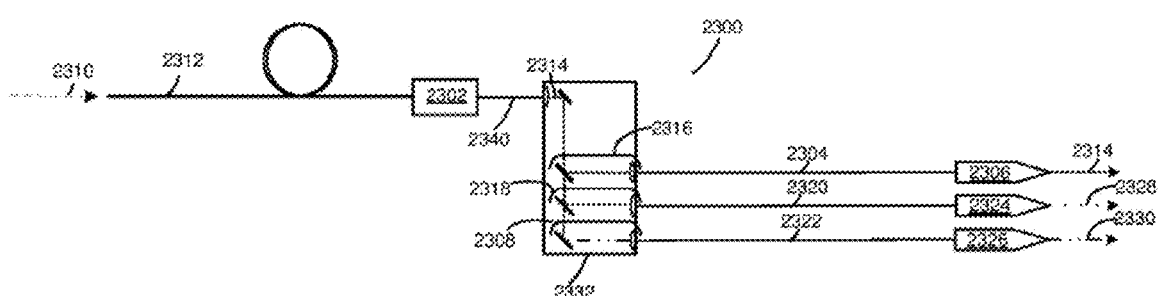
FIG. 23 illustrates an example laser system including a fiber assembly configured to provide variable beam characteristics disposed between a feeding fiber and multiple process fibers.

FIG. 23 illustrates an example of a laser system 2300 including VBC fiber assembly 2302 disposed between feeding fiber 2312 and VBC delivery fiber 2340. During operation, beam 2310 is coupled into VBC fiber assembly 2302 via feeding fiber 2312. Fiber assembly 2302 includes a first length of fiber 104, second length of fiber 108, and a perturbation device 110 and is configured to vary characteristics of beam 2310 in accordance with the various examples described above. Fiber assembly 2302 generates adjusted beam 2314 output by VBC delivery fiber 2340. VBC delivery fiber 2340 comprises a second length of fiber 108 of fiber for modifying, maintaining, and/or confining adjusted beam characteristics in a fiber assembly 2302 in accordance with the various examples described above (see FIGS. 17-21, for example). VBC delivery fiber 2340 couples adjusted beam 2314 into beam switch (FFS) 2332, which then couples its various output beams to one or more of multiple process fibers 2304, 2320, and 2322. Process fibers 2304, 2320, and 2322 deliver adjusted beams 2314, 2328, and 2330 to respective process heads 2306, 2324, and 2326.

In an example, beam switch 2332 includes one or more sets of free-space optics 2308, 2316, and 2318 configured to perform a variety of optical manipulations of adjusted beam 2314. Free-space optics 2308, 2316, and 2318 may preserve or vary adjusted beam characteristics of beam 2314. Thus, adjusted beam 2314 may be maintained by the free-space optics or adjusted further. Process fibers 2304, 2320, and 2322 may have the same or a different RIP as VBC delivery fiber 2340, depending on whether it is desirable to preserve or further modify a beam passing from the free-space optics assemblies 2308, 2316, and 2318 to respective process fibers 2304, 2320, and 2322. In other examples, one or more beam portions of beam 2310 are coupled to a workpiece without adjustment, or different beam portions are coupled to respective VBC fiber assemblies so that beam portions associated with a plurality of beam characteristics can be provided for simultaneous workpiece processing. Alternatively, beam 2310 can be switched to one or more of a set of VBC fiber assemblies.

Routing adjusted beam 2314 through any of free-space optics assemblies 2308, 2316, and 2318 enables delivery of a variety of additionally adjusted beams to process heads 2206, 2324, and 2326. Therefore, laser system 2300 provides additional degrees of freedom for varying the characteristics of a beam, as well as switching the beam between process heads ("time sharing") and/or delivering the beam to multiple process heads simultaneously ("power sharing").

For example, free-space optics in beam switch 2332 may direct adjusted beam 2314 to free-space optics assembly 2316 configured to preserve the adjusted characteristics of beam 2314. Process fiber 2304 may have the same RIP as VBC delivery fiber 2340. Thus, the beam delivered to process head 2306 will be a preserved adjusted beam 2314.

In another example, beam switch 2332 may direct adjusted beam 2314 to free-space optics assembly 2318 configured to preserve the adjusted characteristics of adjusted beam 2314. Process fiber 2320 may have a different RIP than VBC delivery fiber 2340 and may be configured with divergence altering structures as described with respect to FIGS. 20 and 21 to provide additional adjustments to the divergence distribution of beam 2314. Thus, the beam delivered to process head 2324 will be a twice adjusted beam 2328 having a different beam divergence profile than adjusted beam 2314.

Process fibers 2304, 2320, and/or 2322 may comprise a RIP similar to any of the second lengths of fiber described above, including confinement regions or a wide variety of other RIPs, and claimed subject matter is not limited in this regard.

In yet another example, free-space optics switch 2332 may direct adjusted beam 2314 to free-space optics assembly 2308 configured to change the beam characteristics of adjusted beam 2314. Process fiber 2322 may have a different RIP than VBC delivery fiber 2340 and may be configured to preserve (or alternatively further modify) the new further adjusted characteristics of beam 2314. Thus, the beam delivered to process head 2326 will be a twice adjusted beam 2330 having different beam characteristics (due to the adjusted divergence profile and/or intensity profile) than adjusted beam 2314.

In FIGS. 22A, 22B, and 23, the optics in the FFC or FFS may adjust the spatial profile and/or divergence profile by magnifying or demagnifying the beam 2214 before launching into the process fiber. They may also adjust the spatial profile and/or divergence profile via other optical transformations. They may also adjust the launch position into the process fiber. These methods may be used alone or in combination.

FIGS. 22A, 22B, and 23 merely provide examples of combinations of adjustments to beam characteristics using free-space optics and various combinations of fiber RIPs to preserve or modify adjusted beams 2214 and 2314. The examples provided above are not exhaustive and are meant for illustrative purposes only. Thus, claimed subject matter is not limited in this regard.

Figure 24:
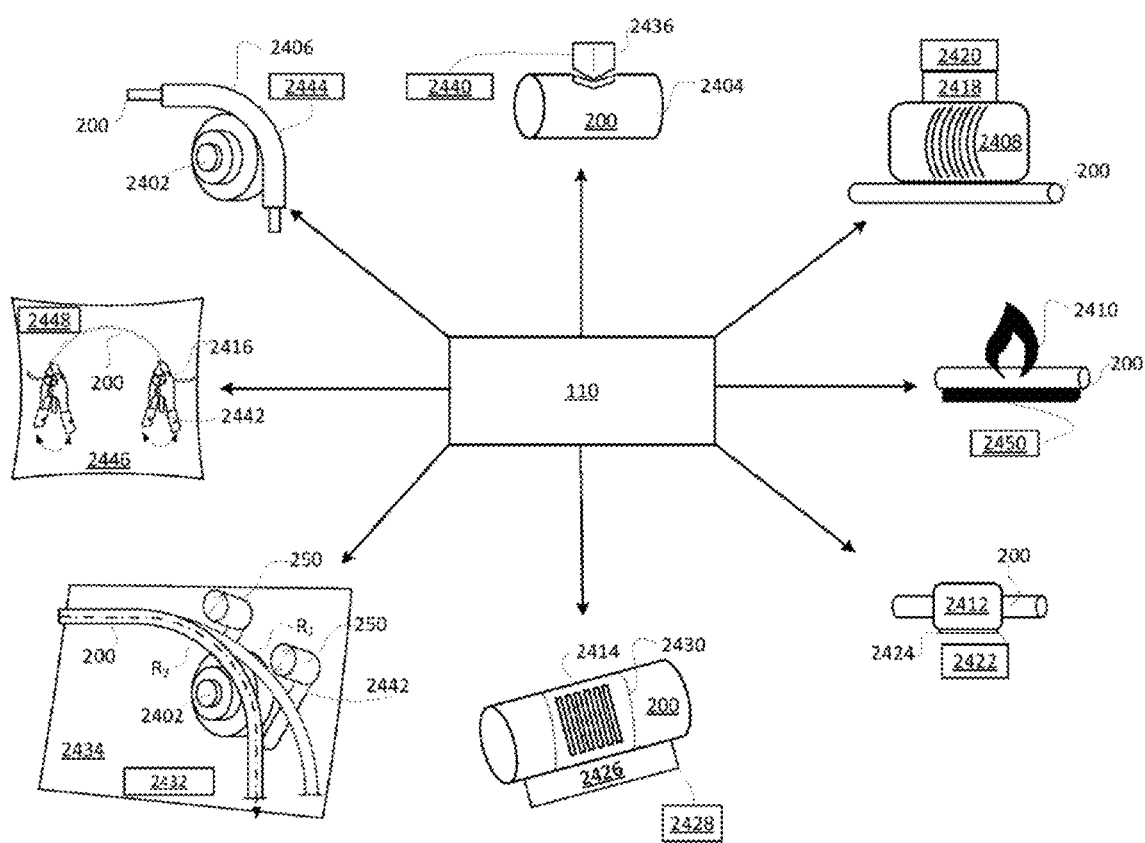
FIG. 24 illustrates examples of various perturbation assemblies for providing variable beam characteristics according to various examples provided herein.

FIG. 24 illustrates various examples of perturbation devices, assemblies or methods (for simplicity referred to collectively herein as "perturbation device 110") for perturbing a VBC fiber 200 and/or an optical beam propagating in VBC fiber 200 according to various examples provided herein. Perturbation device 110 may be any of a variety of devices, methods, and/or assemblies configured to enable adjustment of beam characteristics of a beam propagating in VBC fiber 200. In an example, perturbation device 110 may be a mandrel 2402, a micro-bend 2404 in the VBC fiber, flexible tubing 2406, an acousto-optic transducer 2408, a thermal device 2410, a piezo-electric device 2412, a grating 2414, a clamp 2416 (or other fastener), or the like, or any combination thereof. These are merely examples of perturbation devices 110 and not an exhaustive listing of perturbation devices 110 and claimed subject matter is not limited in this regard.

Mandrel 2402 may be used to perturb VBC fiber 200 by providing a form about which VBC fiber 200 may be bent. As discussed above, reducing the bend radius of VBC fiber 200 moves the intensity distribution of the beam radially outward. In some examples, mandrel 2402 may be stepped or conically shaped to provide discrete bend radii levels. Alternatively, mandrel 2402 may comprise a cone shape without steps to provide continuous bend radii for more granular control of the bend radius. The radius of curvature of mandrel 2402 may be constant (e.g., a cylindrical form) or non-constant (e.g., an oval-shaped form). Similarly, flexible tubing 2406, clamps 2416 (or other varieties of fasteners), or rollers 250 may be used to guide and control the bending of VBC fiber 200 about mandrel 2402. Furthermore, changing the length over which the fiber is bent at a particular bend radius also may modify the intensity distribution of the beam. VBC fiber 200 and mandrel 2402 may be configured to change the intensity distribution within the first fiber predictably (e.g., in proportion to the length over which the fiber is bent and/or the bend radius). Rollers 250 may move up and down along a track 2442 on platform 2434 to change the bend radius of VBC fiber 200.

Clamps 2416 (or other fasteners) may be used to guide and control the bending of VBC fiber 200 with or without a mandrel 2402. Clamps 2416 may move up and down along a track 2442 or platform 2446. Clamps 2416 may also swivel to change bend radius, tension, or direction of VBC fiber 200. Controller 2448 may control the movement of clamps 2416.

In another example, perturbation device 110 may be flexible tubing 2406 and may guide bending of VBC fiber 200 with or without a mandrel 2402. Flexible tubing 2406 may encase VBC fiber 200. Tubing 2406 may be made of a variety of materials and may be manipulated using piezo-electric transducers controlled by controller 2444. In another example, clamps or other fasteners may be used to move flexible tubing 2406.

Micro-bend 2404 in VBC fiber is a local perturbation caused by lateral mechanical stress on the fiber. Micro-bending can cause mode coupling and/or transitions from one confinement region to another confinement region within a fiber, resulting in varied beam characteristics of the beam propagating in a VBC fiber 200. Mechanical stress may be applied by an actuator 2436 that is controlled by controller 2440. However, this is merely an example of a method for inducing mechanical stress in fiber 200 and claimed subject matter is not limited in this regard.

Acousto-optic transducer (AOT) 2408 may be used to induce perturbation of a beam propagating in the VBC fiber using an acoustic wave. The perturbation is caused by the modification of the refractive index of the fiber by the oscillating mechanical pressure of an acoustic wave. The period and strength of the acoustic wave are related to the acoustic wave frequency and amplitude, allowing dynamic control of the acoustic perturbation. Thus, a perturbation assembly 110 including AOT 2408 may be configured to vary the beam characteristics of a beam propagating in the fiber. In an example, piezo-electric transducer 2418 may create the acoustic wave and may be controlled by controller or driver 2420. The acoustic wave induced in AOT 2408 may be modulated to change and/or control the beam characteristics of the optical beam in VBC 200 in real-time. However, this is merely an example of a method for creating and controlling an AOT 2408 and claimed subject matter is not limited in this regard.

Thermal device 2410 may be used to induce perturbation of a beam propagating in VBC fiber using heat. The perturbation is caused by the modification of the RIP of the fiber induced by heat. Perturbation may be dynamically controlled by controlling an amount of heat transferred to the fiber and the length over which the heat is applied. Thus, a perturbation assembly 110 including thermal device 2410 may be configured to vary a range of beam characteristics. Thermal device 2410 may be controlled by controller 2450.

Piezo-electric transducer 2412 may be used to induce perturbation of a beam propagating in a VBC fiber using piezoelectric action. The perturbation is caused by the modification of the RIP of the fiber induced by a piezoelectric material attached to the fiber. The piezoelectric material in the form of a jacket around the bare fiber may apply tension or compression to the fiber, modifying its refractive index via the resulting changes in density. Perturbation may be dynamically controlled by controlling a voltage to the piezo-electric device 2412. Thus, a perturbation assembly 110 including piezo-electric transducer 2412 may be configured to vary the beam characteristics over a particular range.

In an example, piezo-electric transducer 2412 may be configured to displace VBC fiber 200 in a variety of directions (e.g., axially, radially, and/or laterally) depending on a variety of factors, including how the piezo-electric transducer 2412 is attached to VBC fiber 200, the direction of the polarization of the piezo-electric materials, the applied voltage, etc. Additionally, bending of VBC fiber 200 is possible using the piezo-electric transducer 2412. For example, driving a length of piezo-electric material having multiple segments comprising opposing electrodes can cause a piezo-electric transducer 2412 to bend in a lateral direction. Voltage applied to piezoelectric transducer 2412 by electrode 2424 may be controlled by controller 2422 to control displacement of VBC fiber 200. Displacement may be modulated to change and/or control the beam characteristics of the optical beam in VBC 200 in real-time. However, this is merely an example of a method of controlling displacement of a VBC fiber 200 using a piezo-electric transducer 2412 and claimed subject matter is not limited in this regard.

Gratings 2414 may be used to induce perturbation of a beam propagating in a VBC fiber 200. A grating 2414 can be written into a fiber by inscribing a periodic variation of the refractive index into the core. Gratings 2414 such as fiber Bragg gratings can operate as optical filters or as reflectors. A long-period grating can induce transitions among co-propagating fiber modes. The radiance, intensity profile, and/or divergence profile of a beam comprised of one or more modes can thus be adjusted using a long-period grating to couple one or more of the original modes to one or more different modes having different radiance and/or divergence profiles. Adjustment is achieved by varying the periodicity or amplitude of the refractive index grating. Methods such as varying the temperature, bend radius, and/or length (e.g., stretching) of the fiber Bragg grating can be used for such adjustment. VBC fiber 200 having gratings 2414 may be coupled to stage 2426. Stage 2426 may be configured to execute any of a variety of functions and may be controlled by controller 2428. For example, stage 2426 may be coupled to VBC fiber 200 with fasteners 2430 and may be configured to stretch and/or bend VBC fiber 200 using fasteners 2430 for leverage. Stage 2426 may have an embedded thermal device and may change the temperature of VBC fiber 200.

Figure 25:
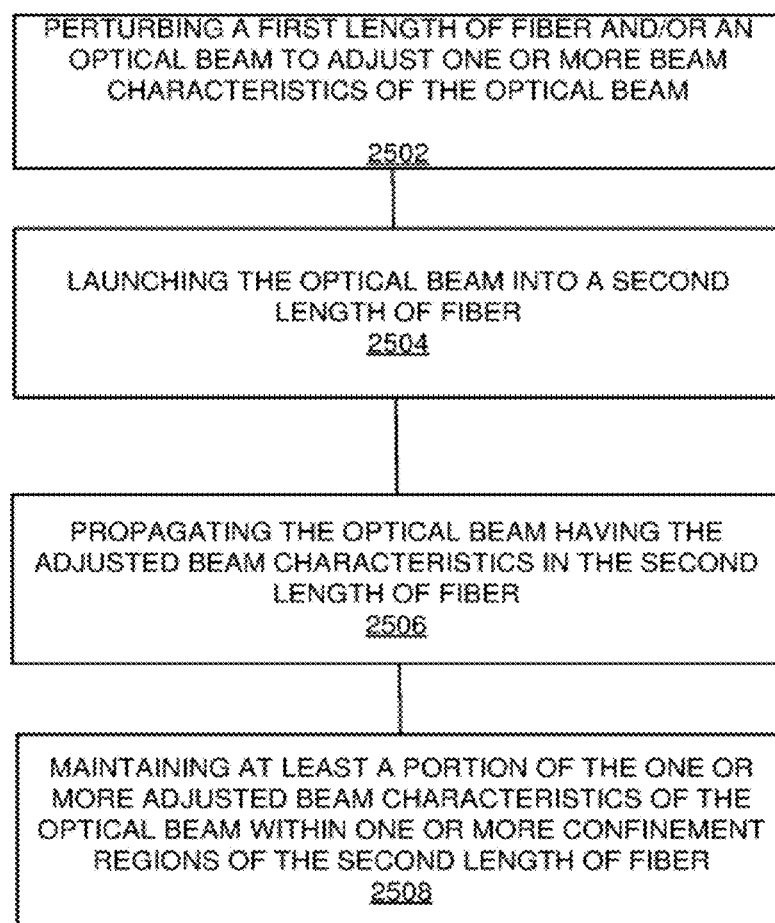
FIG. 25 illustrates an example process for adjusting and maintaining modified characteristics of an optical beam.

FIG. 25 illustrates an example process 2500 for adjusting and/or maintaining beam characteristics within a fiber without the use of free-space optics to adjust the beam characteristics. In block 2502, a first length of fiber and/or an optical beam are perturbed to adjust one or more optical beam characteristics. Process 2500 moves to block 2504, where the optical beam is launched into a second length of fiber. Process 2500 moves to block 2506, where the optical beam having the adjusted beam characteristics is propagated in the second length of fiber. Process 2500 moves to block 2508, where at least a portion of the one or more beam characteristics of the optical beam are maintained within one or more confinement regions of the second length of fiber. The first and second lengths of fiber may be comprised of the same fiber, or they may be different fibers.

Optical Modulator

Disclosed further herein are methods, systems, and apparatus configured to modulate transmittance of an optical beam between an optical input and an optical output. Through application of the structures and techniques described above, a fiber operable to impart and/or maintain variable beam characteristics (VBC) may be incorporated into an optical modulator as a means of varying the transmittance between an optical input and an output of a modulator. Such a modulator may have reduced cost, complexity, and/or optical loss, and it may avoid other limitations of conventional modulators. One or more characteristics of a beam (e.g., described elsewhere herein) that may be varied within the VBC fiber may be controlled within the confines of the modulator, for example in response to a control signal. Such a modulator may be inserted into a wide variety of optical systems.

Generally, perturbation of one or more lengths of fiber and/or a beam propagating within the one or more lengths of fiber is to change the transmittance of the beam to a predetermined destination (e.g., a modulator output port). One or more lengths of fiber within the modulator may be enlisted to vary the beam characteristics. A perturbation device within the modulator is to perturb the beam and/or a length of fiber such that the beam's characteristics are altered. One or more lengths of fiber within the modulator may be enlisted to deliver the beam to the destination as a function of the variable beam characteristic that results from the perturbation. Delivery of the beam to the destination may thereby be conditioned on any suitable input a user of the modulator selects to trigger the perturbation and concomitant changes in transmittance of the beam.

Notably, modulators described herein are compatible with a wide variety of optical systems. For example, modulators described herein may be well suited to a variety of applications, including optical telecommunications, materials processing, chemical or physical sensing, and medical or biological applications, among others. Also of note, modulators described herein are compatible with optical systems that include a wide variety of lasers. For example, any of the lasers described elsewhere herein may be included in an optical system that further includes a modulator having one or more of the features described herein. In some embodiments, a laser, such as, but not limited to, fiber lasers and fiber-coupled lasers, may be coupled to an optical input of a modulator. In other embodiments, a modulator may be incorporated within a laser cavity such that the modulator is a component of a laser.

Figure 29:
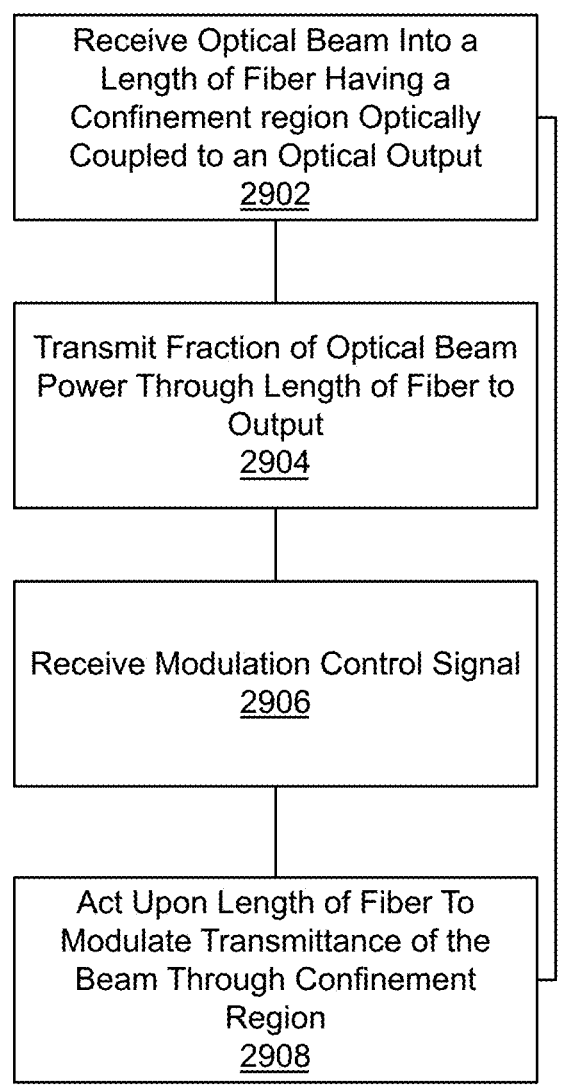
FIG. 29 illustrates example methods of optical beam modulation.

FIG. 29 is a flow diagram illustrating exemplary methods 2901 for modulating optical beam transmittance, in accordance with some embodiments. Methods 2901 may be implemented, for example, by a fiber-based optical modulator as described further below. Methods 2901 begin at block 2902 where an optical beam is received. The beam may have been generated by a laser, for example, and may have been transmitted from an output of the laser through any optical path prior to being received at block 2902. Regardless of origin, the beam is eventually propagated into a length of optical fiber that has a confinement region (i.e., a confinement fiber), and the confinement region is optically coupled to an optical output. The beam received at block 2902 is associated with some non-zero incident radiant flux or power, yin (e.g., measured in units of Watts).

At block 2904, the length of optical fiber transmits to the optical output a beam having a first (reference) output power, $y_{out}$. An optical modulator may implement block 2904 while the modulator is in a first (reference) state, for example. The fraction of the beam power transmitted at block 2904 is associated with a reference total transmittance $T_{t0}$, or $$\left.\frac{y_{out}}{y_{in}}\right|_{t_0}$$

of a modulator in the reference state at some reference time $t_0$.

At block 2906, a modulation control signal is received. The modulation control signal may be received, for example, through a modulator's controller input. The modulation control signal may be any digital or analog signal suitable for triggering a state change in a modulator that is to impact the transmittance of the optical beam by the length of fiber optically coupled to the output. The modulation control signal may be indicative of a logic level shift that triggers a change in modulator state from the first state at operation 2904 to a second state. Alternatively, the modulation control signal may be a drive signal that drives the change in modulator state from the first state at operation 2904 to the second state. Methods 901 continue at block 2908, which is performed in response to the modulation control signal received at block 2906.

At block 2908, one or more lengths of fiber, and/or beam within the length(s) of fiber, are acted upon to modulate, based on the modulation control signal, the total transmittance of the beam through the confinement region. The action upon the fiber(s) at block 2908 may be, for example, any of the actions described above in the general context of a VBC fiber (e.g., VBC fiber 100 in FIG. 1). In the context of modulation methods 2901, the action upon the fiber(s) and/or beam with in the fiber(s) at block 2908 is more specifically to change the total transmittance of the beam through the confinement region from the reference transmittance level. Since the confinement region is optically coupled to the output, beam power at the optical output is modulated as a function of the action at block 2908. As described further below, the action at block 2908 may alter a coupling of the optical beam between a first length of the fiber and the confinement region of a second length of the fiber. In the alternative, or in addition, the action at block 2908 may alter a rate of loss of the optical beam from the confinement region over at least one of the lengths of fiber.

Methods 2901 continue by returning to block 2902 where the input beam power is received, a fraction of which is transmitted through the confinement region at operation 2904. The fraction however is now a total transmittance $$T_{t1}\left(\left.\frac{y_{out}}{y_{in}}\right|_{t_1}\right)$$

of the modulator while in a modulated state at some reference time $t_1$. Methods 2901 continue over time with transmittance varying time as a function of the modulation control signal.

Figure 30:
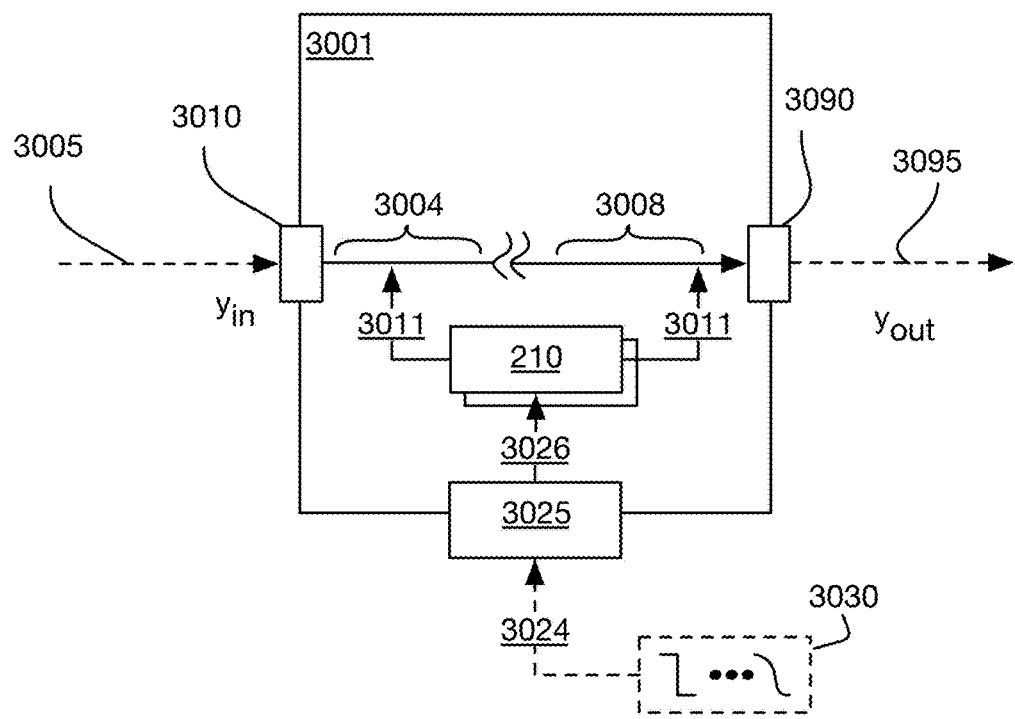
FIG. 30 illustrates a schematic of an optical modulator in accordance with some embodiments.

FIG. 30 illustrates an exemplary optical modulator 3001 suitable for modulating optical beam transmittance without requiring the use of free-space optics. Optical modulator 3001 may implement methods 2901, for example. Optical modulator 3001 comprises an optical input 3010 to receive an optical beam 3005. Optical input 3010 may comprise any suitable optical port or coupling, such as, but not limited to, a fiber splice junction, a free air gap, a free-space or bulk optic, glue, index-matching material, butt-coupled fibers, or the like, or any combination thereof. At optical input 3010 optical beam 3005 has input power $y_{in}$. Input power $y_{in}$ may have any value suitable for the optical system into which modulator 3001 is integrated as embodiments herein are not limited in this respect. Optical beam 3005 may be coupled into input 3010 according to any means known to be suitable for optical input 3010, such as, but not limited to, a single-mode (SM) or multimode (MM) optical fiber.

Modulator 3001 includes one or more lengths of fiber between optical input 3010 and an optical output 3090. In the illustrated example, a first length of fiber 3004 is optically coupled to the optical input 3010. Hence, for embodiments where optical beam 3005 is coupled into input 3010 through a fiber, that fiber and the first length of fiber 3004 may be fused at input 3010 with input 3010 then being a splice junction, for example. A second length of fiber 3008 comprises a confinement region that is optically coupled to the optical output 3090. Optical output 3090 may be any suitable optical port or coupling, such as, but not limited to, a fiber splice junction, a free air gap, a free-space or bulk optic, glue, index-matching material, butt-coupled fibers, or the like, or any combination thereof. In some embodiments, optical output 3090 is substantially the same as optical input 3010 (e.g., both splice junctions, both glues, etc.). Optical beam 3095 with output power your exits modulator 3001. Optical beam 3095 may be coupled from output 3090 according to any means known to be suitable for optical output 3090, such as, but not limited to, a SM or MM optical fiber. Hence, for embodiments where optical beam 3095 is coupled from out 3090 through a fiber, that fiber and the second length of fiber 3008 may be fused at output 3090 with output 3090 then being a splice junction, for example.

Modulator 3001 includes perturbation device 210. Perturbation device 210 may have one or more of the features and/or attributes described above, for example. In the context of modulator 3001, perturbation device 210 is to modulate, through action(s) 3011 upon the fiber length 3004 and/or length 3008, transmittance of the beam through the confinement region of the second fiber length 3008. In some exemplary embodiments, action(s) 3011 include one or more of the perturbations described above in the context of VBC fiber. In some examples, action(s) 3011 comprise one or more physical actions on either or both the fiber lengths 3004 and 3008 to modulate transmittance of beam 3005 through a confinement region within fiber length 3008. Alternatively, perturbation device 210 may act directly on input beam 3005 as it is propagated through the fiber lengths 3004 and/or 3008 in a manner that modulates transmittance of beam 3005 through a confinement region within fiber length 3008 that is coupled to output 3090. As noted through an overlay in FIG. 30, modulator 3001 may include one or more perturbation devices 210, and/or a single perturbation device 210 that may act upon the fiber lengths 3004 and 3008 concurrently.

Modulator 3001 further comprises a controller input 3025. Controller input 3025 is communicatively coupled to perturbation device 210, and is operable to receive a modulation control signal 3026, and to implement actions 3011 in response to the modulation control signal 3026. Controller input 3025 may be any passive or active communication port known to be suitable for conveying at least one of control logic signals or drive signals. In the illustrated example, controller input 3025 receives an external control signal 3024 from a controller 3030 external of modulator 3001. Modulation control signal 3026 is conveyed from controller input 3025 to perturbation device 210. In some embodiments where controller input 3025 is a passive interface, modulation control signal 3026 is substantially the same as external control signal 3024. In other embodiments where controller input 3025 includes active logic, signal processing, and/or signal conditioning, modulation control signal 3026 may be merely indicative of, based on, or a function of, external control signal 3024. In some embodiments, controller 3030 is a function generator, which may output any time varying analog waveform. In some examples where controller input 3025 is a passive port, controller 3030 comprises a driver, and external control signal 3024 is suitable for directly driving perturbation device 210 into different states that implement actions 3011. In some other embodiments, controller 3030 outputs a time varying digital signal having at least two logic levels (e.g., HI/LO). In some examples where controller input 3025 is a passive port, controller 3030 comprises a logic processor and external control signal 3024 is passed through as modulation control signal 3026. Perturbation device 210 then implements actions 3011 based on logic levels of control signal 3026. In some alternative examples where controller input 3025 is an active port, controller 3030 comprises a logic processor and controller input 3025 generates control signal 3026 based on logic levels of external control signal 3024.

Figures 31A, 31B:
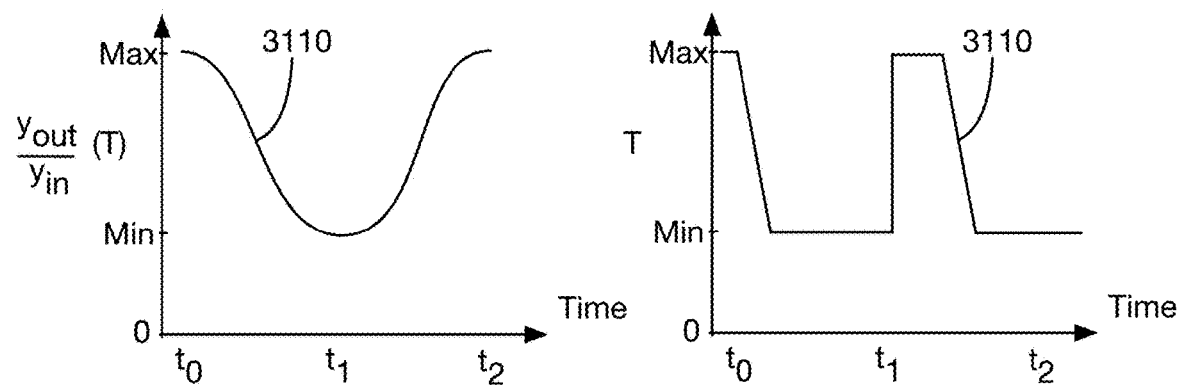
FIG. 31A and FIG. 31B are graphs illustrating a modulation of transmittance over time associated with an operation of an optical modulator in accordance with some embodiments.

FIG. 31A and FIG. 31B are graphs illustrating example modulations of transmittance over a time of operating optical modulator 3001, in accordance with some embodiments. The transmittance modulations shown may occur when optical modulator 3001 practices methods 2901, for example. Over the time window illustrated in FIGS. 31A and 31B, input power $y_{in}$ is substantially constant. At an initial reference time instance $t_0$, transmittance through a fiber confinement region coupled to modulator output 3090 is at a first level. In the example of FIG. 31A, this first level is approximately a maximum transmittance associated with perturbation device 210 being in a first state that results in the smallest optical losses within fiber lengths 3004 and/or 3008, and/or results in the strongest beam coupling into the output-coupled confinement region of fiber 3008. This first level of transmittance is arbitrary as being a function of design parameters. At a subsequent time instance $t_1$, transmittance through a fiber confinement region coupled to modulator output 3090 is at a second level. In the example of FIG. 31A, this second level is approximately a minimum transmittance associated with perturbation device 210 being in a second state that results in the largest optical losses within fiber lengths 3004 and/or 3008, and/or results in the weakest beam coupling into the output-coupled confinement region of fiber 3008. This second level of transmittance is also a function of design parameters, as a magnitude of transmittance modulation may be tuned for the specific modulator application. In some examples the second level of transmittance differs from the first level of transmittance by at least 1%

$$\left(\text{e.g., } \left.\frac{y_{out}}{y_{in}}\right|_{t_1} \leq 0.99 \left.\frac{y_{out}}{y_{in}}\right|_{t_0}\right).$$

In some other examples the second level of transmittance is between 1 dB and 40 dB below the first level of transmittance. At a third reference time instance $t_2$, transmittance through a fiber confinement region coupled to modulator output 3090 returns to the first level. The perturbation device 210 has therefore returned to the first state that minimizes optical losses within fiber lengths 3004 and/or 3008, and/or maximizes beam coupling into the output-coupled confinement region of fiber 3008.

As shown by response curve 3110, transmittance T may be varied continuously over time between the levels associated with time instances $t_0$, $t_1$, and $t_2$. Response curve 3110 illustrates a substantially sinusoidal transmittance modulation that may be described by a transfer function between states of perturbation device 210 and resultant optical losses within fiber lengths 3004 and/or 3008 and/or coupling efficiencies associated with those states. In other embodiments, for example as further illustrated in FIG. 31B, transmittance levels may be modulated over time in a more discrete step-wise fashion. For example, where beam light may be trapped in a confinement region over a range of perturbation actions (such as over a range of bend radii, a range of bend lengths, a range of micro-bending pressures, and/or a range of acousto-optical signals) and there is a certain degree of perturbation tolerance before beam intensity distribution is shifted to another position in the fiber. Hence, transmittance will vary with time in a manner that is dependent upon the nature of the perturbation and fiber characteristic that varies in response to the perturbation.

Figure 32:
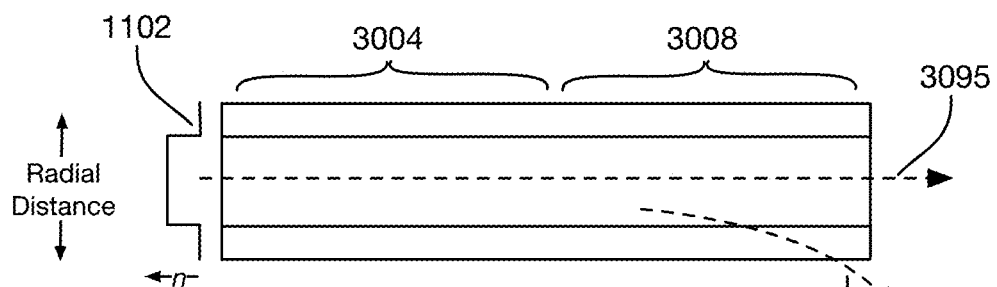
FIG. 32 illustrate a cross-sectional view of an exemplary lengths of fiber suitable for an optical modulator in accordance with some embodiments.

In some embodiments, action upon one or more lengths of fiber within a modulator alters optical beam loss from a confinement region over at least one of the fiber lengths. As noted above, a VBC fiber may include a first and second length of fiber and those lengths may have a same or different RIP. In the context of a modulator, (e.g., modulator 3001 in FIG. 30) fiber length 3004 may likewise have the same RIP or a different RIP than fiber length 3008. For example, fiber length 3004 may have any of the attributes described above in the context of fiber length 104 (FIG. 1) or fiber length 204 (FIG. 2) while fiber length 3008 (FIG. 30) may have any of the attributes described above in the context of fiber length 108 (FIG. 1) or fiber length 208 (FIG. 2). FIG. 32 illustrates a cross-sectional view of exemplary fiber lengths 3004 and 3008 in accordance with some optical modulator embodiments. As shown, fiber lengths 3004 and 3008 have the same RIP. In the illustrated example, the RIP of fiber lengths 3004 and 3008 is a step-index profile 1102 having a single confinement region of higher refractive index surrounded by a lower index cladding, substantially as described above in the context of FIG. 11. In another example, fiber lengths 3004 and 3008 have a graded-index profile, such as profile 1418 (FIG. 14). These are just two examples however, and fiber lengths 3004 and 3008 may have other RIPs.

Figure 33:
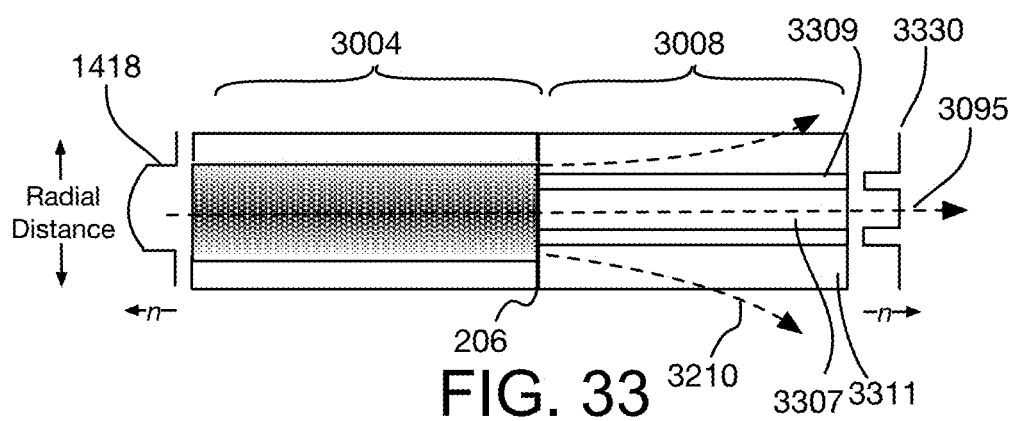
FIG. 33 illustrate a cross-sectional view of exemplary lengths of fiber suitable for an optical modulator in accordance with some embodiments.

In some embodiments, action upon one or more lengths of fiber within a modulator alters a coupling of the optical beam between a first length of the fiber and a confinement region of a second length of the fiber that is coupled to an output of the modulator. Transmittance of a beam through the optical modulator is then a function of coupling between the fiber lengths. For such examples, each of the first and second lengths of fiber may have any number of confinement regions. If the second fiber length has more than one confinement region, a modulator output port is optically coupled more efficiently (e.g., primarily) to a single one of the confinement regions. FIG. 33 illustrates a cross-sectional view of exemplary fiber lengths 3004 and 3008 suitable for a fiber-based optical modulator. Fiber lengths 3004 and 3008 have different RIPs. In the illustrated example, fiber length 3004 has graded-index profile 1418, which may have any of the attributes or properties introduced elsewhere herein. As one specific example, fiber length 3004 may be a pedestal fiber of the type further exemplified above in the context of FIG. 12. In the example illustrated in FIG. 33, fiber length 3008 has a step index profile 3330 comprising a central confinement region 3307 of higher refractive index surrounded by a lower index cladding 3309. A non-guiding cladding 3311 surrounds cladding 3309. Non-guiding cladding 3311 has a higher index than cladding 3309, and may for example have low index contrast with an ambient (e.g., free space) through which fiber length 3008 passes. Graded-index profile 1418 may be designed to promote adjustment of a beam propagating in fiber length 3004 upon action on the fiber to generate a beam having a beam intensity distribution concentrated in an outer perimeter of fiber length 3004, or concentrated in an inner diameter of the fiber length 3004.

Figure 34:
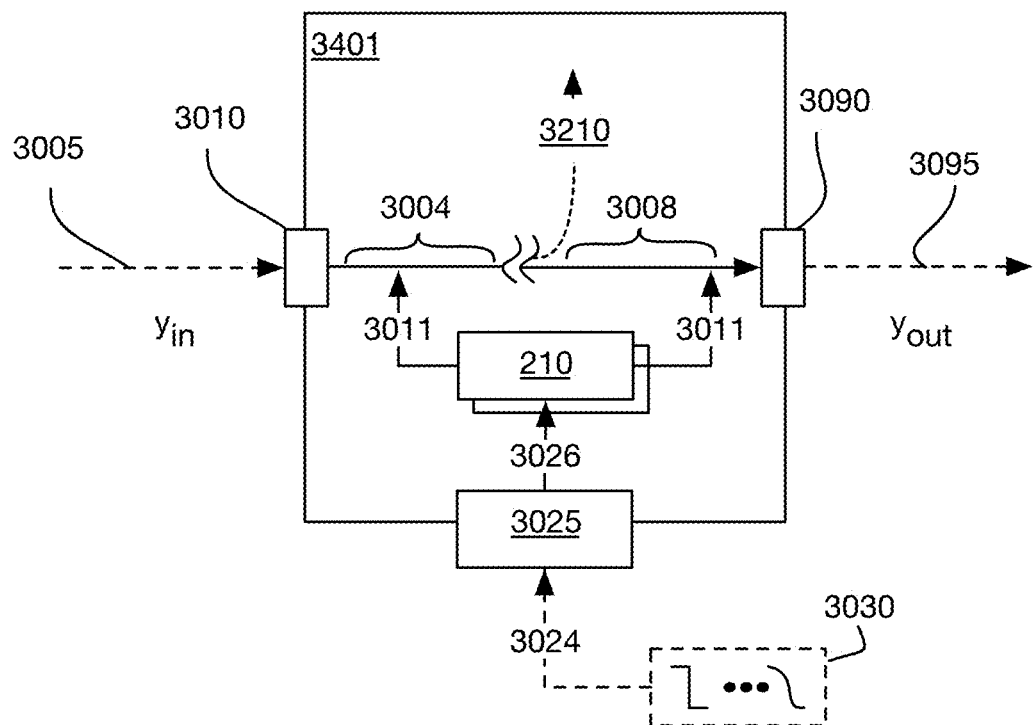
FIG. 34 illustrates a schematic of an optical modulator in accordance with some embodiments.

FIG. 34 illustrates a schematic of an optical modulator 3401 in accordance with some embodiments where fiber losses are modulated through action(s) of a perturbation device. In modulator 3401, components having the same reference number introduced in the context of optical modulator 3001 (FIG. 30) have substantially the same function and/or may have any of the features or attributes described above. For modulator 3401, fiber lengths 3004 and 3008 may have either of the architectures illustrated in FIG. 32 or 33, for example. Other fiber architectures suitable for modulating fiber losses through action upon the fiber may also be employed for fiber lengths 3004 and 3008. For example, one or more of the RIP examples provided above in the context of FIG. 11-21 may also be employed for fiber lengths 3004 and 3008. Whether fiber lengths 3004 and 3008 have the same RIP, or different RIPs, the modulation of transmittance is implemented by varying fiber losses 3210 within modulator 3401. The time-varying faction of $y_{in}$ removed through loss mechanisms to arrive at $y_{out}$ may be simply dissipated, for example to a heat sink (not shown), within modulator 3401.

For embodiments where modulator 3401 comprises fiber 3004 and 3008 having the step-index profile 1102 illustrated in FIG. 32 (or graded-index profile 1418, or a pedestal profile 1202, or another suitable RIP), the confinement region of fiber length 3008 may be coupled to a modulator output 3090. The output beam 3095 at a time instance $t_0$ has a first power associated with a first (e.g., unperturbed) fiber state in which an optical beam propagating through fiber lengths 3004 and/or 3008 is proximal the fiber axis. When a perturbation device acts upon (e.g., bends) fiber over lengths 3004 and/or 3008, modes of an optical beam propagating through fiber lengths 3004 and/or 3008 may move outward, away from the fiber axis, with an intensity distribution of the beam becoming more concentrated in an outer perimeter of the fiber(s). Where bend radius is sufficiently small and/or bend length is sufficiently great that fiber (e.g., bend) losses 3210 become significant, output beam 3095 has a second, lower, power associated with a second (e.g., perturbed) fiber state at a time instance $t_1$. Depending on the optical system and desired level of transmittance modulation, losses 3210 may be significant when a perturbation device induces as little 1-10 μm of movement of a beam in a fiber. Hence, for this particular example, transmittance of a beam through the optical modulator is modulated when fiber losses within an optical modulator are varied by a perturbation means that is controlled based on a modulation control signal.

For embodiments where modulator 3401 comprises fiber 3004 and 3008 having the two RIPs 1418 and 3330 shown in FIG. 33, a beam may be primarily coupled into confinement region 3307 of fiber length 3008 when fiber length 3004 and/or 3008 is in a first (e.g., unperturbed) state. In this first state, the beam is most efficiently coupled into the confinement region 3307 for a high transmittance level output beam 3095 at a time instance $t_0$. When a perturbation device enters another state (e.g., one that bends the fiber over lengths 3004 and/or 3008), the adjusted beam is significantly coupled into other than confinement region 3307 with coupling into confinement region 3307 becoming less efficient. In this second state, output beam 3095 coupled through confinement region 3307 has a lower power associated with reduced modulator transmittance for a perturbed fiber state at a time instance $t_1$. In one specific example where the adjusted beam is significantly coupled into high index cladding 3311, optical losses 3210 increase because of reduced index contrast and power leakage out of fiber length 3008 becomes significant. Notably, for this example transmittance modulation is a function of modulating efficiency of the coupling into a confinement region with fraction of input power)). not coupled into the confinement region being dissipated through fiber losses driven by the leakage region (e.g., non-guiding cladding 3311).

In some embodiments, action upon one or more lengths of fiber within a modulator alters a coupling of the optical beam between a first length of the fiber and two or more confinement regions of a second length of the fiber. With the addition of a second confinement region in the second length of the fiber, a beam may be selectively coupled more or less to either of the two confinement regions. In some examples having two confinement regions in the second length of fiber, one of the confinement regions is more efficiently coupled to a modulator output port than the other of the two confinement regions. Transmittance of a beam through that optical modulator output port may then be a function of coupling between the first fiber length and the more efficiently coupled confinement region. Concentrating the intensity distribution to the other confinement region that is optically decoupled from (i.e., less efficiently coupled to) the modulator output port may further enable the beam to be output to a second destination rather than dissipated within the modulator. For example, a second confinement region may be optically coupled to a second optical output port, effectively implementing a multi-port modulator (i.e., optical switch).

Figure 35:
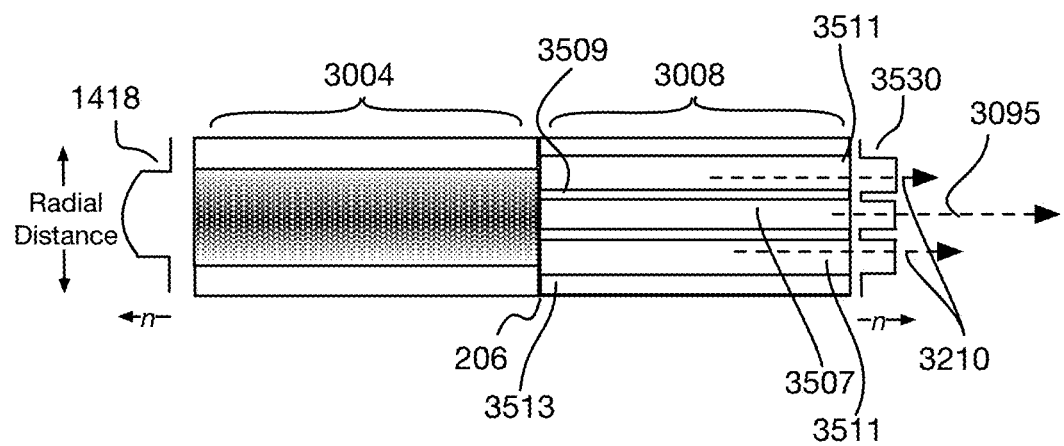
FIG. 35 illustrates a cross-sectional view of exemplary lengths of fiber suitable for an optical modulator in accordance with some embodiments.

FIG. 35 illustrates a cross-sectional view of exemplary lengths of fiber 3004 and 3008 suitable for an optical modulator in accordance with some embodiments. In this example, fiber lengths 3004 and 3008 again have different RIPs with fiber length 3004 having graded-index profile 1418, which may have any of the attributes or properties introduced elsewhere herein. Fiber length 3008 has a pedestal profile 3530 comprising a central confinement region 3507 of higher refractive index surrounded by a lower index cladding 3509. Another confinement region 3511 surrounds cladding 3509. Confinement region 3511 has a higher index than cladding 3509, forming an annulus around cladding 3509 that is further enclosed within a guiding cladding 3513. Guiding cladding 3513 has a lower index than confinement region 3511. Graded-index profile 1418 may be designed to promote adjustment of a beam propagating in fiber length 3004 upon action on the fiber to generate a beam having an intensity distribution concentrated in an outer perimeter of the fiber length 3004, or concentrated in an inner diameter of the fiber length 3004. Coupling efficiency between fiber length 3004 and confinement regions 3307 and 3511 may therefore be modulated through the action upon the fiber lengths 3004 and/or 3008. Notably, while the example RIPs illustrated in FIG. 35 are provided for the sake of clarity in description, fiber lengths 3004 and 3008 may have other RIPs. In some embodiments, for example fiber length 3008 includes multiple adjacent cores. Fiber length 3008 may, for example, have two side by side cores, each embedded within one or more cladding material layer.

Figure 36:
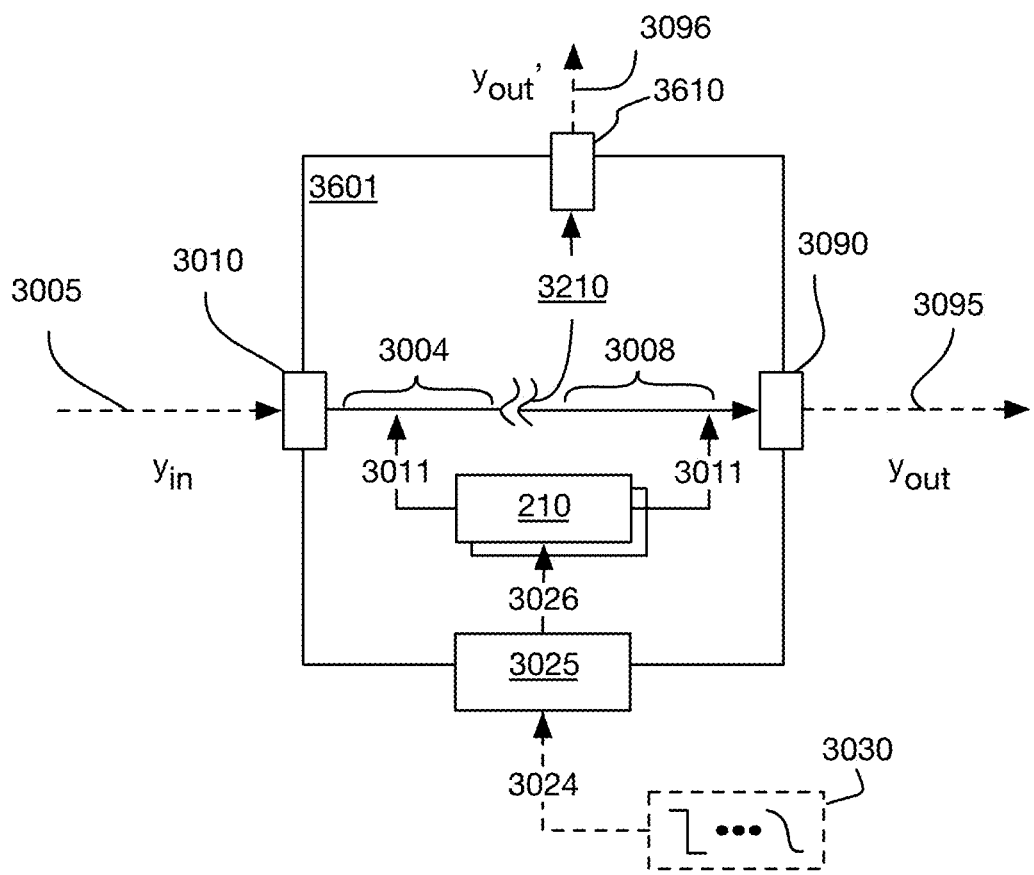
FIG. 36 illustrates a schematic of a multi-port optical modulator in accordance with some embodiments.

FIG. 36 illustrates a schematic of a multi-port optical modulator in accordance with some embodiments where beam coupling between multiple ports is modulated through action(s) of a perturbation device. In modulator 3601, components having the same reference number introduced in the context of optical modulator 3001 (FIG. 30) have substantially the same function and/or may have any of the features or attributes described above. In one example of modulator 3601, fiber lengths 3004 and 3008 have the architecture illustrated in FIG. 35. Other fiber architectures suitable for modulating coupling between multiple fiber confinement regions through action upon the fiber may also be employed for fiber lengths 3004 and 3008. For example, fiber length 3008 may have two cores that are not coaxially arranged in the manner shown in FIG. 35. One or more of the RIPs described elsewhere herein (e.g., FIGS. 11-16) may also be suitable for fiber length 3004. Similarly, one or more of the RIPs described elsewhere herein (e.g., FIGS. 17-21) may also be suitable for fiber length 3008.

Relative to modulator 3401, modulator 3601 includes an additional optical output port 3610. While a first confinement region of fiber length 3008 is more efficiently coupled to output port 3090 than a second confinement region of fiber length 3008, the second confinement region of fiber length 3008 is coupled to output port 3610 more efficiently than the first confinement region of fiber length 3008. As one example, confinement region 3507 (FIG. 35) may be more efficiently coupled to output port 3090 than it is to output port 3610, while confinement region 3511 (FIG. 35) may be more efficiently coupled to output port 3610 than it is to output port 3090. Output beam 3095 then has a power $y_{out}$ that is a time varying function of coupling efficiency between fiber length 3004 and confinement region 3507. Output beam 3096 has a power $y_{out}'$ that is a reciprocal, inverse, or complementary to $y_{out}$. Coupling between the different confinement regions and individual ones of output ports 3090 and 3610 may be through any means. As one example, an additional length of fiber may be connected to output port 3610 and this additional length of fiber may be coupled to confinement region 3511 through evanescent-fields while such a coupling to confinement region 3507 is insignificant.

Figure 37:
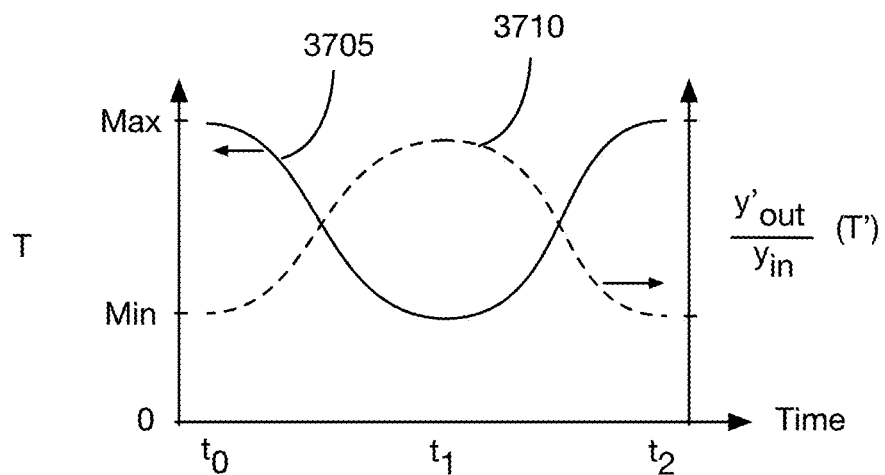
FIG. 37 is a graph illustrating a modulation of transmittance over time associated with an operation of a multi-port optical modulator in accordance with some embodiments.

FIG. 37 is a graph illustrating a modulation of transmittance of multi-port optical modulator 3601 in accordance with some examples. Response curve 3705 illustrates transmittance through confinement region 3507 to output port 3090 (on the left axis) as a function of time while response curve 3710 illustrates transmittance through confinement region 3511 to output port 3095 (on the right axis) as a function of time. As shown, for a first time instance $t_0$, perturbation device 210 is in a first state and an input beam may be primarily coupled into confinement region 3507 of fiber length 3008 when fiber length 3004 and/or 3008 is in a corresponding first (e.g., unperturbed) state. In this first state, the beam is most efficiently coupled into the confinement region 3507 for output beam 3095 to have a high power level associated with a high transmittance level to output 3090 at time instance $t_0$. In this first state, the beam is less efficiently coupled into the confinement region 3511 so that output beam 3096 has a lower power $y_{out}'$ associated with a low transmittance level to output 3610 at time instance $t_0$. When perturbation device 210 enters another state (e.g., one that bends the fiber over lengths 3004 and/or 3008) at a time instance $t_1$, the adjusted beam is less efficiently coupled into confinement region 3507 and more efficiently coupled into confinement region 3511. Beam 3095 then has a lower power $y_{out}$ associated with a low transmittance level to output 3090 at time instance $t_1$. In this second state, output beam 3096 coupled through confinement region 3511 has a higher power $y_{out}'$ associated with a high transmittance level to output 3610 at time instance $t_1$. At time instance $t_2$ perturbation device 210 returns to the first state and an input beam is again primarily coupled into confinement region 3507.

Notably, the modulator examples described above are operable without free-space optics. Also of note, the modulator examples described above may be implemented in any optical system where the fiber perturbation achieves a sufficient modulation frequency and amplitude. In some optical systems, one or more modulators in conformance with one or more of the embodiments described above are implemented within a laser. Optical losses within the laser my thereby be modulated to control operation of the laser in any manner known to be suitable in the art. In some other optical systems including a laser, one or more modulators in conformance with one or more of the embodiments described above are implemented outside of the laser, for example to condition and/or filter an output of the laser in any manner known to be suitable in the art.

Figure 38:
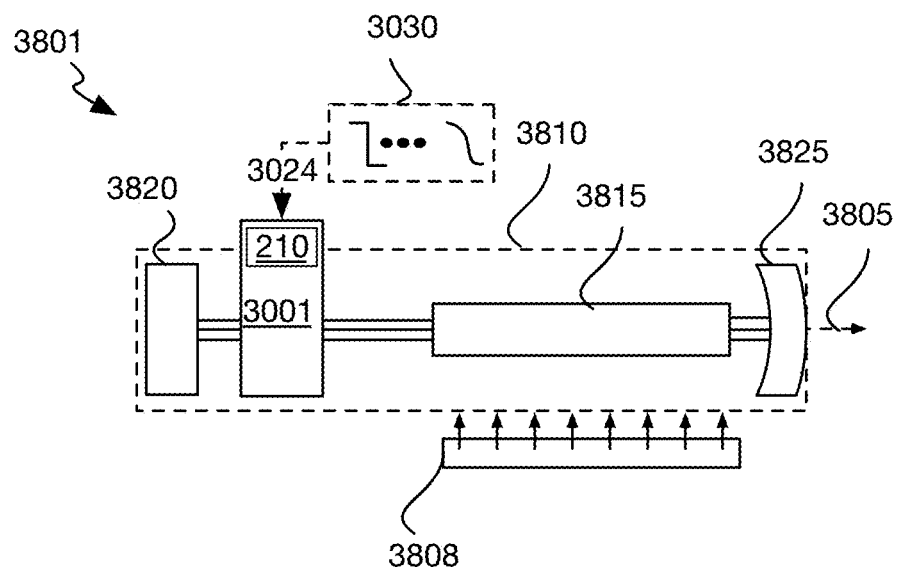
FIG. 38 is a schematic of a laser including a modulator in accordance with some embodiments.

FIG. 38 is a schematic of a laser 3801 including a modulator in accordance with some embodiments. As shown, laser 3801 is an assembly that comprises an optical cavity 3810. Optical cavity 3810 may have any architecture (e.g., Fabry-Perot, etc.) known to be suitable for supporting a standing wave for any desired resonance frequencies. For an example where laser 3801 is a fiber laser, optical cavity 3810 may, for example, comprise one or more lengths of optical fiber. In the illustrated schematic optical cavity 3810 includes a high-reflectivity mirror 3820 and a partially reflective mirror 3825, which is further operable as an output coupler through which an output beam 3805 is generated by laser 3801. Mirrors 3820 and 3825 may have any architecture known to be suitable for maintaining a stable standing wave. For an example where laser 3801 is a fiber laser, mirrors 3820 and 3825 may be fiber Bragg gratings (FBGs) with mirror 3820 having a greater grating reflectivity than mirror 3825. An optical gain medium 3815 and optical modulator 3001 is within optical cavity 3810. Although only one optical gain medium 3815 is illustrated, two or more optical gain medium 3815 may be present. Optical gain medium 3815 may be any medium that can absorb energy from an energizing means 3808 and enter one or more excited states. At some threshold energy level, optical gain medium 3815 is further to undergo stimulated emission. In some examples where laser 3801 is a fiber laser, optical gain medium 3815 comprises one or more lengths of fiber doped with one or more rare earth (RE) elements. The RE dopant may be any rare earth element known suitable for the purpose, such as, but not limited to Yb, Nd, Er, and Tm.

Laser 3801 further comprises an energizing means 3808 operable to energize optical gain medium 3815 that may comprise any electromagnetic and/or optical pump source. Energizing means 3808 may entail any device(s) known to be suitable for transferring energy into gain medium 3815. In some examples where laser 3801 is a fiber laser, energizing means 3808 may be a pump laser comprising one or more laser diodes operable over a band suitable for gain medium 3815. Laser 3801 of further comprises modulator 3001, which may have any of the functions and/or attributes or properties described elsewhere herein. Within cavity 3810, modulator 3001 may be on either side of gain medium 3815. The optical path of cavity 3810 comprises one or more lengths of fiber included in modulator 3001. Even for examples where laser 3801 is not a fiber laser (e.g., including one or more free-space optics), fiber lengths in modulator 3001 are in the optical path within which the standing wave(s) reside. As described above for modulator 3001, at least one length of fiber in modulator 3001 has a confinement region that is optically coupled to an output of the modulator, and therefore coupled to optical gain medium 3815. An optical input of modulator 3001 is further coupled to a second location within the optical path of resonant cavity 3810. Perturbation device 210 is then to receive a control signal 3024, for example substantially as described elsewhere herein, and in response to control signal 3024, vary optical loss within the cavity through action upon the one or more lengths of fiber in any of the manners described elsewhere herein. Modulation of transmittance through the confinement region coupled to the optical gain medium 3815 may thereby be enlisted to modulate lasing characteristics within optical cavity 3810 in any suitable manner.

Figure 39:
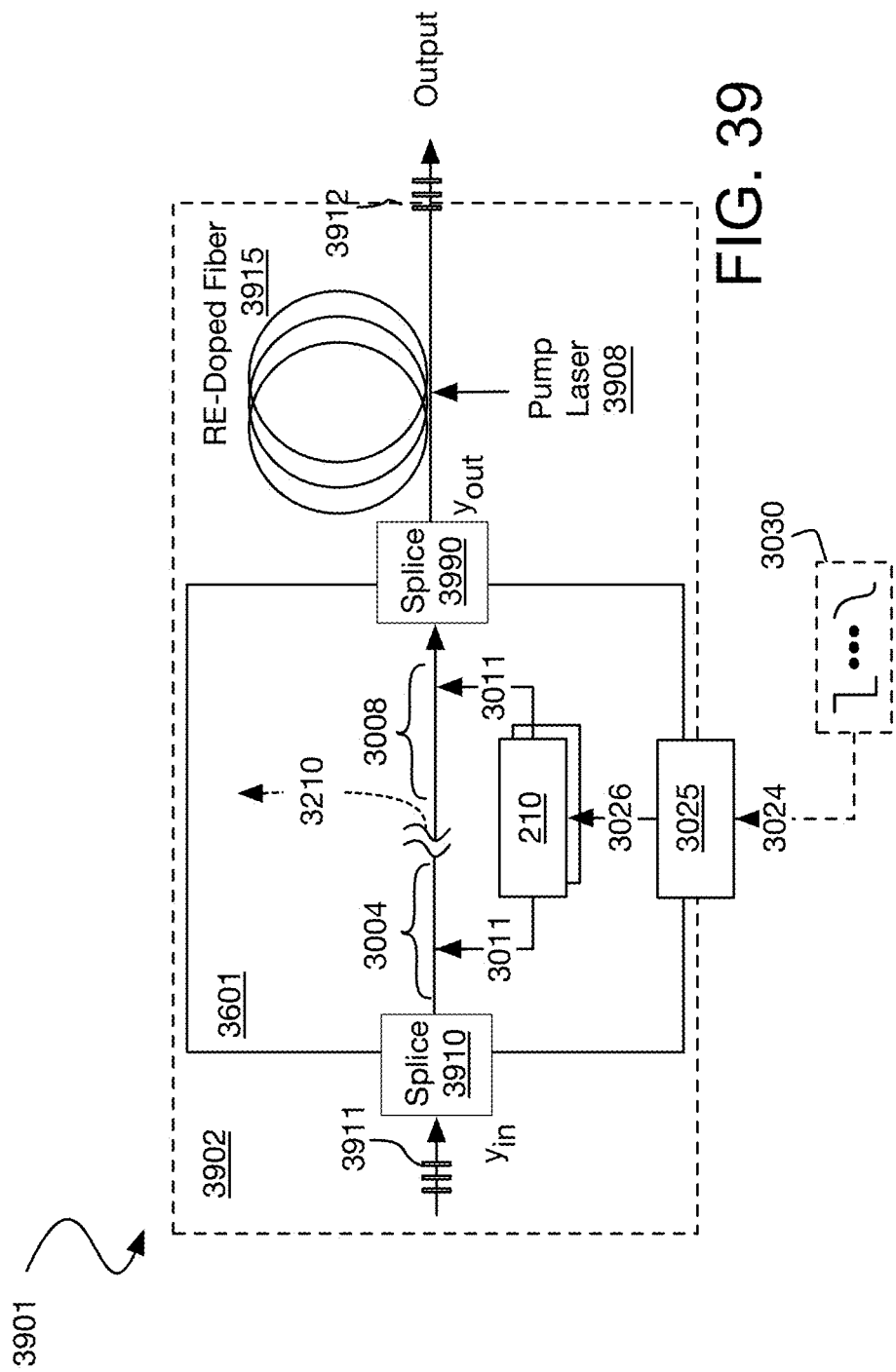
FIG. 39 is a schematic of an optical system including a modulator within a resonant cavity in accordance with some embodiments.

FIG. 39 is a more schematic of an optical system 3901 including modulator 3601 within an optical cavity 3902, in accordance with some fiber laser embodiments. As shown, a first port (e.g., input) of modulator 3601 comprises a fiber splice 3910. A first FBG 3911 is coupled to fiber splice 3910. A second port (e.g., output) of modulator 3601 comprises another fiber splice 3990. The input and output ports of modulator 3601 are coupled through at least fiber lengths 3004 and 3008. A RE-doped fiber 3915 is coupled to an end of fiber length 3008 at fiber splice 3990. Pump laser 3908 is coupled into RE-doped fiber 3915, and RE-doped fiber 3915 is further coupled to a second FBG 3912. In some examples, pump laser 3908 comprises one or more laser diodes. In the illustrated example, FBG 3912 is operable as an output coupler from which an output beam may be launched into an external portion of optical system 3901 that may further include any number of components and/or assemblies. Fiber length 3004 has a first end at splice 3910 and a second end joined (e.g., spliced, fused, etc.) to a first end of fiber length 3008.

With a second end of fiber length 3008 at splice 3990, cavity 3902 comprises only fiber (i.e., an all-fiber modulated laser cavity) and is devoid of any free-space (bulk) optical components. As described above, perturbation device 210 is to apply action 3011 upon one or more fiber lengths 3004 and 3008 in response to a modulation signal 3026 received through control signal input 3025. In the context of optical cavity 390, the action 3011 modulates transmittance of an optical beam through a confinement region of at least fiber length 3008 between a first transmittance level and a second transmittance level. At lower transmittance (higher attenuation) levels, optical loss 3210 is greater than at higher transmittance (lower attenuation) levels. In some examples, the variation in loss within optical cavity 3902 induces pulsed laser operation. The pulse frequency may be varied as a function of the round-trip time associated with the optical path length of cavity 3902 with the pulses resulting from amplitude modulation associated with the operation of modulator 3601.

The Q-factor of cavity 3902 may be varied by modulator 3601 at repetition rates sufficient to generate Q-switch output pulses or to actively mode-lock the laser output. For mode-locked operation, optical loss 3210 transmittance through a confinement region of fiber length 3008 may be modulated only slightly, for example ~10%, while for Q-switching, a larger modulation of transmittance (e.g., 3-40 db) is advantageous. Notably, passively Q-switched lasers (e.g., employing a saturable absorber) typically rely on one or more bulk, free-space optical components, and the repetition frequency cannot be modified independent of other operational parameters and is typically unstable (non-uniform temporal spacing of the output pulses). With modulator 3601 inserted within the resonant optical cavity, Q-switching is active and fully tunable, for example between a few Hz up to MHz, as constrained only by the fiber perturbation rate, and the pulse timing is determined by the waveform driving the modulator (and can thus be stable and/or synchronized to an external trigger or clock signal). This approach thus enables a range of repetition frequencies, a stable repetition frequency, synchronization of the repetition frequency or individual pulses with an external event or clock, and even pulse-on-demand operation.

Figure 40:
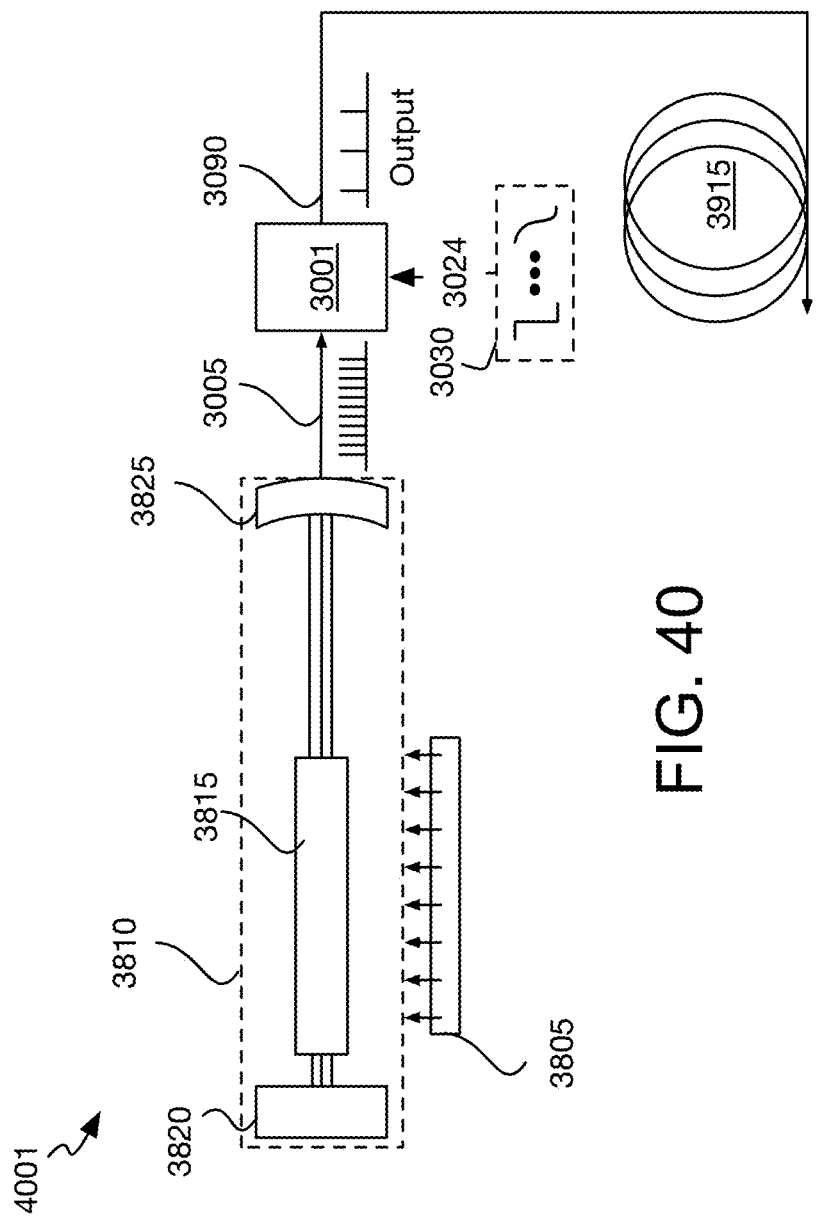
FIG. 40 is a schematic of an optical system including a modulator coupled to an output of a resonant cavity in accordance with some embodiment.

FIG. 40 is a schematic of an optical system 4001 including modulator 3001 coupled to an output of optical cavity 3810 in accordance with some embodiments. In optical system 4001, components having the same reference number introduced in the context of optical modulator 3001 (FIG. 30) and optical cavity 3810 (FIG. 38) have substantially the same function(s) and/or may have any of the features or attributes described above. In system 4001, cavity 3810 is operable in a pulsed output mode. Any means may be employed within cavity 3810 to achieve the pulsed output, for example through the use of any active or passive variable attenuator. In some examples, a transmittance modulator having one or more of the features described elsewhere herein is employed within cavity 3810 to generate a pulsed (e.g., mode-locked or Q-switched) output beam. In other examples, cavity 3810 may include a saturable absorber or any electro-optic modulator known to be a suitable variable attenuator.

Pulsed laser output having given pulse train characteristics (e.g., particular frequency and power) are input to modulator 3001. Modulator 3001 includes one or more lengths of fiber, for example substantially as described elsewhere herein, with at least one of the lengths of fiber comprising a confinement region that is optically coupled to an output of modulator 3001. Modulator 3001 includes one or more perturbation device, for example substantially as described elsewhere herein, that acts upon the lengths of fiber in response to control signal 3024 and modulates transmission of the input pulse train. The pulse train modulation may be either in the form of temporal pulse carving or shaping, or if the transmission modulation is timed appropriately with respect to the pulse train, the pulse train modulation may be sufficient to pass or "pick" only a subset of pulses (including potentially a single pulse) to modulator output 3090. The carved and/or picked pulses may then be launched into other components of optical system 4001. For example, picked pulses exiting modulator output 3090 may be amplified in gain medium 3915.

Figure 41:
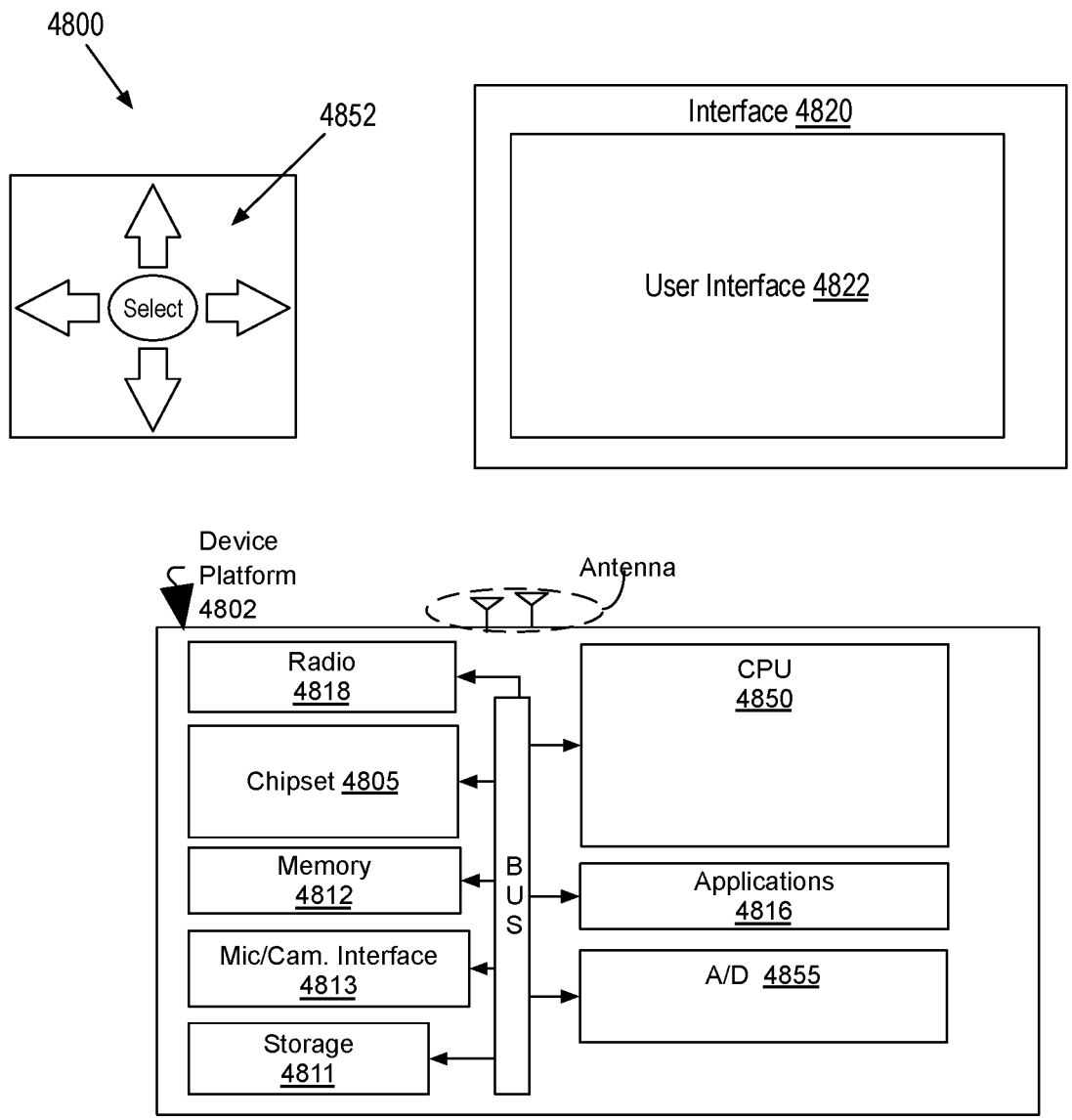
FIG. 41 is a schematic of an exemplary networked computer system, which may be configured as a controller to read one or computer readable media and to execute one or more of the methods described herein.
Figure 41:
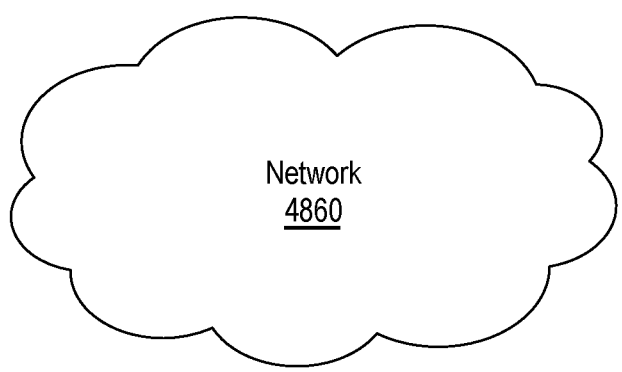

FIG. 41 is a schematic of an exemplary networked computer system 4800, which may be configured as a controller, to read one or computer readable media, and to execute one or more of the methods described herein. System 4800 may be an embedded device although system 4800 is not limited to this context. For example, system 4800 may be incorporated into a laptop computer, ultra-laptop computer, tablet, touch pad, portable computer, handheld computer, palmtop computer, and so forth.

System 4800 includes a device platform 4802 that may implement all or a subset of the various dynamic VBC control methods described above. CPU 4850 may include logic circuitry to generate a perturbation drive signal for controlling a perturbation device, for example through A/D converter 3485. In some embodiments, one or more computer readable media may store instructions, which when executed by CPU 4850, cause the processor to generate a drive signal for controlling a time varying beam characteristic. One or more monitor signals may be received into system 4855, for example through microphone/camera interface 4813. The monitor signals may be stored in memory 4812.

In some embodiments, device platform 4802 is coupled to a human interface device (HID) 4820. HID 4820 may include any television type monitor or display coupled to platform 4802 via radio 4818 and/or network 4860. HID 4820 may include, for example, a computer display screen, touch screen display, video monitor, television-like device, and/or a television. Platform 4802 may collect monitor data, which may be processed by CPU 4850 programmed to execute a lock-in detection algorithm. Alternatively, platform 4805 further comprises a lock-in detection amplifier circuit, which may be one ASIC of chipset 4805. A navigation controller 4852 including one or more navigation features may be used to interact with, for example, device platform 4802 and/or HID 4820.

Under the control of one or more software applications 4816, device platform 4802 may display user interface 4822 on HID 4820. Movements of the navigation features of controller 4852 may be replicated on a display (e.g., HID 4820) by movements of a pointer, cursor, focus ring, or other visual indicators displayed on the display. For example, under the control of software applications 4816, the navigation features located on navigation controller 4850 may be mapped to virtual navigation features displayed on user interface 4822.

Device platform 4802 may include any combination of microphone/camera interface 4813, chipset 4805, processor 4850, controller 4852, memory 4812, storage 4811, applications 4816, and radio 4818 known in the art. Chipset 4805 may provide intercommunication among processor 4850, controller 4852, memory 4812, storage 4811, applications 4816, A/D converter 4855 and radio 4818.

Processor 4850 may be implemented as one or more Complex Instruction Set Computer (CISC) or Reduced Instruction Set Computer (RISC) processors; x86 instruction set compatible processors, multi-core, or any other microprocessor or central processing unit (CPU). Memory 4812 may be implemented as a volatile memory device such as, but not limited to, a Random Access Memory (RAM), Dynamic Random Access Memory (DRAM), or Static RAM (SRAM). Storage 4811 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. Radio 4818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 4818 may operate in accordance with one or more applicable wireless standards versions.

In embodiments, system 4800 may be implemented as a wireless system, a wired system, or a combination of both. When implemented as a wireless system, system 4800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium.

Some specific examples of machine implemented methods that may performed upon executing one or more computer readable media, in accordance with some embodiment herein are provided in the following paragraphs.

In first examples, an optical beam modulation method comprises receiving an optical beam into one or more lengths of fiber, wherein at least one of the lengths of fiber comprises a confinement region that is optically coupled to an optical output. The method comprises receiving a control signal, and acting upon the one or more lengths of fiber, in response to the control signal, to modulate a transmittance of the beam through the confinement region from a first transmittance level at a first time instance to a second transmittance level at a second time instance.

In second examples, for any of the first examples acting upon the one or more lengths of fiber reduces an optical power transmitted by the confinement region to the optical output by at least 10% between the first time instance and the second time instance.

In third examples, for any of the first through second examples acting upon the one or more lengths of fiber further comprises altering at least one of: a coupling of the optical beam between a first length of the fiber and the confinement region of a second length of the fiber; or a rate of loss of the optical beam from the confinement region over at least one of the lengths of fiber.

In fourth examples, for any of the first through third examples acting upon the one or more lengths of fiber alters a coupling of the optical beam into the confinement region. The first level of transmittance is associated with a greater coupling of the optical beam into the confinement region, and the second level of transmittance is associated with a lesser coupling of the optical beam into the confinement region.

In fifth examples, for any of the first through fourth examples at least one of the lengths of fiber comprising the confinement region further comprises a leakage region having higher optical loss than the confinement region. The action upon the one or more lengths of fiber alters coupling of the optical beam between the confinement and leakage regions. The first level of transmittance is associated with a greater coupling of the optical beam into the confinement region, and a lesser coupling of the optical beam into the leakage region. The second level of transmittance is associated with a lesser coupling of the optical beam into the confinement region, and a greater coupling of the optical beam into the leakage region.

In sixth examples for any of the fifth examples the leakage region comprises a non-guiding cladding structure, the confinement region is within the cladding structure, and the cladding structure comprises a material of lower refractive index than that of the confinement region.

In seventh examples for any of the first through the fourth examples the confinement region is a first confinement region, at least one of the lengths of fiber comprising the first confinement region further comprises a second confinement region that is optically decoupled from the output, acting upon the one or more lengths of fiber alters coupling of the optical beam between the first and second confinement regions. The first level of transmittance is associated with a greater coupling of the optical beam into the first confinement region and a lesser coupling of the optical beam into the second confinement region. The second level of transmittance is associated with a lesser coupling of the optical beam into the first confinement region and a greater coupling of the optical beam into the second confinement region.

In eighth examples, for any of the seventh examples the first confinement region is separated from the second confinement region by a cladding structure comprising a material having a lower refractive index than that of the first confinement region, and having a lower refractive index than that of the second confinement region.

In ninth examples, for any of the seventh through eighth examples the second confinement region comprises an annular structure co-axial with the first confinement region.

In tenth examples, for any of the first examples the one or more lengths of fiber further comprise a first length of fiber end-coupled with a second length of fiber, and the first length of fiber has a first refractive index profile (RIP) and the second length of fiber has a second RIP.

In eleventh examples, for any of the tenth examples the first length of fiber has a graded RIP in at least a radially central portion, and the second length of fiber has a first confinement region comprising a central core and a second confinement region that is annular and encompasses the first confinement region.

In twelfth examples a method, comprises energizing an optical gain medium within a resonant optical cavity, modulating an optical beam within the cavity in response to a control signal, wherein the modulating further comprises temporally varying optical losses within the cavity by acting upon the one or more lengths of fiber within the cavity, wherein at least one of the lengths of fiber comprises a confinement region that is optically coupled to the optical gain medium, and wherein acting upon the one or more lengths of fiber modulates a transmittance of the optical beam through the confinement region. The method further comprises coupling at least a portion of the optical beam out of the cavity.

In thirteenth examples, for any of the twelfth examples acting upon the one or more lengths of fiber modulates a transmittance of the optical beam through the confinement region between a first transmittance level and a second transmittance level to induce pulsed operation of the laser.

In fourteenth examples, for any of the twelfth through thirteenth examples transmittance of the optical beam between the first and second levels is modulated at a repetition rate sufficient to actively mode-lock the laser.

In fifteenth examples, for any of the fourteenth examples a difference between the first and second transmittance levels is of a sufficient magnitude to Q-switch lasing within the cavity.

In sixteenth examples, a method, comprises energizing an optical gain medium within a resonant optical cavity, coupling at least a portion of the optical beam out of the cavity, and temporally carving pulses that exit the cavity in response to a control signal, wherein carving pulses further comprises acting upon one or more lengths of fiber, wherein at least one of the lengths of fiber comprises a confinement region, and wherein acting upon the one or more lengths of fiber modulates a transmittance of the optical beam through the confinement region between first and second levels.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

Having described and illustrated both general and specific principles of examples of the presently disclosed technology, it should be apparent that the examples may be modified in arrangement and detail without departing from such principles. We claim all modifications and variation coming within the spirit and scope of the following claims.

The invention claimed is:

1. An optical modulator, comprising:
an optical input to receive an optical beam;
one or more lengths of fiber between the optical input and an optical output, wherein the one or more lengths of fiber further comprise a first length of fiber directly end-coupled to a second length of fiber, and wherein the first length of fiber has a first refractive index profile (RIP) and the second length of fiber has a second RIP, wherein second RIP comprises a first confinement region and a second confinement region, at least one of the confinement regions being coupled to the optical output;
a perturbation device to modulate, through action upon the one or more lengths of fiber, a transmittance of the beam through the first and second confinement regions from first complementary transmittance levels at a first time instance to second complementary transmittance levels at a second time instance; and
a controller input coupled to the perturbation device, wherein the perturbation device is to act upon at least one of the one or more lengths of fiber in response to a control signal received through the controller input.

2. The optical modulator of claim 1, wherein an optical power transmitted by a first of the first and second confinement regions to the optical output at the first time is at least 10% greater than the optical power transmitted through the first of the first and second confinement regions to the optical output at the second time, and wherein optical power transmitted by a second of the first and second confinement regions at the first time is less than the optical power transmitted through the second of the first and second confinement regions at the second time.

3. The optical modulator of claim 1, wherein the action upon the one or more lengths of fiber alters:
a coupling of the optical beam between the first length of the fiber and the one of the first and second confinement regions of the second length of the fiber.

4. The optical modulator of claim 3, wherein:
the action upon the one or more lengths of fiber alters a coupling of the optical beam from the first fiber length into the first confinement region;
the first levels of transmittance are associated with a greater coupling of the optical beam into the first confinement region; and
the second levels of transmittance are associated with a lesser coupling of the optical beam into the first confinement region.

5. The optical modulator of claim 1, wherein one of the first and second confinement regions is more efficiently optically coupled to the output than the other of the first and second confinement regions.

6. The optical modulator of claim 1, wherein:
the second confinement region is optically decoupled from the output;
the action upon the one or more lengths of fiber inversely alters coupling of the optical beam through the first and second confinement regions;
the first levels of transmittance are associated with a greater coupling of the optical beam into the first confinement region and a lesser coupling of the optical beam into the second confinement region; and
the second levels of transmittance are associated with a lesser coupling of the optical beam into the first confinement region and a greater coupling of the optical beam into the second confinement region.

7. The optical modulator of claim 6, wherein the first confinement region is separated from the second confinement region by a cladding structure comprising a material having a lower refractive index than that of the first confinement region, and having a lower refractive index than that of the second confinement region.

8. The optical modulator of claim 7, wherein the second confinement region comprises an annular structure co-axial with the first confinement region.

9. The optical modulator of claim 1, wherein the first confinement region comprises a central core and the second confinement region is annular and encompasses the first confinement region.

10. The optical modulator of claim 9, wherein:
the first length of fiber has a graded RIP in at least a radially central portion; and
the perturbation device is to modulate the transmittance through action upon at least the first length of fiber.

11. The optical modulator of claim 1, wherein the perturbation device is to have at least a first state corresponding to the first complementary levels of transmittance and a second state corresponding to the second complementary levels of transmittance.

12. The optical modulator of claim 11, wherein the perturbation device is to transition between the first and second states according to an analog waveform with the transmittance to vary according to a continuous function that includes the first and second levels of transmittance.

13. An optical system, comprising:
a laser; and
the optical modulator of claim 1, wherein the optical input is coupled to an output coupler of the laser.

* * * * *